(12) United States Patent
Chung

(10) Patent No.: US 12,533,630 B2
(45) Date of Patent: Jan. 27, 2026

(54) LIGNIN-BASED POLYMERS AND METHODS OF MAKING THE SAME

(71) Applicant: The Florida State University Research Foundation, Inc., Tallahassee, FL (US)

(72) Inventor: Hoyong Chung, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 19/086,675

(22) Filed: Mar. 21, 2025

(65) Prior Publication Data
US 2025/0296040 A1    Sep. 25, 2025

Related U.S. Application Data

(60) Provisional application No. 63/568,120, filed on Mar. 21, 2024.

(51) Int. Cl.
*B01D 53/62* (2006.01)
*B01D 53/04* (2006.01)
*C08G 71/04* (2006.01)

(52) U.S. Cl.
CPC ............. *B01D 53/62* (2013.01); *B01D 53/04* (2013.01); *C08G 71/04* (2013.01); *B01D 2253/202* (2013.01); *B01D 2257/504* (2013.01)

(58) Field of Classification Search
None
See application file for complete search history.

(56) References Cited

U.S. PATENT DOCUMENTS 4,149,849 A    4/1979    Koch et al.

OTHER PUBLICATIONS

Zhang et al., "Surface modification of pine bark with quaternary ammonium groups and its use for vanadium removal." Chem. Eng. J. 385 (2020) 123967, pp. 1-11.*
International Search Report and Written Opinion from corresponding PCT/US2025/020890, mailed Jul. 9, 2025, 11 pages.
Wahlstrom et al., "Lignin cationization with glycidyltrimethylammonium chloride aiming at water purification applications," Industrial Crops and Products, vol. 104 (2017) pp. 188-194.
Raganati, Federica, Francesco Miccio, and Paola Ammendola. "Adsorption of carbon dioxide for post-combustion capture: a review." Energy & Fuels 35.16 (2021): 12845-12868.
Zbair, Mohamed, and Simona Bennici. "Survey summary on salts hydrates and composites used in thermochemical sorption heat storage: a review." Energies 14.11 (2021): 3105.

(Continued)

*Primary Examiner* — Daniel Berns
(74) *Attorney, Agent, or Firm* — Meunier Carlin & Curfman LLC

(57) ABSTRACT

Disclosed herein are lignin-based polymeric materials and methods of making the same. The disclosed polymeric materials can reversibly capture $CO_2$. Also disclosed are methods of forming high-value chemicals from the captured carbon dioxide by the polymeric materials disclosed herein. Also disclosed herein are methods of making polyhydroxyurethanes by reacting lignin-base materials with polyamines.

18 Claims, 24 Drawing Sheets

(56) References Cited

OTHER PUBLICATIONS

Zanatta, Marcileia. "Materials for direct air capture and integrated $CO_2$ conversion: advancement, challenges, and prospects." ACS Materials Au 3.6 (2023): 576-583.

Welch, Alex J., et al. "Bicarbonate or carbonate processes for coupling carbon dioxide capture and electrochemical conversion." ACS Energy Letters 5.3 (2020): 940-945.

Peplow, Mark. "The race to upcycle CO2 into fuels, concrete and more." Nature 603.7903 (2022): 780-783.

Gao, Wanlin, et al. "Industrial carbon dioxide capture and utilization: state of the art and future challenges." Chemical Society Reviews 49.23 (2020): 8584-8686.

Song, Juzheng, et al. "Quaternized chitosan/PVA aerogels for reversible CO2 capture from ambient air." Industrial & engineering chemistry research 57.14 (2018): 4941-4948.

He, Hongkun, et al. "Reversible CO2 capture with porous polymers using the humidity swing." Energy & Environmental Science 6.2 (2013): 488-493.

Hou, Chenglong, et al. "Preparation of quaternized bamboo cellulose and its implication in direct air capture of CO2." Energy & fuels 33.3 (2018): 1745-1752.

Zanatta, Marcileia, Eduardo Garcia-Verdugo, and Victor Sans. "Direct air capture and integrated conversion of carbon dioxide into cyclic carbonates with basic organic salts." ACS Sustainable Chemistry & Engineering 11.26 (2023): 9613-9619.

Xie, Yaqiang, et al. "Hypercrosslinked mesoporous poly(ionic liquids) with high ionic density for efficient CO2 capture and conversion into cyclic carbonates." Journal of Materials Chemistry A 6.15 (2018): 6660-6666.

Huang, Jin, et al. "Update and challenges in carbon dioxide-based polycarbonate synthesis." ChemSusChem 13.3 (2020): 469-487.

Oliwa, Rafal, et al. "Epoxy composites of reduced flammability." Composites Part B: Engineering 95 (2016): 1-8.

Simon, Nathalia M., et al. "Carbon dioxide capture by aqueous ionic liquid solutions." ChemSusChem 10.24 (2017): 4927-4933.

Huang, Yanjie, et al. "Preorganization and cooperation for highly efficient and reversible capture of low-concentration CO2 by ionic liquids." Angewandte Chemie International Edition 56.43 (2017): 13293-13297.

Xia, Zhicheng, Leonid G. Akim, and Dimitris S. Argyropoulos. "Quantitative 13C NMR analysis of lignins with internal standards." Journal of agricultural and food chemistry 49.8 (2001): 3573-3578.

Liu, Hailing, and Hoyong Chung. "Lignin-based polymers via graft copolymerization." Journal of Polymer Science Part A: Polymer Chemistry 55.21 (2017): 3515-3528.

Kim, Sundol, and Hoyong Chung. "Convenient cross-linking control of lignin-based polymers influencing structure-property relationships." ACS Sustainable Chemistry & Engineering 11.5 (2023): 1709-1719.

Zhang, Ruichi, and Tiina Leiviskä. "Surface modification of pine bark with quaternary ammonium groups and its use for vanadium removal." Chemical engineering journal 385 (2020): 123967.

Pinto, Patrícia IF, et al. "Cationization of eucalyptus kraft LignoBoost lignin: Preparation, properties, and potential applications." Industrial & Engineering Chemistry Research 61.10 (2022): 3503-3515.

Kong, Fangong, et al. "Preparation of cationic softwood kraft lignin and its application in dye removal." European Polymer Journal 67 (2015): 335-345.

Jablonskis, Antons, et al. "Evaluation of Ligno Boost™ softwood kraft lignin epoxidation as an approach for its application in cured epoxy resins." Industrial Crops and Products 112 (2018): 225-235.

Fanjul-Mosteirín, Noé, et al. "Bio-based non-isocyanate poly(hydroxy urethanes) (PHU) derived from vanillin and CO2." Materials Advances 4.11 (2023): 2437-2448.

Acurio Cerda, Karen, et al. "Cationic Lignin as an Efficient and Biorenewable Antimicrobial Material." ACS Sustainable Chemistry & Engineering 11.28 (2023): 10364-10379.

Shuai, Li, et al. "Formaldehyde stabilization facilitates lignin monomer production during biomass depolymerization." Science 354.6310 (2016): 329-333.

Constant, Sandra, et al. "New insights into the structure and composition of technical lignins: a comparative characterisation study." Green Chemistry 18.9 (2016): 2651-2665.

Kim, Sundol, and Hoyong Chung. "Synthesis and characterization of lignin-graft-poly(ethylene brassylate): a biomass-based polyester with high mechanical properties." ACS Sustainable Chemistry & Engineering 9.44 (2021): 14766-14776.

Zanatta, Marcileia, Nathália M. Simon, and Jairton Dupont. "The nature of carbon dioxide in bare ionic liquids." ChemSusChem 13.12 (2020): 3101-3109.

Morozova, Sofia M., et al. "Ionic Polyurethanes as a New Family of Poly(ionic liquids) for Efficient CO2 Capture." Macromolecules 50.7 (2017): 2814-2824.

Perinu, Cristina, Bjørnar Arstad, and Klaus-Joachim Jens. "13C NMR experiments and methods used to investigate amine-CO2—H2O systems." Energy Procedia 37 (2013): 7310-7317.

Shokrollahzadeh Behbahani, Hoda, et al. "Quaternary ammonium-functionalized Poly(Arylene ether sulfone) random copolymers for direct air capture." Macromolecules 56.16 (2023): 6470-6481.

Lackner, Klaus S., and Sarah Brennan. "Envisioning carbon capture and storage: expanded possibilities due to air capture, leakage insurance, and C-14 monitoring." Climatic change 96.3 (2009): 357-378.

Yang, Hao, Manmilan Singh, and Jacob Schaefer. "Humidity-swing mechanism for CO2 capture from ambient air." Chemical Communications 54.39 (2018): 4915-4918.

Shi, Xiaoyang, et al. "Capture CO2 from ambient air using nanoconfined ion hydration." Angewandte Chemie 128.12 (2016): 4094-4097.

Shi, Xiaoyang, et al. "Moisture-driven CO2 sorbents." Joule 4.8 (2020): 1823-1837.

McGuire, Thomas M., et al. "Divergent catalytic strategies for the cis/trans stereoselective ring-opening polymerization of a dual cyclic carbonate/olefin monomer." Journal of the American Chemical Society 141.34 (2019): 13301-13305.

McGuire, Thomas M., et al. "Synthesis of 5-to 8-membered cyclic carbonates from diols and CO2: A one-step, atmospheric pressure and ambient temperature procedure." Journal of CO2 Utilization 27 (2018): 283-288.

Argyropoulos, Dimitris DS, et al. "Kraft lignin: a valuable, sustainable resource, opportunities and challenges." ChemSusChem 16.23 (2023): e202300492.

* cited by examiner

| Polymer | CC: Amine ratio | Amine unit | $M_n$ | PDI | $T_{d5\%}$ | $T_g$ |
|---|---|---|---|---|---|---|
| PHU-P | 2:1 | H₂N~~~NH₂ <br> 1,3-Diaminopropane | 248.7 | 1.45 | 252 | 67 |
| PHU-B | 2:1 | H₂N~~~~NH₂ <br> 1,4-Diaminobutane | 230.58 | 1.35 | 250 | 51 |
| PHU-H | 2:1 | H₂N~~~~~~NH₂ <br> 1,6-Diaminohexane | 198.97 | 1.16 | 248 | 46 |
| PHU-O | 2:1 | H₂N~~O~~O~~NH₂ <br> 1,8-Diamino-3,6-Dioxaoctane | 190.07 | 1.32 | 251 | 54 |
| PHU-D | 2:1 | H₂N~~O~~O~~O~~NH₂ <br> 1,13-Diamino-4,7,10-trioxatridecane | 182.4 | 1.35 | 256 | 45 |
| PHU-X | 2:1 | p-Xylylenediamine | 199.2 | 1.20 | 254 | 57 |
| PHU-TA | 3:1 | Tris(2-aminoethyl)amine | 201.67 | 1.22 | 259 | 73 |

FIG. 29

LIGNIN-BASED POLYMERS AND METHODS OF MAKING THE SAME

CROSS-REFERENCE TO RELATED APPLICATION

This application claims the benefit of U.S. Provisional Application 63/568,120, filed Mar. 21, 2024, the contents of which are hereby incorporated in its entirety.

FIELD

The present invention relates generally to lignin-based polymers that can, for example, be reacted with carbon dioxide and then, if needed, converted to other high-value polymers. The present invention also relates to articles comprising the described lignin-based polymers and methods for the manufacture and use of the same.

BACKGROUND

Carbon dioxide ($CO_2$), a significant greenhouse gas, comprises a major portion of emissions from industry and automobiles. In the last 200 years, there has been a significant increase in human-caused $CO_2$ emissions, which has triggered the concentration of $CO_2$ in the atmosphere to rise exponentially from around 280 parts per million to over 415 parts per million at now. As a consequence of this process, the average worldwide temperature has already risen noticeably (by around 0.8° C.) over preindustrial times. It is widely acknowledged that the significant rise in atmospheric carbon dioxide levels is the prevailing reason for climate changes, including desertification, rising sea levels, melting glaciers and ice shelves, and extreme uncertain weather conditions. In an attempt to reduce global warming, most countries are seeking ways to reduce greenhouse gas emissions and shifting towards the use of renewable resources.

Therefore, finding a purpose for waste $CO_2$ that does not involve releasing it into the environment is crucial. Carbon capture and storage (CCS) and carbon capture and utilization (CCU) are the two potential options. The CCS approach entails the capture and purification of waste $CO_2$ from the environment or from any particular source. Then, the captured gas undergoes a pressurization process for transportation to a storage facility. The CCS process is expensive because $CO_2$ is handled as a useless waste. Contrary to CCS, $CO_2$ is regarded as a valuable resource in CCU, where it can be used to synthesize chemicals and fuels that are crucial to the global economy. In such a way, the production of energy and chemicals is moved from a linear to a circular sustainable economy, and $CO_2$ is valued as a renewable C1 chemical feedstock.

Biomass is an essential component of the global carbon cycle and plays an important role in mitigating climate change. Lignin is the most abundant natural aromatic polymer on the planet and is the second most abundant biomass after cellulose. It has several advantageous potentials, including antioxidant activity, high carbon content, nontoxicity, high thermal stability, rigidity, and antibacterial activity. The pulp and paper industry is anticipated to generate 70 million tons/year of waste lignin, of which less than 10% is separated and transformed into industrial chemical supplies. The 90% of the remaining industrial lignin is utilized in low-valorization of lignin for fuel combustion. There has been a growing interest in lignin high-value valorization in recent years. The dependency on fossil fuels is mitigated by the effective management of lignin disposal, where lignin can be used instead of traditional petroleum-based raw materials. Additionally, employing lignin for $CO_2$ capture and utilization provides a pioneering approach to combat greenhouse $CO_2$ emissions. Similarly, the use of lignin to form high-value chemicals can provide an additional route to reducing dependency on petroleum-based raw materials.

$CO_2$ capturing mechanisms prevalently consist of adsorption and absorption. Adsorption is the process in which $CO_2$ adheres to the surface of an adsorbent by either weak van der Waals forces (physisorption) or stronger chemical bonds (chemisorption). In contrast, absorption is governed by the permeation and uniform dispersion of the absorbate ($CO_2$) throughout the absorbent's volume. Sorption is a broader term that encompasses both adsorption and absorption. In physisorption, the carbon atom within the $CO_2$ molecule adopts a sp hybridization, leading to a substantial overlap of bonding orbitals that restricts reactivity. On the contrary, chemically captured $CO_2$ undergoes a structural transformation into a more reactive state with trigonal planar $sp^2$ hybridization, resulting in the formation of bicarbonate and carbamates. Bicarbonate ($-45$ kJ $mol^{-1}$) demonstrates greater reactivity compared to carbamate ($-80$ kJ $mol^{-1}$), indicating that the production of bicarbonate serves to activate $CO_2$ for subsequent reuse.

The prospect of designing a single material that can be capable of both capturing $CO_2$ [carbon capture and storage (CCS)] and converting the captured-$CO_2$ into valuable substances [carbon capture and utilization (CCU)] is very appealing but difficult. Capturing $CO_2$ directly from the atmosphere or any concentrated $CO_2$ source has the potential to provide significant environmental advantages. Aqueous solutions of primary, secondary, and tertiary amines-based materials have been studied for $CO_2$ capture, where carbamates are generated after interacting with $CO_2$. Quaternary ammonium groups containing ionic polymers have shown potential as viable candidates for capturing $CO_2$. The reported polymers have only focused on capturing $CO_2$ without any further investigation of utilization of captured-$CO_2$. Very few reports have discussed the conversion of captured C02. It has mainly generated cyclic carbonates from the cycloaddition between released $CO_2$ and epoxides. However, the unstable chemical properties, limited variety of epoxides, and flammability all limit the industrial use of epoxide substrate.

There remains a need for improved compositions and methods for capturing $CO_2$. There remains a need for valorizing commodity chemicals like lignin.

DESCRIPTION OF DRAWINGS

FIG. 29 depicts the properties of polyhydroxyurethanes.

DETAILED DESCRIPTION

Figure 1:
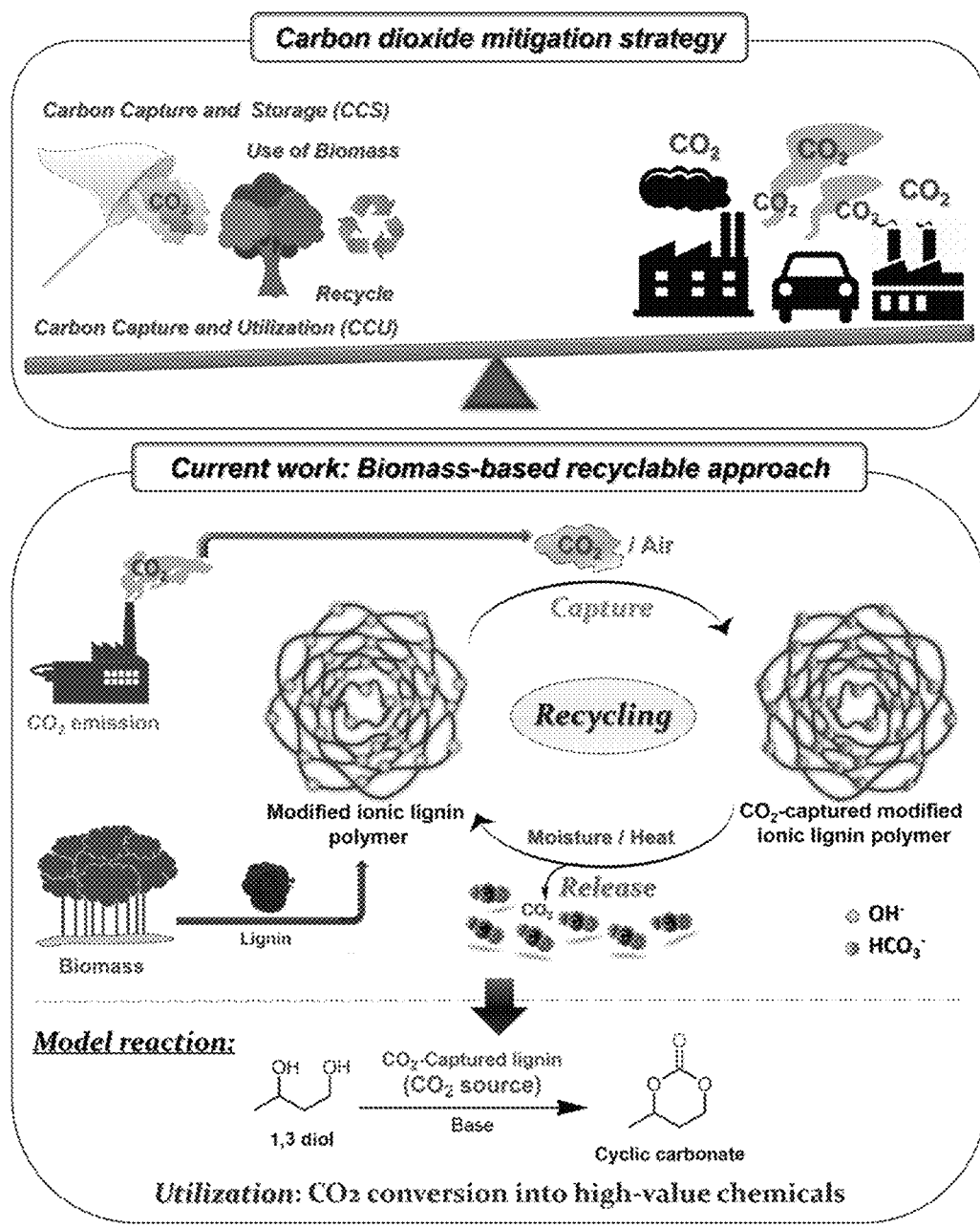
FIG. 1 depicts a conceptual illustration of devolving modified ionic lignin polymers for $CO_2$ capturing and conversion thereof.

The present invention can be understood more readily by referencing the following detailed description, examples, drawings, and claims, and their previous and following description. However, before the present articles, systems, and/or methods are disclosed and described, it is to be understood that this invention is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

Throughout the description and claims of this specification, the word "comprise" and other forms of the word, such as "comprising" and "comprises," means including but not limited to, and are not intended to exclude, for example, other additives, segments, integers, or steps. Furthermore, it is to be understood that the terms comprise, comprising, and comprises as they relate to various aspects, elements, and features of the disclosed invention also include the more limited aspects of "consisting essentially of" and "consisting of."

As used herein, the singular forms "a," "an," and "the" include plural referents unless the context clearly dictates otherwise. Thus, for example, reference to a "polymer" includes aspects having two or more such polymers unless the context clearly indicates otherwise.

Ranges can be expressed herein as from "about" one particular value and/or to "about" another particular value. When such a range is expressed, another aspect includes from the one particular value and/or to the other particular value. Similarly, when values are expressed as approximations, by use of the antecedent "about," it will be understood that the particular value forms another aspect. It should be further understood that the endpoints of each of the ranges are significant both in relation to the other endpoint and independently of the other endpoint.

Similarly, when values are expressed as approximations, by use of the antecedent "about," it will be understood that the particular value forms another aspect. It will be further understood that the endpoints of each of the ranges are significant both in relation to the other endpoint and independently of the other endpoint. Unless stated otherwise, the term "about" means within 5% (e.g., within 2% or 1%) of the particular value modified by the term "about."

Values can be expressed herein as an "average" value. "Average" generally refers to the statistical mean value.

As used herein, the terms "optional" or "optionally" mean that the subsequently described event or circumstance may or may not occur, and that the description includes instances where said event or circumstance occurs and instances where it does not.

For the terms "for example" and "such as" and grammatical equivalences thereof, the phrase "and without limitation" is understood to follow unless explicitly stated otherwise. It is further understood that these phrases are used for explanatory purposes only. It is further understood that the term "exemplary," as used herein, means "an example of" and is not intended to convey an indication of a preferred or ideal aspect.

As used herein, the term "substantially" means that the subsequently described event or circumstance completely occurs or that the subsequently described event or circumstance generally, typically, or approximately occurs.

As used herein, the term "substantially" can, in some aspects, refer to at least about 80%, at least about 85%, at least about 90%, at least about 91%, at least about 92%, at least about 93%, at least about 94%, at least about 95%, at least about 96%, at least about 97%, at least about 98%, at least about 99%, or about 100% of the stated property, segment, composition, or other condition for which substantially is used to characterize or otherwise quantify an amount.

In other aspects, as used herein, the term "substantially free," when used in the context of a composition or segment of a composition that is substantially absent, is intended to refer to an amount that is less than about 1% by weight, e.g., less than about 0.5% by weight, less than about 0.1% by weight, less than about 0.05% by weight, or less than about 0.01% by weight of the stated material, based on the total weight of the composition.

As used herein, the terms "substantially identical reference composition," "substantially identical reference article," or "substantially identical reference electrochemical cell" refer to a reference composition, article, or electrochemical cell comprising substantially identical components in the absence of an inventive component. In another exemplary aspect, the term "substantially," in, for example, the context "substantially identical reference composition," "substantially identical reference article," or "substantially identical reference electrochemical cell," refers to a reference composition, article, or an electrochemical cell comprising substantially identical components and wherein an inventive component is substituted with a common in the art component.

The term "or combinations thereof" as used herein refers to all permutations and combinations of the listed items preceding the term. For example, "A, B, C, or combinations thereof" is intended to include at least one of A, B, C, AB, AC, BC, or ABC, and if the order is important in a particular context, also BA, CA, CB, CBA, BCA, ACB, BAC, or CAB. Continuing with this example, expressly included are combinations that contain repeats of one or more items or terms, such as BB, AAA, AB, BBC, AAABCCCC, CBBAAA, CABABB, and so forth. The skilled artisan will understand that, typically, there is no limit on the number of items or terms in any combination unless otherwise apparent from the context.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X, and Y are present at a weight ratio of 2:5 and are present in such ratio regardless of whether additional components are contained in the composition.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, a description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6 and any whole and partial increments therebetween. This applies regardless of the breadth of the range. It is further understood that if individual numbers within the range are disclosed, also disclosed are ranges formed by these individual numbers. For example, if the ranges, such as 1 to 3, from 1 to 4, from 1 to 5, from 2 to 4, from 2 to 6, from 3 to 6, etc., are disclosed as well as individual numbers within that range, for example, 1, 2, 2.7, 3, 4, 5, 5.3, 6 are disclosed, then additional subranges such as 1 to 2.7 or 2 to 5.3, and so on are also disclosed.

It is understood that the term "between," when used in the context of ranges, includes the bordering values of the range. For example, a range described as being between 10 and 15 includes both 10 and 15 unless described otherwise.

In still further aspects, when the specific values are disclosed between two end values, it is understood that these end values can also be included. For example, if individual values of 1, 2, 3, 4, 5, 6, 7, etc. are disclosed, the ranges of 1 to 7, 1 to 6, 1 to 5, 1 to 4, 2 to 7, 3 to 7, and so on are also disclosed.

In still further aspects, when the range is given, and exemplary values are provided, it is understood that any ranges can be formed between any exemplary values within the broadest range.

As used herein, the term "composition" is intended to encompass a product comprising the specified ingredients in the specified amounts, as well as any product that results, directly or indirectly, from a combination of the specified ingredients in the specified amounts.

A weight percent of a segment, unless specifically stated to the contrary, is based on the total weight of the formulation or composition in which the segment is included.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

As used herein, the term "and/or" includes any and all combinations of one or more of the associated listed items.

It will be understood that the terms "first," "second," etc., may be used herein to describe various elements, components, regions, layers, and/or sections. These elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

As used herein, the term or phrase "effective," "effective amount," or "conditions effective to" refers to such amount or condition that is capable of performing the function or property for which an effective amount or condition is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate, effective amount will be readily determined by one of ordinary skill in the art using only routine experimentation.

As used herein, the term "biodegradable" refers to a material capable of being decomposed by bacteria or other living microorganisms.

As used herein, the term "chemically degradable" refers to a material capable of being easily decomposed under chemical conditions.

As used herein, "Kraft lignin" refers to a lignin product of the sulfate pulping process. It is understood that Kraft lignin can comprise about 2-3 wt % of sulfur based on the total weight of the Kraft lignin.

As used herein, the terms "modified" and "functionalized" can be used interchangeably.

As used herein, the term "substituted" means that a hydrogen atom is removed and replaced by a substituent. It is contemplated to include all permissible substituents of organic compounds. As used herein, the phrase "optionally substituted" means unsubstituted or substituted. It is to be understood that substitution at a given atom is limited by valency. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein that satisfy the valencies of the heteroatoms. This disclosure is not intended to be limited in any manner by the permissible substituents of organic compounds. Also, the terms "substitution" or "substituted with" include the implicit proviso that such substitution is in accordance with the permitted valence of the substituted atom and the substituent and that the substitution results in a stable compound, e.g., a compound that does not spontaneously undergo transformation such as by rearrangement, cyclization, elimination, etc. In still further aspects, it is understood that when the disclosure describes a group being substituted, it means that the group is substituted with one or more (i.e., 1, 2, 3, 4, or 5) groups as allowed by valence selected from alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol.

The term "compound," as used herein, is meant to include all stereoisomers, geometric isomers, tautomers, and isotopes of the structures depicted. Compounds herein identified by name or structure as one particular tautomeric form are intended to include other tautomeric forms unless otherwise specified.

Compounds provided herein can also include tautomeric forms. Tautomeric forms result from the swapping of a single bond with an adjacent double bond together with the concomitant migration of a proton. Tautomeric forms include prototropic tautomers, which are isomeric protonation states having the same empirical formula and total charge. Example prototropic tautomers include ketone—enol pairs, amide—imidic acid pairs, lactam-lactim pairs, enamine—imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

Also provided herein are salts of the compounds described herein. It is understood that the disclosed salts can refer to derivatives of the disclosed compounds wherein the parent compound is modified by converting an existing acid or base moiety to its salt form. Examples of the salts include, but are not limited to, mineral or organic acid salts of basic residues such as amines; alkali or organic salts of acidic residues such as carboxylic acids; and the like. The salts of the compounds provided herein include the conventional non-toxic salts of the parent compound formed, for example, from non-toxic inorganic or organic acids. The salts of the compounds provided herein can be synthesized from the parent compound that contains a basic or acidic moiety by conventional chemical methods. Generally, such salts can be prepared by reacting the free acid or base forms of these compounds with a stoichiometric amount of the appropriate base or acid in water or an organic solvent or in a mixture of the two. In various aspects, nonaqueous media like ether, ethyl acetate, alcohols (e.g., methanol, ethanol, isopropanol, or butanol), or acetonitrile (ACN) can be used.

In various aspects, the compounds provided herein, or salts thereof, are substantially isolated. By "substantially isolated," it meant that the compound is at least partially or substantially separated from the environment in which it was formed or detected. Partial separation can include, for example, a composition enriched in the compounds provided herein. Substantial separation can include compositions containing at least about 50%, at least about 60%, at least about 70%, at least about 80%, at least about 90%, at least about 95%, at least about 97%, or at least about 99% by weight of the compounds provided herein, or salt thereof. Methods for isolating compounds and their salts are routine in the art.

As used herein, chemical structures that contain one or more stereocenters depicted with dashed and bold bonds are meant to indicate the absolute stereochemistry of the stereocenter(s) present in the chemical structure. As used herein, bonds symbolized by a simple line do not indicate a stereo-preference. Unless otherwise indicated to the contrary, chemical structures, which include one or more stereocenters, illustrated herein without indicating absolute or relative stereochemistry encompass all possible stereoisomeric forms of the compound (e.g., diastereomers and enantiomers) and mixtures thereof. Structures with a single bold or dashed line and at least one additional simple line encompass a single enantiomeric series of all possible diastereomers.

The expressions "ambient temperature" and "room temperature" as used herein are understood in the art and refer generally to a temperature, e.g., a reaction temperature, which is about the temperature of the room in which the reaction is conducted, for example, a temperature from about 20° C. to about 35° C.

1. As used herein, the term "aliphatic group" refers to any carbon-containing substituent, including heteroatoms within the group. The current definition of aliphatic group includes, but not limited to, alkyl and heteroalkyl groups, alkenyl and heteroalkenyl groups, alkynyl and heteroalkenyl groups, cyclic and heterocyclic groups, aryl and heteroalkyl groups. In aspects where the aliphatic group comprises heteroatoms, such an aliphatic group can comprise at least one heteroatom in the chain, for example, an amine, carbonyl, carboxy, oxo, thio, phosphate, phosphonate, nitrogen, phosphorus, silicon, or boron atoms in place of a carbon atom. In certain aspects, the only heteroatom is nitrogen. In certain aspects, the only heteroatom is oxygen. In certain aspects, the only heteroatom is sulfur. In certain aspects, the aliphatic groups comprising one or more heteroatoms can be optionally substituted in a manner that results in the formation of a stable moiety. Nonlimiting examples of the aliphatic groups comprising one or more heteroatoms are polyethylene glycol, polyalkylene glycol, amide, polyamide, polylactide, polyglycolide, thioether, and ether, alkyl-heterocycle-alkyl, —O-alkyl-O-alkyl, alkyl-O-haloalkyl, etc.

The terms for various functional groups as used herein are not intended to be limited to monovalent radicals and may include polyvalent radical groups as appropriate, such as divalent, trivalent, tetravalent, pentavalent, and hexavalent groups, and the like, based on the position and location of such groups in the compounds described herein as would be readily understood by the skilled person.

A dash ("-") that is not between two letters or symbols is used to indicate a point of attachment for a substituent. For example, —(C=O)NH$_2$ is attached through the carbon of the keto (C=O) group.

2. As used herein, the term "$C_n$-$C_m$ alkyl" (or "$C_{n-m}$") employed alone or in combination with other terms refers to a saturated hydrocarbon group that may be straight-chain or branched, having n to m carbons. It is understood that the terms $C_{n-m}$ and $C_n$-$C_m$ can be used interchangeably and just to show that the specific compound has between n to m carbons. Unless otherwise specified, $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$)alkyl groups are intended. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, heptyl, octyl, nonyl, decyl, dodecyl, tetradecyl, hexadecyl, eicosyl, tetracosyl, and the like. The alkyl group can also be substituted or unsubstituted. Throughout the specification, "alkyl" is generally used to refer to both unsubstituted alkyl groups and substituted alkyl groups; however, substituted alkyl groups are also specifically referred to herein by identifying the specific substituent(s) on the alkyl group. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below, provided that the substituents are sterically compatible and the rules of chemical bonding and strain energy are satisfied. It is further understood that throughout the specification, "alkyl" can also be referred to as a linking group of saturated hydrocarbons that are divalent radicals. In other words, in a broader description, the term "alkyls" also encompasses alkylenes. It is further understood that the term "alkyl" covers saturated hydrocarbons that are multivalent radicals. Throughout the specification, "alkyl" is generally used to refer to both unsubstituted alkyl groups and substituted alkyl groups; however, substituted alkyl groups are also specifically referred to herein by identifying the specific substituent(s) on the alkyl group.

The term "heteroalkyl" refers to an alkyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. By way of example, a heteroC$_{1-6}$ alkyl (which may also be designated a C$_{1-6}$ heteroalkyl) group includes, but is not limited to, the following structures:

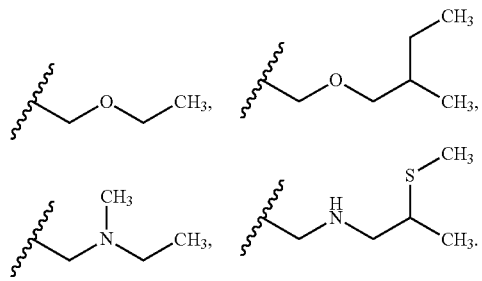

As used herein, the term "heterocyclyl" refers to a non-aromatic unsaturated or saturated cyclic hydrocarbon that includes at least one heteroatom in the cycle. For example, the term "heterocyclyl" or "heterocyclic" refers to a radical of a 3- to 14-membered non-aromatic ring system having ring carbon atoms and 1 to 4-ring heteroatoms, wherein each heteroatom is independently selected from nitrogen, oxygen, and sulfur ("3-14 membered heterocyclyl").

The term "aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("$C_{6-14}$ aryl"). It is understood that compounds such as biphenyls and azobenzenes can be generally described as aryls.

The term "heteroaryl" refers to a radical of a 5-14 membered monocyclic or polycyclic (e.g., bicyclic, tricyclic) 4n+2 aromatic ring system (e.g., having 6, 10, or 14 π electrons shared in a cyclic array) having ring carbon atoms and 1-4 ring heteroatoms provided in the aromatic ring system, wherein each heteroatom is independently selected from nitrogen, oxygen, and sulfur ("5-14 membered heteroaryl").

When used in the context of nitrogen-containing heterocyclic and heteroaryl rings, an "N-alkyl derivative" refers to instances when one or more of the ring nitrogen atoms is substituted by one or two alkyl groups permitted by valence. For instance, an N-alkyl derivative of piperidine include N-methyl piperidine and N,N-dimethyl piperidine. The skilled person understands which systems can accommodate dialkylation and which cannot. Unless specified to the contrary, the alkyl groups in an N-alkyl derivative can be a $C_{1-4}$ alkyl group.

In general, the inclusion of the prefix "alk" in front of a substituent name indicates there is an alkyl group (as defined herein) connecting the named substituent with the rest of the compound. For example, "alkaryl" (which is a subset of alkyl) refers to an alkyl group substituted by an aryl group, wherein the point of attachment is on the alkyl moiety and "alkheteroaryl" (which is a subset of "alkyl") refers to an alkyl group substituted by a heteroaryl group, wherein the point of attachment is on the alkyl moiety. The number of carbon atoms may be specified in the alkyl chain, the named substituent, or both. For example, $C_{1-2}alkC_6$ aryl refers to a phenyl ring (which may be substituted) connected via a 1-2 carbon alkylene group.

Affixing the suffix "-ene" to a group indicates the group is a polyvalent moiety, e.g., bonded to two or more groups. Alkylene is the polyvalent moiety of alkyl, alkenylene is the divalent moiety of alkenyl, alkynylene is the divalent moiety of alkynyl, heteroalkylene is the divalent moiety of heteroalkyl, heteroalkenylene is the divalent moiety of heteroalkenyl, heteroalkynylene is the divalent moiety of heteroalkynyl, carbocyclylene is the divalent moiety of carbocyclyl, heterocyclylene is the divalent moiety of heterocyclyl, arylene is the divalent moiety of aryl, and heteroarylene is the divalent moiety of heteroaryl.

As used herein, the designation of a polyvalent moiety without specifying the specific order of attachment is intended to cover all possible arrangements. By way of example, a compound that is represented by the formula:

A-X—B, wherein X is NHC(=O) embraces both:

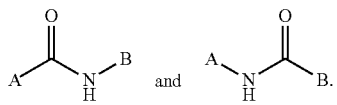

As used herein, a chemical bond depicted:  represents either a single, double, or triple bond, valency permitting. By way of example,

The term "anhydride" as used herein is represented by the formula $Z^1C(O)OC(O)Z^2$, where $Z^1$ and $Z^2$, independently, can be an alkyl, alkenyl, alkynyl, aryl, heteroaryl, cycloalkyl, cycloalkenyl, heterocycloalkyl, or heterocycloalkenyl group described above.

The term "cyclic anhydride," as used herein, is represented by the formula:

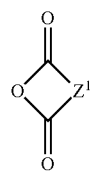

where $Z^1$ can be an alkyl, alkenyl, alkynyl, aryl, heteroaryl, cycloalkyl, cycloalkenyl, heterocycloalkyl, or heterocycloalkenyl group described above.

The term "epoxy" or "epoxide" as used herein refers to a cyclic ether with a three-atom ring and can be represented by the formula:

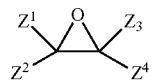

where $Z^1$, $Z^2$, $Z^3$, and $Z^4$ can be, independently, H, an alkyl, alkenyl, alkynyl, aryl, heteroaryl, cycloalkyl, cycloalkenyl, heterocycloalkyl, or heterocycloalkenyl group described above.

The term "halide," or "halogen," or "halo," as used herein, refers to fluorine, chlorine, bromine, and iodine.

As used herein, the term "thio" refers to a group of formulas —SH.

As used herein, the term "$CO_n$-$C_m$ alkylthio" refers to a group of formula —S-alkyl, wherein the alkyl group has n to m carbon atoms. In various aspects, the alkyl group has 1 to 6, 1 to 4, or 1 to 3 carbon atoms.

Compositions and Methods

Native lignin is the second most abundant natural polymer on Earth. It is an irregular heterogeneous polymer. The chemical structure of lignin mainly consists of syringyl (S), guaiacyl (G), and p-hydroxyphenyl (H) aromatic units, which are connected through several carbon-oxygen chemical linkages (β-O-4, α-O-4) and carbon-carbon (β-5, β-β). Certainly, the abundant aromatic structure in lignin enables it to be highly promising and feasible to yield high-value chemicals.

Figure 4A:
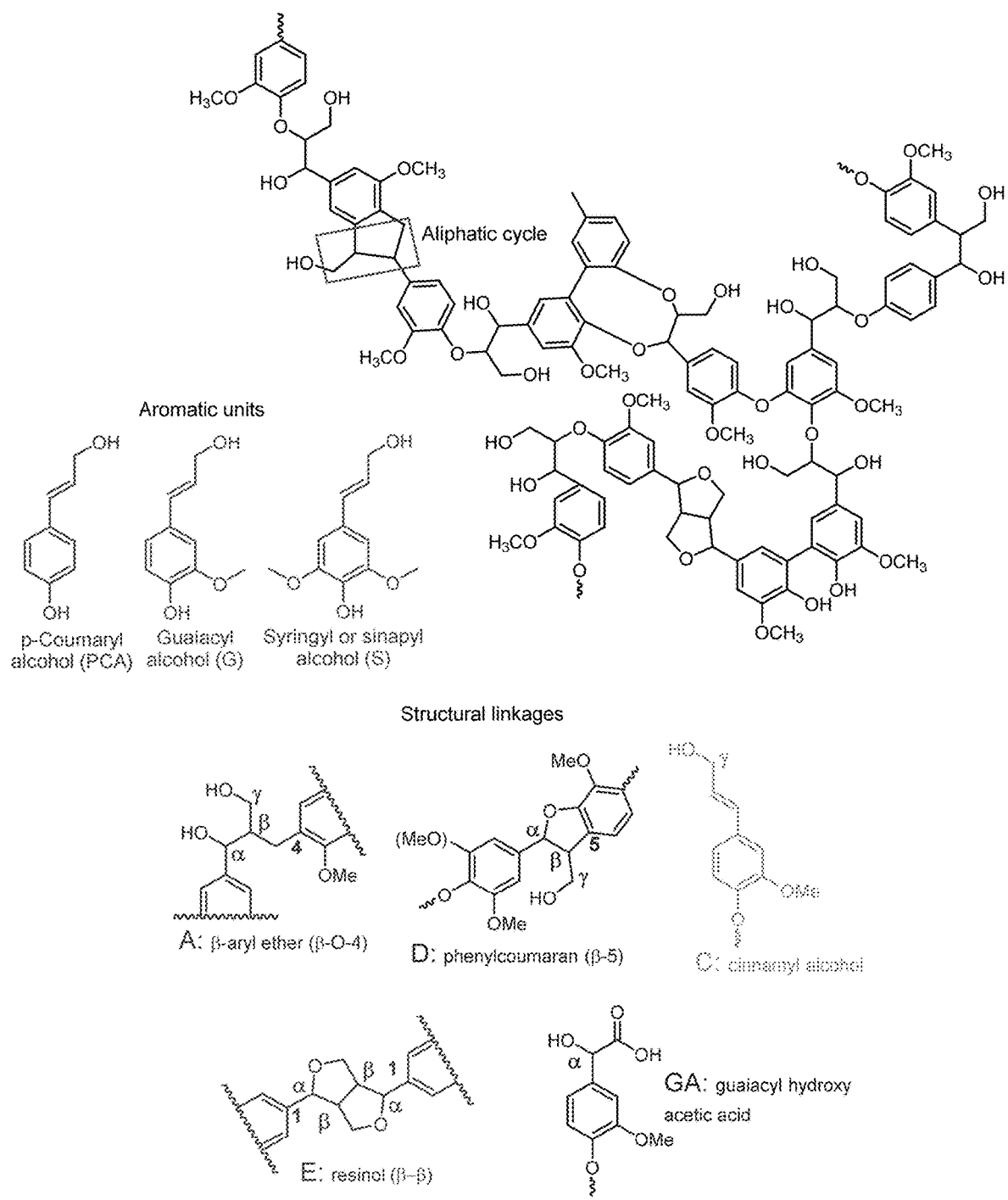
FIGS. 4A-4B depict chemical structures of lignin with diverse structural units and linkages.

Exemplary lignin structures and moieties are shown in FIG. 4.

Lignin C9-units can contain different functional groups. The most common functional groups are aromatic methoxyl and phenolic hydroxyl, primary and secondary aliphatic hydroxyls, small amounts of carbonyl groups (of the aldehyde and ketone types), and carboxyl groups. The monomeric C9 lignin units are linked together to form the polymeric structure of lignin via C—O—C and C—C linkages. The most abundant lignin inter-unit linkage is the β-O-4 type of linkage. They constitute about 50% of the inter-unit linkages in lignin (about 45% in softwoods and up to 60-65% in hardwoods). Other common lignin inter-unit linkages are the resinol (β-β), phenylcoumaran (β-5), 5-5, and 4-O-5 moieties. Their number varies in different lignins but typically does not exceed 10% of the total lignin moieties. The number of other lignin moieties is usually below 5%.

The degree of lignin condensation ("DC") is an important lignin characteristic, as it is often negatively correlated with lignin reactivity. Most commonly, condensed lignin structures are lignin moieties linked to other lignin units via the 2, 5, or 6 positions of the aromatic ring (in H-units also via the C-3 position). The most common condensed structures are 5-5', β-5, and 4-O-5' structures. Since the C-5 position of the syringyl aromatic ring is occupied by a methoxyl group, and therefore, it cannot be involved in condensation, hardwood lignins are typically less condensed than softwood lignins.

Technical lignins are obtained as a result of lignocellulosic biomass processing. Technical lignins are more heterogeneous (in terms of chemical structure and molecular mass) than native lignins. Technical lignins can have a higher amount of phenolic hydroxyls than native lignin and have a smaller molecular weight. Technical lignins can have a smaller amount of aliphatic hydroxyls, oxygenated aliphatic moieties, and the formation of carboxyl groups and saturated aliphatic structures. The actual structure of technical lignins also depends on the specific biomass processing (acidic vs. basic, and the like).

Figure 4B:
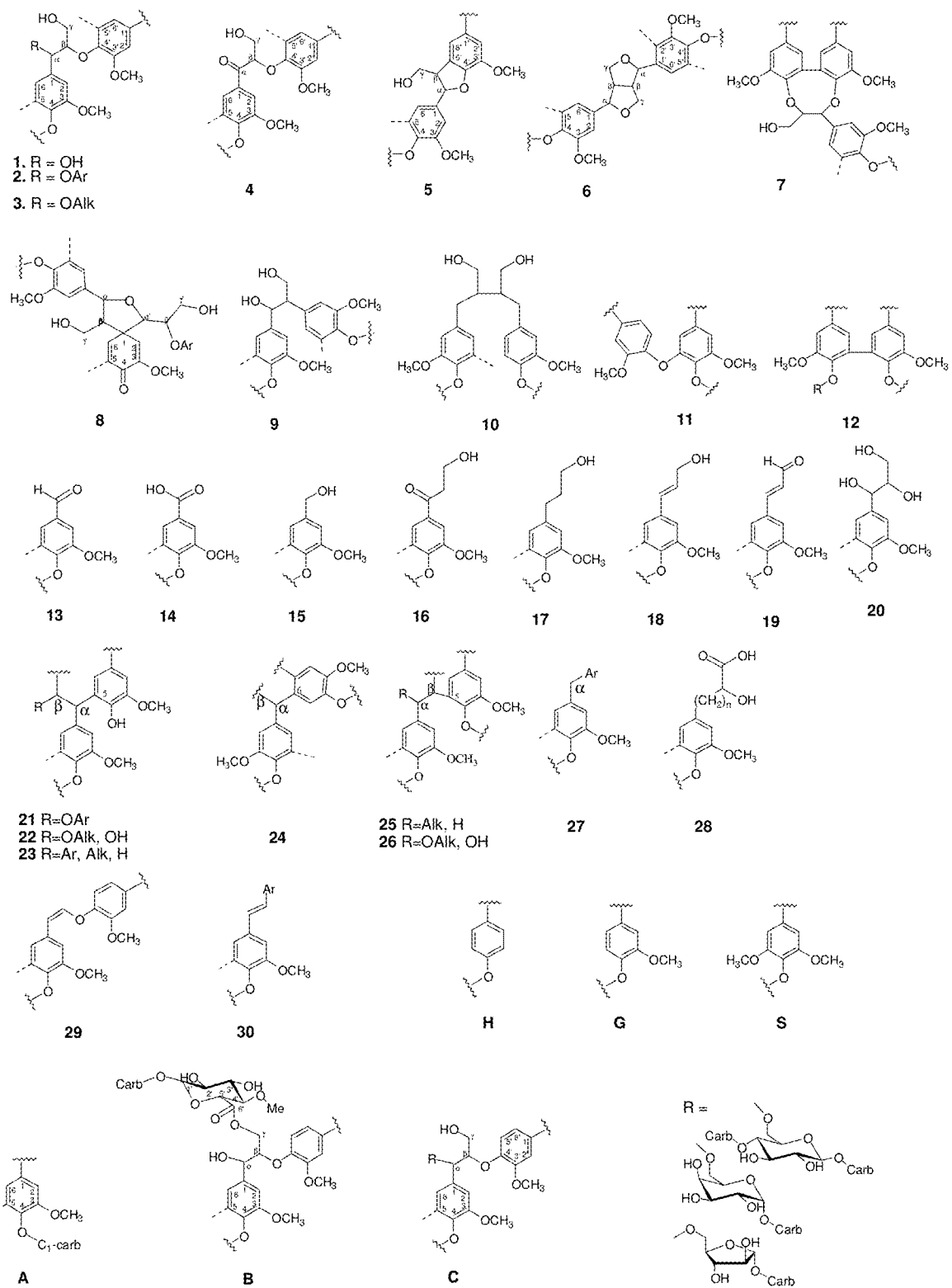

Lignins suitable for the disclosed processes include those having the following structures:

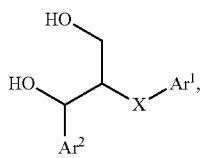

wherein X is a bond or O, and $Ar^1$ and $Ar^2$ are independently an aromatic ring in a lignin structural moiety. When $Ar^1$ and $Ar^2$ are lignin structural moieties, as shown in FIG. 4B, such as any of moieties 1-30, in some implementations, the lignin is one of moieties 2, 3, 4, 9, 10, 15, 16, 17, 18, or 20. When $Ar^1$ and $Ar^2$ are lignin structural moieties, as shown in FIG. 4B, the dashed line indicates a point of attachment to the fragment above. The skilled person understands that other undefined substituents may be selected from H, $CH_3$, or another lignin structural moiety. By way of example, one such fragment that has been observed has the formula:

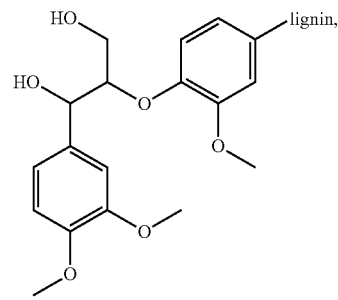

wherein "lignin" represents one or more additional phenyl propane units as described above. Unless specifically stated to the contrary, the use of an exemplary lignin fragment such as shown above is not intended to limit the disclosed processes, monomers, and polymers to the specifically depicted substitution pattern.

The large abundance of lignin makes it a unique material to be used as a source of other biodegradable polymers. It is understood that the present disclosure is not limited to any specific types of lignin. In certain aspects, the lignin used in the current disclosure can be obtained from natural lignin products or synthetic model lignin compounds. In still further aspects, lignin used in the current disclosure can be obtained from natural lignin products. It is understood that the natural lignin product can comprise softwood lignin, hardwood lignin, or a combination thereof. In certain aspects and without limitations, the natural lignin product can be obtained from agricultural residues (including corn stover and sugarcane bagasse), (2) dedicated energy crops, (3) wood residues (including sawmill and paper mill discards), and (4) municipal waste, and their constituent parts. In still further aspects, the natural lignin product can be obtained from the paper industry. In certain aspects, lignin used herein can comprise Kraft lignin and lignosulfonate. In certain implementations, the lignin can have a weight average molecular weight ($M_w$) from 10,000-25,000 g/mol, 25,000-50,000 g/mol, 10,000-50,000 g/mol, 1,000-10,000 g/mol, from 1,000-5,000 g/mol, from 1,000-2,000 g/mol, from 1,000-3,000 g/mol, from 1,000-4,000 g/mol, from 2,000-5,000 g/mol, from 2,000-4,000 g/mol, from 2,000-3,000 g/mol, from 3,000-5,000 g/mol, or from 4,000-5,000 g/mol. In certain implementations, the lignin can have a number average molecular weight (Mn) from 500-2,000 g/mol, from 500-1,000 g/mol, from 500-750 g/mol, from 750-1,000 g/mol, from 1,000-1,250 g/mol, from 1,000-1,500 g/mol, from 1,250-1,750 g/mol, from 1,250-1,500 g/mol, from 1,500-2,000 g/mol, from 1,500-1,750 g/mol, or from 1,750-2,000 g/mol. In certain implementations, the lignin can have polydispersity index (PDI Mw/Mn) from 1-5, from 2-5, from 3-5, from 4-5, from 1-1.5, from 1.5-2 from 1-2, from 1-3, from 1-4, from 2-5, from 2-4, from 2-3, from 2-2.5, from 2.5-3, from 3-5, from 3-4, from 3-3.5, from 3.5-4, from 4-4.5, from 4.5-5, or from 4-5. In certain implementations, the molecular weights can be determined using HPLC. In some implementations, the molecular weights can be determined using GPC.

Ionic-Lignin Polymer

Figure 2:
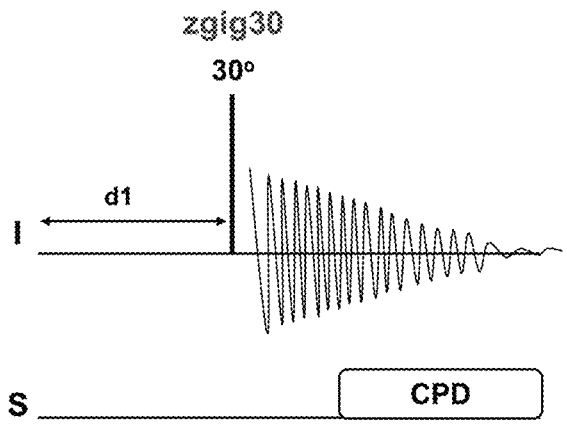
FIG. 2 depicts the NMR pulse sequence (zgig30) for inverse-gated proton decoupled $^{13}C$ NMR. The notations are as follows, d1: pre-scan delay; CPD: composite pulse decoupling; I and S: electron spin waveforms.

Lignin polymer is structurally modified in the presence of glycidyltrimethylammonium chloride under aqueous sodium hydroxide solution by incorporating quaternary ammonium groups with hydroxide counter ions. Subsequently, the modified ionic lignin polymer is utilized for capturing $CO_2$ from direct air and concentrated $CO_2$ sources, wherein the hydroxide ions react with $CO_2$, yielding bicarbonate. The structures of the developed polymers are confirmed using Fourier-transform infrared (FT-IR), $^1H$, $^{13}C$, and $^1H$-$^{13}C$ heteronuclear single quantum coherence (HSQC) NMR. The quantitative analysis of captured-$CO_2$ is conducted using inverse-gated proton decoupled $^{13}C$ NMR (FIG. 2). Afterward, the $CO_2$-captured modified ionic lignin polymer is utilized as a $CO_2$ source, facilitating a successful model reaction to synthesize cyclic carbonate from 1,3-butanediol in a newly designed reaction setup. Lastly, the effective recycling of modified ionic lignin polymer is also accomplished during the cyclization reaction under controlled heating in aqueous solution via controllable $CO_2$ release ↔ $CO_2$ capture.

Disclosed herein is a polymeric material comprising one or more fragments of Formula I:

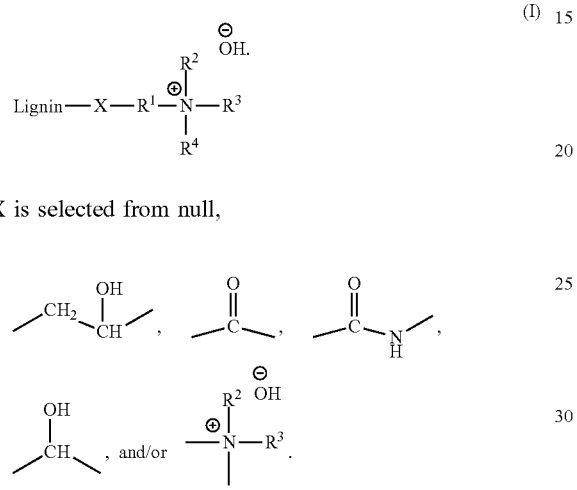

(I)

X is selected from null,

R$^1$ is selected from null or $C_1$-$C_{40}$ aliphatic group, wherein R$^1$ is optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl-)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy;

wherein when X is null, R$^1$ is not null, or wherein R$^1$ is null, X is not null;

wherein two of R$^2$, R$^3$, and R$^4$ may together form a 5 or 6-membered ring, or wherein R$^2$ and R$^3$, each and on each occasion, independent of the other, are selected from $C_1$-$C_{40}$ aliphatic group, wherein R$^4$ is selected from $C_1$-$C_{40}$ aliphatic group or lignin, and wherein each of R$^2$, R$^3$, and R$^4$ is independently and optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl-)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl-)($C_{3-10}$ cycloalkenyl), —($C_{0-10}$ alkyl)($C_{3-10}$ heterocycloalkenyl), halide, —C(O)—OH, or hydroxy.

In still further aspects, R$^1$ can be a $C_1$-$C_{40}$ aliphatic group selected from $C_1$-$C_{20}$ alkylene, $C_1$-$C_{20}$ alkenylene, $C_1$-$C_6$ alkynylene, —($C_{0-10}$ alkylene)($C_6$-$C_{14}$ aryl), or —($C_{0-10}$ alkyl-ene)(aryl-N═N-aryl group),

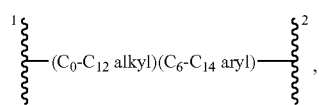

wherein squiggly line 1 is a connection to X, and squiggly line 2 is a connection to N+, wherein R$^1$ is optionally substituted one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl) ($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy.

In some exemplary and unlimiting aspects, the polymeric material disclosed herein can comprise one or more fragments of formula (II)

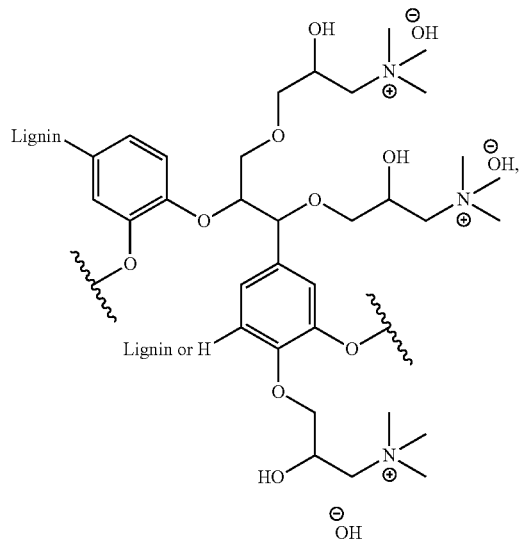

(II)

wherein ⌇ is —H, —CH$_3$, or further lignin.

While in other aspects, the polymeric material disclosed herein can comprise one or more fragments of formula (III)

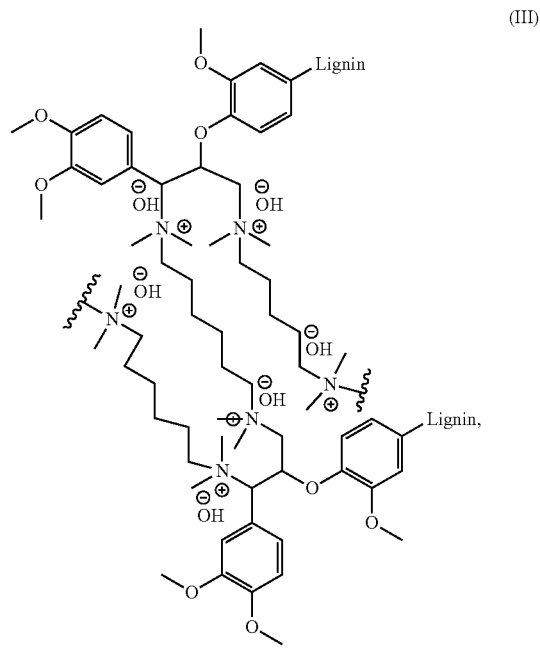

(III)

wherein ⌇ is a null or a further lignin.

In some aspects, disclosed herein is a polymeric material containing one or more fragments of Formula IV:

[Formula (IV)]

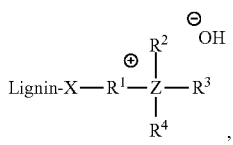

wherein:
Z is independently P or N;
X is independently:
null

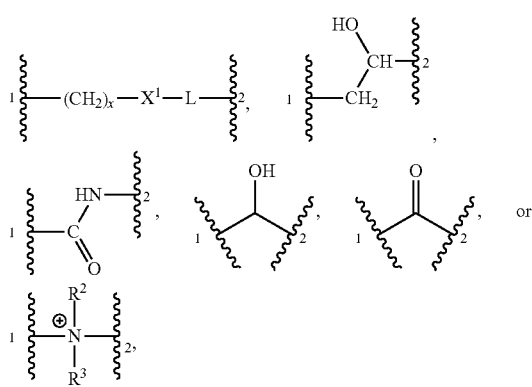

wherein wavy line 1 represents the point of attachment to lignin, and wavy line 2 represents the point of attachment to $R^1$;
$X^1$ is null, S, O, NH, or a 1,2,3, triazole;
x is 0-8;
L is a $C_{0-10}$ aliphatic group, for example null, $C_{1-10}$ alkylene, or $C_{1-10}$ heteroalkylene;
$R^1$ is selected from null or $C_1$-$C_{10}$ aliphatic group, wherein $R^1$ is optionally substituted with one or more of $C_{1-10}$ alkyl, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)COOH, —($C_{0-10}$ alkyl)N($C_{1-4}$ alkyl)$_3$, or —($C_{0-10}$ alkyl)—OH;
at least one of X and $R^1$ is not null;
any two or more of $R^1$, $R^2$, $R^3$, and $R^4$ may together form a ring,
$R^2$, $R^3$, and $R^4$ are in each case independently selected from $C_1$-$C_{10}$ aliphatic group,
each of $R^1$, $R^2$, $R^3$, and $R^4$ is independently and optionally substituted with one or more of a lignin fragment, $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl-)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), —($C_{0-10}$ alkyl)COOH, —($C_{0-10}$ alkyl)N($C_{1-4}$ alkyl)$_3$, or —($C_{0-10}$ alkyl)—OH;
wherein when Z is a $sp^2$ hybridized nitrogen, then $R^4$ is optionally null.

In some implementations of Formula (IV), $R^1$, $R^2$, and $R^3$ together form a heteroaryl or heterocyclic ring, for example having the formula:

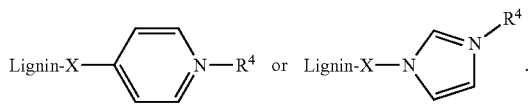

The skilled person appreciates that for the above exemplary heteroaryls, when $R^4$ is null the depicted ring will be electrically neutral, whereas when $R^4$ is not null, the depicted ring will bear a cationic charge.

In some implementations of Formula (IV), $R^1$, $R^2$, and $R^3$ together form a heteroaryl or heterocyclic ring, wherein said ring is further substituted by $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl-)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl-)($C_{3-10}$ cycloalkenyl), —($C_{0-10}$ alkyl)($C_{3-10}$ heterocycloalkenyl), —($C_{0-10}$ alkyl)COOH, —($C_{0-10}$ alkyl-)N($C_{1-4}$ alkyl)$_3$, or —($C_{0-10}$ alkyl)—OH. In some implementations said heteroaryl group can be an N-alkyl pyridinium hydroxide, e.g.,

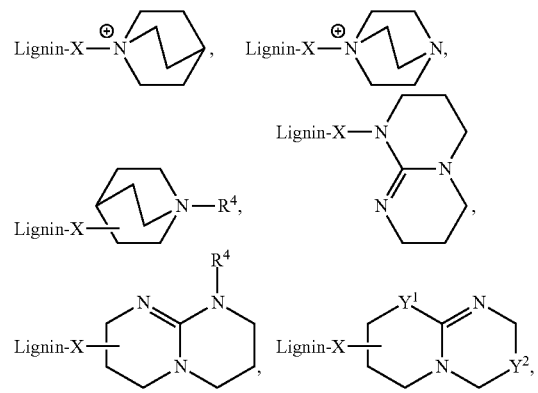

In some implementations of Formula (IV), $R^1$, $R^2$, $R^3$, and/or $R^4$ together form a heterocyclic ring system, for example having the formula:

wherein $Y^1$ is null, $CH_2$, or $CH_2CH_2$, and $Y^1$ is null, $CH_2$, or $CH_2CH_2$.

In further implementations of Formula (IV), Z is P and each of $R^2$, $R^3$, and $R^4$ are $C_{1-10}$ alkyl, optionally two or more of $R^2$, $R^3$, and $R^4$ together forming a ring. In some implementations, Z is P and each of $R^2$, $R^3$, and $R^4$ are methyl, ethyl, n-propyl, isopropyl, n-butyl, isobutyl, n-pentyl, or n-hexyl. In some implementations, Z is P and $R^2$ and $R^3$ are methyl and $R^4$ is ethyl, n-propyl, isopropyl, n-butyl, isobutyl, n-pentyl, or n-hexyl. In some implementations Z is P and $R^2$, $R^3$, and $R^4$ are the same, for example $R^2$, $R^3$, and $R^4$ are each methyl, ethyl, or n-propyl.

In some implementations X is:

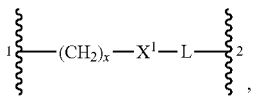

wherein x is 2 or 3, and $X^1$ is S In certain implementations, X is 1,2,3-triazole, e.g., the product of a click-chemistry cycloaddition:

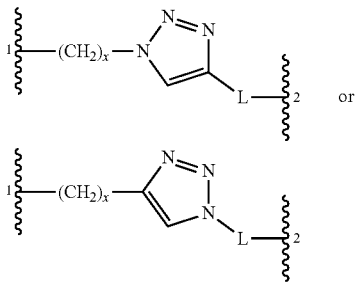

wherein x is 1, 2, or 3.

In some implementations of Formula (IV), $R^4$ can be $C_{1-10}$ aliphatic-lignin. In some implementations of Formula (IV) $R^4$ can have the formula $C_{1-10}$ aliphatic-L*, wherein L* has the formula:

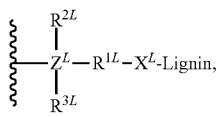

$X^L$ is independently:
null

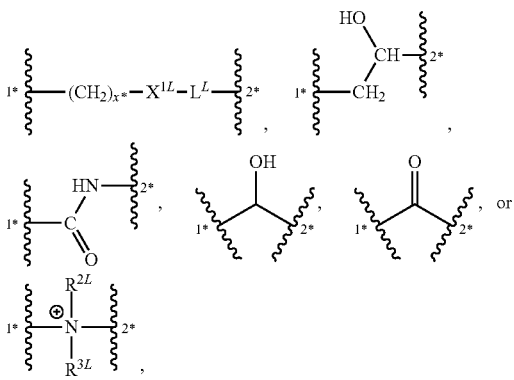

wherein wavy line 1* represents the point of attachment to lignin, and wavy line 2* represents the point of attachment to the $R^{1L}$ group
$X^{1L}$ is null, S, O, NH, or a 1,2,3,-triazole;
x* is 0-8;
$L^L$ is a $C_{0-10}$ aliphatic group, e.g. null, $C_{1-10}$ alkylene, or $C_{1-10}$ heteroalkylene;
$R^{1L}$ is selected from null or $C_1$-$C_{10}$ aliphatic group, wherein $R^{1L}$ is optionally substituted with one or more of $C_{1-10}$ alkyl, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl) COOH, —($C_{0-10}$ alkyl)N($C_{1-4}$ alkyl)$_3$, or —($C_{0-10}$ alkyl)—OH;
at least one of XL and $R^{1L}$ is not null;
any two or more of $R^{1L}$, $R^{2L}$, and $R^{3L}$ may together form a ring;
$R^{2L}$ and $R^{3L}$ are in each case independently selected from $C_1$-$C_{10}$ aliphatic group,
each of $R^{1L}$, $R^{2L}$, and $R^{3L}$ is independently and optionally substituted with one or more of a lignin fragment, $C_{1-10}$ alkyl, $C_{1-10}$ alkoxy, $C_{1-10}$ heteroalkyl, —($C_{0-10}$ alkyl) ($C_{6-14}$ aryl), —($C_{0-10}$ alkyl-)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl) ($C_{3-10}$ heterocycloalkenyl), —($C_{0-10}$ alkyl)COOH, —($C_{0-10}$ alkyl)N($C_{1-4}$ alkyl)$_3$, or —($C_{0-10}$ alkyl)—OH;
wherein when $Z^L$ is a sp$^2$ hybridized nitrogen, then $R^{3L}$ is optionally null.

In some aspects, disclosed herein is a polymeric material containing one or more fragments of Formula V:

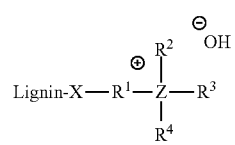
[Formula (V)]

wherein:
Z is N or P;
X is:
X is independently:
null

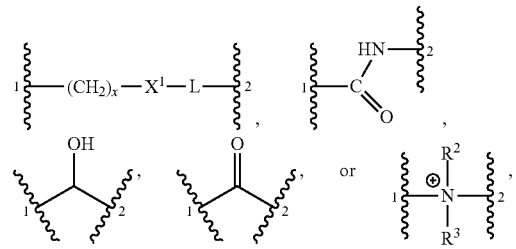

wherein wavy line 1 represents the point of attachment to lignin, and wavy line 2 represents the point of attachment to $R^1$; in certain preferred implementations X is:

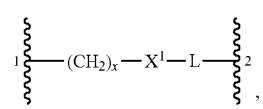

$X^1$ is null, S, O, NH, or a 1,2,3,-triazole;
x is 0-8;
L is a $C_{0-10}$ aliphatic group, for example null, $C_{1-10}$ alkylene, or $C_{1-10}$ heteroalkylene;
$R^1$ is selected from null or $C_1$-$C_{10}$ aliphatic group, wherein $R^1$ is optionally substituted with one or more of $C_{1-10}$ alkyl, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)COOH, —($C_{0-10}$ alkyl)N($C_{1-4}$ alkyl)$_3$, or —($C_{0-10}$ alkyl)—OH;

at least one of X and $R^1$ is not null;

any two or more of $R^1$, $R^2$, $R^3$, and $R^4$ may together form a ring, $R^2$, $R^3$, and $R^4$ are in each case independently selected from $C_1$-$C_{10}$ aliphatic group, each of $R^1$, $R^2$, $R^3$, and $R^4$ is independently and optionally substituted with one or more of a lignin fragment, $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl-)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), —($C_{0-10}$ alkyl)COOH, —($C_{0-10}$ alkyl)N($C_{1-4}$ alkyl)$_3$, or —($C_{0-10}$ alkyl)—OH;

wherein when Z is a sp$^2$ hybridized nitrogen, then $R^4$ is optionally null.

In some implementations of Formula (V), $R^1$, $R^2$, and $R^3$ together form a heteroaryl or heterocyclic ring, for example having the formula:

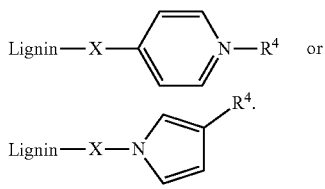

The skilled person appreciates that for the above heteroaryls, when $R^4$ is null the depicted ring will be electrically neutral, whereas when $R^4$ is not null, the depicted ring will bear a cationic charge.

In some implementations of Formula (V), $R^1$, $R^2$, and $R^3$ together form a heteroaryl or heterocyclic ring, wherein said ring is further substituted by $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl-)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl-)($C_{3-10}$cycloalkenyl), —($C_{0-10}$ alkyl)($C_{3-10}$ heterocycloalkenyl), —($C_{0-10}$ alkyl)COOH, —($C_{0-10}$ alkyl-)N($C_{1-4}$ alkyl)$_3$, or —($C_{0-10}$ alkyl)—OH. In some implementations said heteroaryl group can be an N-alkyl pyridinium hydroxide, e.g.,

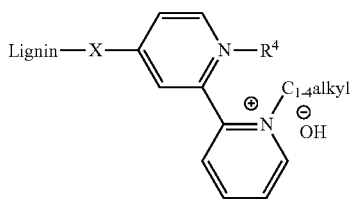

In some implementations of Formula (V), $R^1$, $R^2$, $R^3$, and/or $R^4$ together form a heterocyclic ring system, for example having the formula:

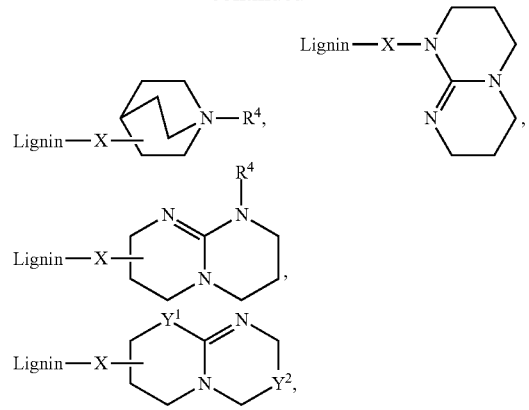

wherein $Y^1$ is null, $CH_2$, or $CH_2CH_2$, and $Y^1$ is null, $CH_2$, or $CH_2CH_2$.

In further implementations of Formula (V), Z is P and each of $R^2$, $R^3$, and $R^4$ are $C_{1-10}$ alkyl, optionally two or more of $R^2$, $R^3$, and $R^4$ together forming a ring. In some implementations, Z is P and each of $R^2$, $R^3$, and $R^4$ are methyl, ethyl, n-propyl, isopropyl, n-butyl, isobutyl, n-pentyl, or n-hexyl. In some implementations, Z is P and $R^2$ and $R^3$ are methyl and $R^4$ is ethyl, n-propyl, isopropyl, n-butyl, isobutyl, n-pentyl, or n-hexyl. In some implementations Z is P and $R^2$, $R^3$, and $R^4$ are the same, for example $R^2$, $R^3$, and $R^4$ are each methyl, ethyl, or n-propyl.

In some implementations of Formula (V) X is:

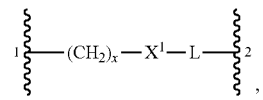

wherein x is 2 or 3, and $X^1$ is S In certain implementations of Formula (V), X is 1,2,3-triazole, e.g., the product of a click-chemistry cycloaddition:

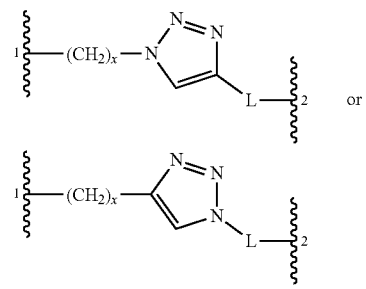

wherein x is 1, 2, or 3.

In some implementations of Formula (V), $R^4$ can be $C_{1-10}$ aliphatic-lignin. In some implementations $R^4$ can have the formula $C_{1-10}$ aliphatic-L*, wherein L* has the formula:

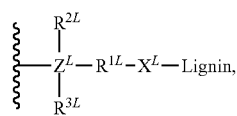

$X^L$ is independently:
null

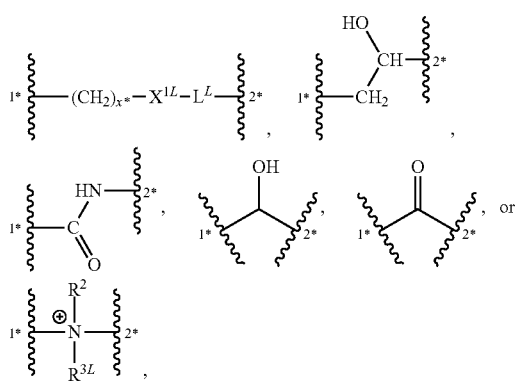

wherein wavy line 1* represents the point of attachment to lignin, and wavy line 2* represents the point of attachment to the $R^{1L}$ group $X^{1L}$ is null, S, O, NH, or a 1,2,3,-triazole;

x* is 0-8;

$L^L$ is a $C_{0-10}$ aliphatic group, e.g. null, $C_{1-10}$ alkylene, or $C_{1-10}$ heteroalkylene;

$R^{1L}$ is selected from null or $C_1$-$C_{10}$ aliphatic group, wherein $R^{1L}$ is optionally substituted with one or more of $C_{1-10}$ alkyl, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)COOH, —($C_{0-10}$ alkyl)N($C_{1-4}$ alkyl)$_3$, or —($C_{0-10}$ alkyl)—OH;

at least one of $X^L$ and $R^{1L}$ is not null;

any two or more of $R^{1L}$, $R^{2L}$, and $R^{3L}$ may together form a ring, $R^{2L}$ and $R^{3L}$ are in each case independently selected from $C_1$-$C_{10}$ aliphatic group, each of $R^{1L}$, $R^{2L}$, and $R^{3L}$ is independently and optionally substituted with one or more of a lignin fragment, $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl-)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), —($C_{0-10}$ alkyl)COOH, —($C_{0-10}$ alkyl)N($C_{1-4}$ alkyl)$_3$, or —($C_{0-10}$ alkyl)—OH;

wherein when $Z^L$ is a sp$^2$ hybridized nitrogen, then $R^{3L}$ is optionally null.

In the aspects disclosed herein, the polymeric material is a carbon dioxide-capturing material. The polymeric material disclosed herein can capture the carbon dioxide from any gas stream. In certain aspects, the gas stream comprising carbon dioxide can be a waste gas from manufacturing, automotive vehicles emissions, emissions from the electric grid, pure carbon dioxide stream, carbon monoxide, nitrous oxide, sulfur dioxide, ozone, a stream of chlorofluorocarbon gases, or any combination thereof.

In still further aspects, it is understood that the carbon dioxide captured by the polymer material disclosed herein can be reversible. In such aspects, the captured carbon dioxide can be released by the polymer material. In certain aspects, the release of carbon dioxide by the polymeric material does not substantially change the composition of the properties of the polymeric material itself. In yet other aspects, the composition and/or properties of the polymeric material can be changed upon release of the captured carbon dioxide.

In still further aspects, the polymeric material is recyclable. In this context, the term recyclable means that the polymeric material can be reused to capture carbon dioxide after previously captured carbon dioxide is released. In certain aspects, the polymeric material disclosed herein can be used as a storage device for carbon dioxide.

It is also understood that in certain aspects, the polymeric material can be recycled to form other materials if needed.

Also disclosed herein are articles comprising the polymeric materials disclosed herein. In still further aspects, the article can be any article that can be used to capture carbon dioxide if needed. In certain aspects, the article is a film, a filter, or membrane, an absorbent, or any combination thereof. In still further aspects, the articles can be recycled for continuous use of carbon dioxide from the gas stream.

Also disclosed herein is a method comprising reacting lignin-containing material with a nitrogen-containing material to form a polymeric material comprising one or more fragments of formula (I)

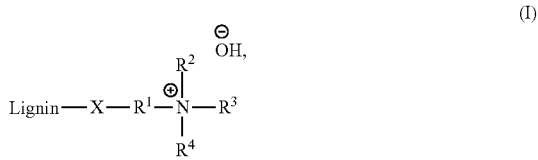

(I)

wherein X is selected from
null,

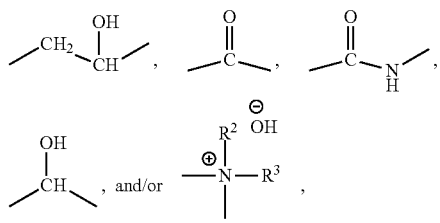

wherein $R^1$ is selected from null or $C_1$-$C_{40}$ aliphatic group, wherein $R^1$ is optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl-)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy; wherein when X is null, $R^1$ is not null, or wherein $R^1$ is null, X is not null; wherein two of $R^2$, $R^3$, and $R^4$ may together form a 5 or 6-membered ring, or wherein $R^2$ and $R^3$, each and on each occasion, independent of the other, are selected from $C_1$-$C_{40}$ aliphatic group, wherein $R^4$ is selected from $C_1$-$C_{40}$ aliphatic group or lignin, and wherein each of $R^2$, $R^3$, and $R^4$ is independently and optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl-)($C_{1-13}$ heteroaryl), —($C_{0-10}$ alkyl)($C_{6-14}$ aryloxy), —($C_{0-10}$ alkyl) ($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy.

In such methods, $R^1$ can also be a $C_1$-$C_{40}$ aliphatic group selected from $C_1$-$C_{20}$ alkylene, $C_1$-$C_{20}$ alkenylene, $C_1$-$C_6$ alkynylene, —($C_{0-10}$ alkylene)($C_6$-$C_{14}$ aryl), or —($C_{0-10}$ alkyl-ene)(aryl-N=N-aryl group),

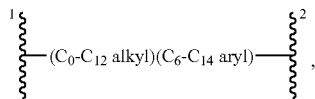

wherein squiggly line 1 is a connection to X, and squiggly line 2 is a connection to $N^+$, wherein $R^1$ is optionally substituted one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy.

Any of the polymeric materials disclosed above can be formed. For example, and without limitations, the polymeric material of formula (II) or formula (III) can be formed.

In still further aspects, the disclosed methods comprise the nitrogen-containing material having a formula

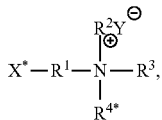

wherein Y is a counter ion that is different from OH, and wherein X* is selected from

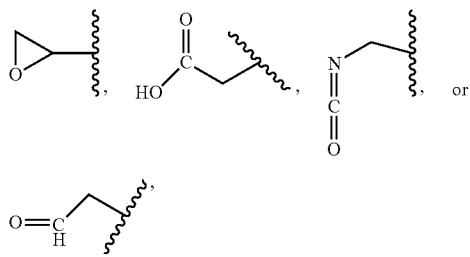

and wherein $R^{4*}$ is an $C_1$-$C_{40}$ aliphatic group.

In yet still further aspects, the nitrogen-containing material is selected from

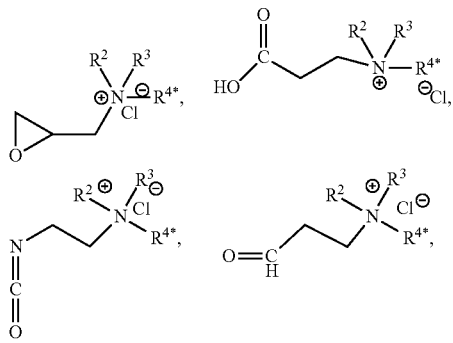

or $R^2R^3N$—$R^1$—$NR^2R^3$.

An exemplary route of forming the one or more fragments of formula (II) is shown below in FIG. 3A.

An exemplary route of forming the one or more fragments of formula (III) is shown below.

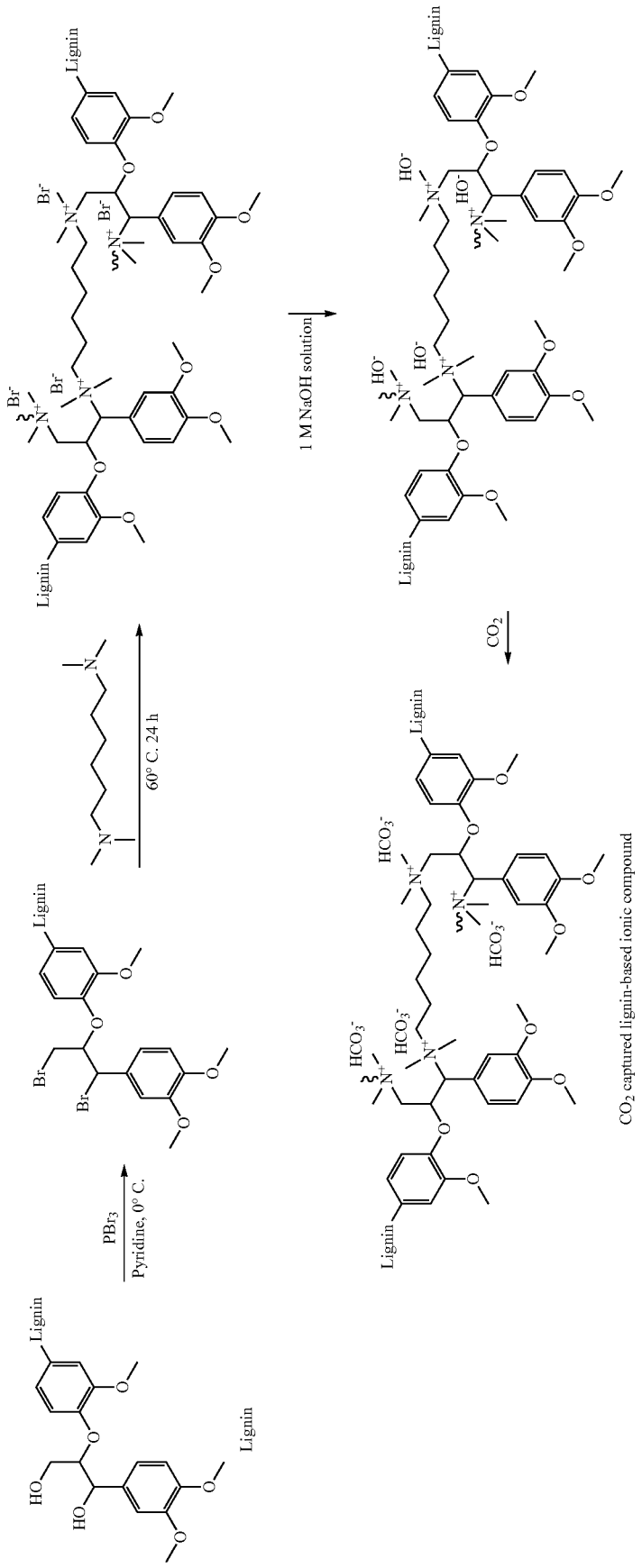

Also disclosed herein are methods of making a lignin material including one or more fragments having the formula (V):

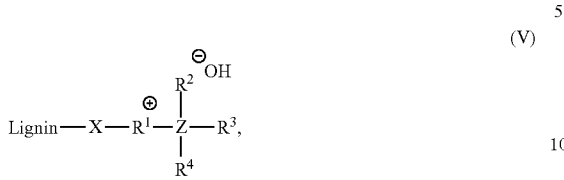

(V)

wherein X, $R^1$, $R^2$, $R^3$, and $R^4$ are as defined above for Formula (V).
by reacting a lignin containing material with a compound having the formula:

$R^{LG}$—$(CH_2)_{x*}$—$R^u$, wherein
x* is 0-8,
$R^{LG}$ is a leaving group, e.g., a halide like $C_l$, Br, or I, or a sulfonate like OMs or Ots, and $R^u$ is CH=$CH_2$, C≡CH, or $N_3$.
to provide an activated lignin-containing material having the formula:

Lignin$(CH_2)_{x*}$—$R^u$ and reacting the activated lignin-containing material with a compound having the formula (Q):

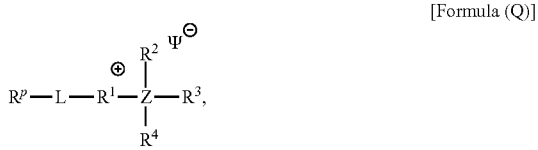

[Formula (Q)]

wherein:
ψ is an anion other than hydroxide,
when $R^u$ is CH=$CH_2$ the $R^p$ is SH;
when $R^u$ is C≡CH, the $R^p$ is $N_3$; and
when $R^u$ is $N_3$, the $R^p$ is C≡CH; and
subjecting the lignin-containing material to ion exchange conditions to replace W with hydroxide (e.g., treat with sodium hydroxide).
In other implementations W is hydroxide.
In further implantations the activated lignin is combined with aqeuous hydroxide (e.g., aqueous sodium hydroxide) and reacted with the compound of Formula (Q).
Also disclosed are lignin materials produced by said process.
The polymeric material formed by the disclosed methods can be any of the polymeric materials disclosed above. In such aspects, the polymeric material can be a carbon dioxide-capturing material. In further aspects, the polymeric material can release, under the desired conditions, captured carbon dioxide to return to its initial state and can be reused for the following capturing process.
In still further aspects, the method can further comprise forming an article from the polymeric material. Such articles can comprise a film, a textile, a filter, a membrane, an absorbent, or any combination thereof.
Also disclosed herein is a method of capturing a carbon dioxide comprising exposing an article comprising any of the disclosed herein polymeric materials to a gas stream comprising the carbon dioxide; and reacting the polymeric material with the carbon dioxide to form a compound comprising one or more fragments of formula (VI),

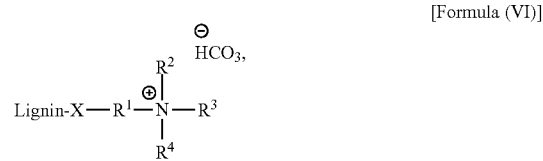

[Formula (VI)]

wherein X is selected from
null

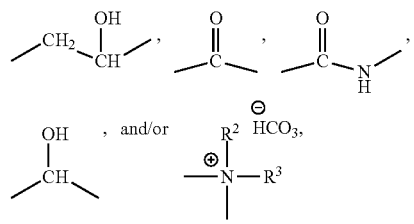

wherein $R^1$ is selected from null or $C_1$-$C_{40}$ aliphatic group, wherein $R^1$ is optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy; wherein when X is null, $R^1$ is not null, or wherein $R^1$ is null, X is not null; wherein two of $R^2$, $R^3$, and $R^4$ may together form a 5 or 6-membered ring, or wherein $R^2$, and $R^3$, each and on each occasion, independent of the other, are selected from $C_1$-$C_{40}$ aliphatic group, wherein $R^4$ is selected from $C_1$-$C_{40}$ aliphatic group or lignin, and wherein each of $R^2$, $R^3$, and $R^4$ is independently and optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl-)($C_{3-10}$ cycloalkenyl), —($C_{0-10}$ alkyl)($C_{3-10}$ heterocycloalkenyl), halide, —C(O)—OH, or hydroxy, thereby removing the carbon dioxide from the gas stream.
In still further aspects of Formula (VI), the $R^1$ can be a $C_1$-$C_{40}$ aliphatic group selected from $C_1$-$C_{20}$ alkylene, $C_1$-$C_{20}$ alkenylene, $C_1$-$C_6$ alkynylene, —($C_{0-10}$ alkylene)($C_6$-$C_{14}$ aryl), or —($C_{0-10}$alkylene)(aryl-N=N-aryl group),

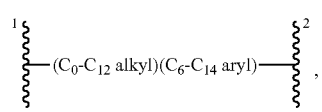

wherein squiggly line 1 is a connection to X, and squiggly line 2 is a connection to $N^+$, wherein $R^1$ is optionally substituted one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl) ($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy.

Figures 6A, 6B, 6C:
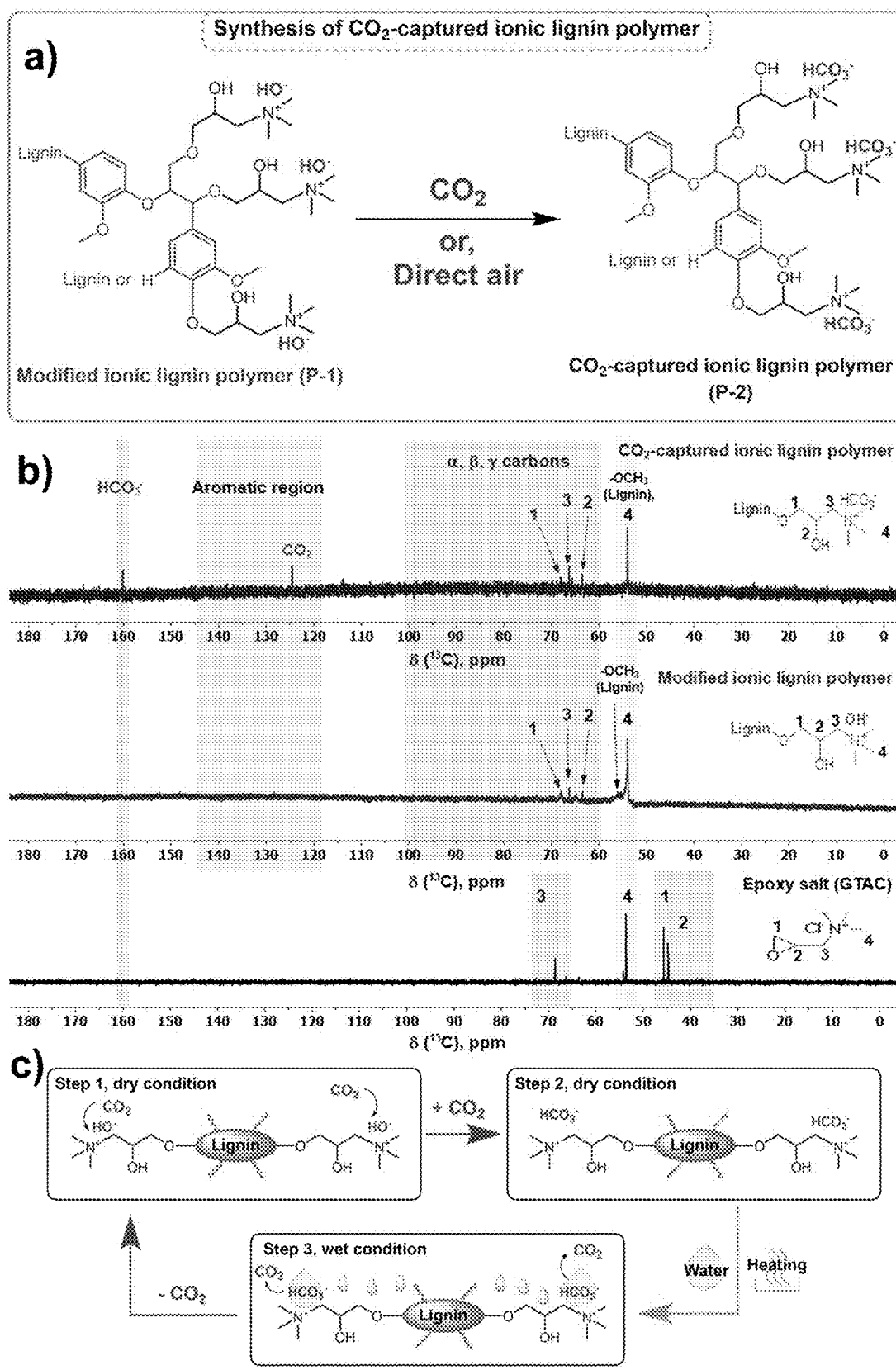
FIGS. 6A-6C depict a synthesis of $CO_2$-captured ionic lignin polymer (P-2) from concentrated carbon dioxide source or direct air capture (FIG. 6A); a $^{13}C$ NMR spectra of epoxy salt (Glycidyl trimethylammonium chloride, GTAC), modified ionic lignin polymer (P-1) and $CO_2$-captured ionic lignin polymer (P-2) (FIG. 6B); a proposed mechanism on the moisture driven chemical alterations of quaternary ammonium cation containing lignin polymers with hydroxide, bicarbonate, and carbonate ions ($OH^-$, $HCO_3^-$, and $CO_3^{2-}$) (FIG. 6C).
Figure 7:
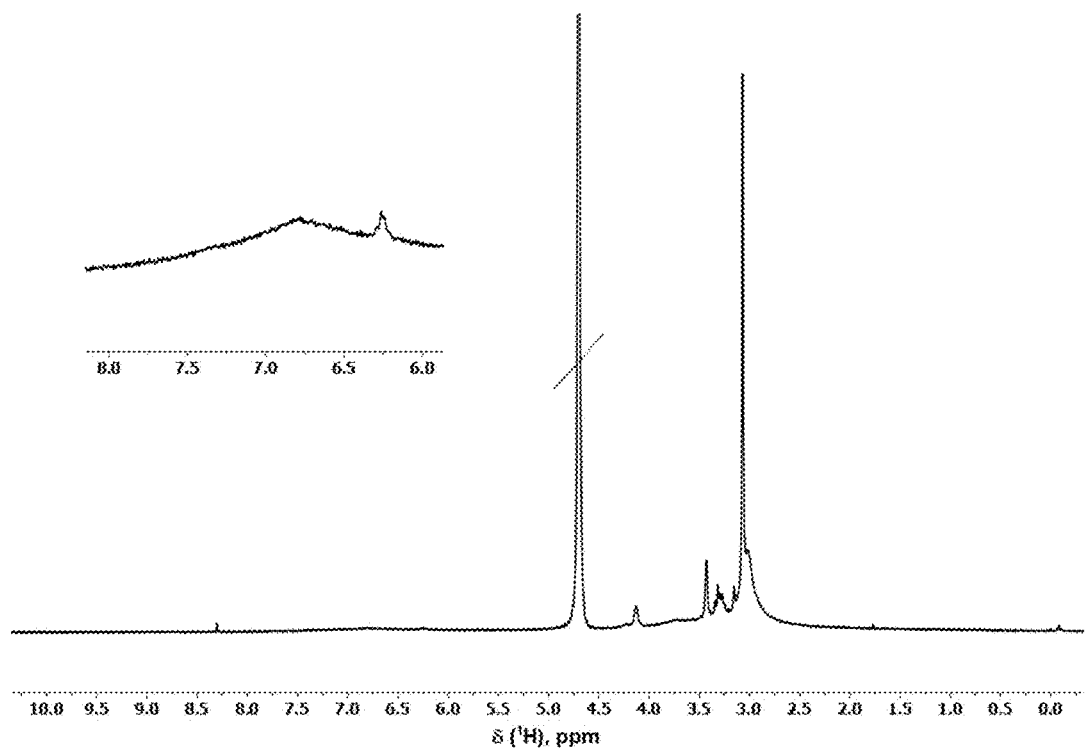
FIG. 7 depicts a $^1H$ NMR spectrum of $CO_2$-captured modified ionic lignin in $D_2O$.

An exemplary route of capturing carbon dioxide is shown in FIG. 6A.

Also disclosed herein is a method of capturing a carbon dioxide comprising exposing an article comprising any of the disclosed herein polymeric materials to a gas stream comprising the carbon dioxide; and reacting the polymeric material with the carbon dioxide to form a compound comprising one or more fragments of formula (VII),

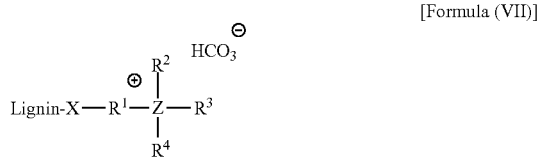

[Formula (VII)]

wherein:
Z is independently P or N;
X is independently:
null

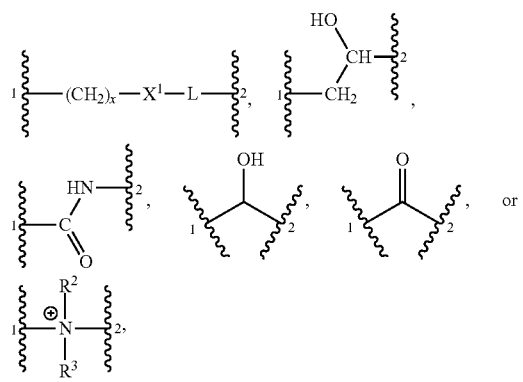

wherein wavy line 1 represents the point of attachment to lignin, and wavy line 2 represents the point of attachment to $R^1$;
$X^1$ is null, S, O, NH, or a 1,2,3,-triazole;
x is 0-8;
L is a $C_{0-10}$ aliphatic group, for example null, $C_{1-10}$ alkylene, or $C_{1-10}$ heteroalkylene
$R^1$ is selected from null or $C_1$-$C_{10}$ aliphatic group, wherein $R^1$ is optionally substituted with one or more of $C_{1-10}$ alkyl, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl) COOH, —($C_{0-10}$ alkyl)N($C_{1-4}$ alkyl)$_3$, or —($C_{0-10}$ alkyl)—OH;
at least one of X and $R^1$ is not null;
any two or more of $R^1$, $R^2$, $R^3$, and $R^4$ may together form a ring,
$R^2$, $R^3$, and $R^4$ are in each case independently selected from $C_1$-$C_{10}$ aliphatic group,
each of $R^1$, $R^2$, $R^3$, and $R^4$ is independently and optionally substituted with one or more of a lignin fragment, $C_{1-10}$ alkyl, $C_{1-10}$ alkoxy, $C_{1-10}$ heteroalkyl, —($C_{0-10}$ alkyl) ($C_{6-14}$ aryl), —($C_{0-10}$ alkyl-)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl) ($C_{3-10}$ heterocycloalkenyl), —($C_{0-10}$ alkyl)COOH, —($C_{0-10}$ alkyl)N($C_{1-4}$ alkyl)$_3$, or —($C_{0-10}$ alkyl)—OH;
wherein when Z is a $sp^2$ hybridized nitrogen, then $R^4$ is optionally null.

In some implementations of Formula (VII), $R^1$, $R^2$, and $R^3$ together form a heteroaryl or heterocyclic ring, for example having the formula:

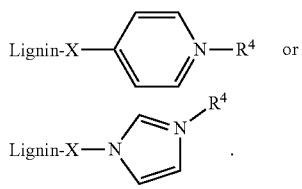

The skilled person appreciates that for the above exemplary heteroaryls, when $R^4$ is null the depicted ring will be electrically neutral, whereas when $R^4$ is not null, the depicted ring will bear a cationic charge.

In some implementations of Formula (VII), $R^1$, $R^2$, and $R^3$ together form a heteroaryl or heterocyclic ring, wherein said ring is further substituted by $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl) ($C_{1-13}$ heteroaryl), —($C_{0-10}$ alkyl-)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl-)($C_{3-10}$ cycloalkenyl), —($C_{0-10}$ alkyl)($C_{3-10}$ heterocycloalkenyl), —($C_{0-10}$ alkyl)COOH, —($C_{0-10}$ alkyl-)N($C_{1-4}$ alkyl)$_3$, or —($C_{0-10}$ alkyl)—OH. In some implementations said heteroaryl group can be an N-alkyl pyridinium bicarbonate, e.g.,

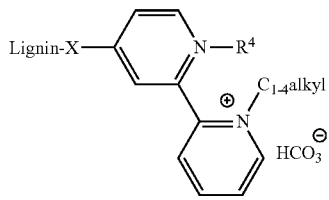

In some implementations of Formula (VII), $R^1$, $R^2$, $R^3$, and/or $R^4$ together form a heterocyclic ring system, for example having the formula:

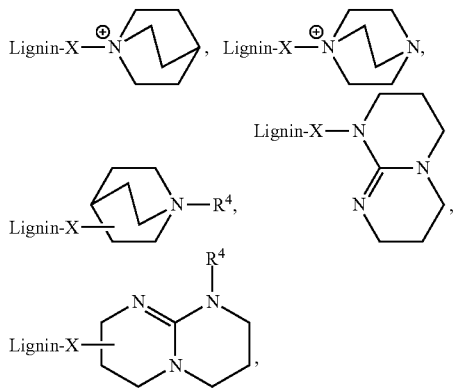

-continued

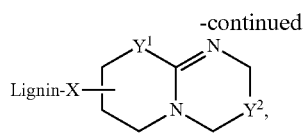

wherein $Y^1$ is null, $CH_2$, or $CH_2CH_2$, and $Y^1$ is null, $CH_2$, or $CH_2CH_2$.

In further implementations of Formula (VII), Z is P and each of $R^2$, $R^3$, and $R^4$ are $C_{1-10}$ alkyl, optionally two or more of $R^2$, $R^3$, and $R^4$ together forming a ring. In some implementations, Z is P and each of $R^2$, $R^3$, and $R^4$ are methyl, ethyl, n-propyl, isopropyl, n-butyl, isobutyl, n-pentyl, or n-hexyl. In some implementations, Z is P and $R^2$ and $R^3$ are methyl and $R^4$ is ethyl, n-propyl, isopropyl, n-butyl, isobutyl, n-pentyl, or n-hexyl. In some implementations Z is P and $R^2$, $R^3$, and $R^4$ are the same, for example $R^2$, $R^3$, and $R^4$ are each methyl, ethyl, or n-propyl.

In some implementations of Formula (VII) X is:

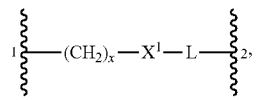

wherein x is 2 or 3, and $X^1$ is S In certain implementations of Formula (VII), X is 1,2,3-triazole, e.g., the product of a click-chemistry cycloaddition:

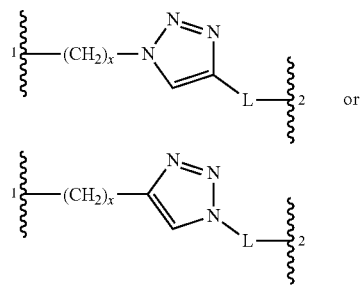

wherein x is 1, 2, or 3.

In some implementations of Formula (VII), $R^4$ can be $C_{1-10}$ aliphatic-lignin. In some implementations of Formula (VII) $R^4$ can have the formula $C_{1-10}$ aliphatic-L*, wherein L* has the formula:

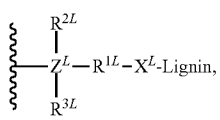

$X^L$ is independently:
null

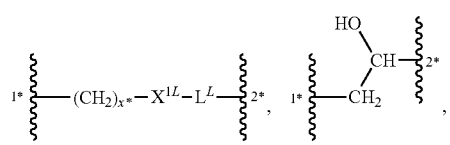

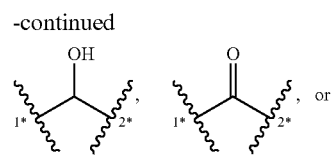

wherein wavy line 1* represents the point of attachment to lignin, and wavy line 2* represents the point of attachment to the $R^{1L}$ group $X^{1L}$ is null, S, O, NH, or a 1,2,3,-triazole;

x* is 0-8;

$L^L$ is a $C_{0-10}$ aliphatic group, e.g. null, $C_{1-10}$ alkylene, or $C_{1-10}$ heteroalkylene;

$R^{1L}$ is selected from null or $C_1$-$C_{10}$ aliphatic group, wherein $R^{1L}$ is optionally substituted with one or more of $C_{1-10}$ alkyl, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)COOH, —($C_{0-10}$ alkyl)N($C_{1-4}$ alkyl)$_3$, or —($C_{0-10}$ alkyl)—OH;

at least one of $X^L$ and $R^{1L}$ is not null;

any two or more of $R^{1L}$, $R^{2L}$, and $R^{3L}$ may together form a ring, $R^{2L}$ and $R^{3L}$ are in each case independently selected from $C_{1-10}$ aliphatic group, each of $R^{1L}$, $R^{2L}$, and $R^3$ L is independently and optionally substituted with one or more of a lignin fragment, $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl-)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), —($C_{0-10}$ alkyl)COOH, —($C_{0-10}$ alkyl)N($C_{1-4}$ alkyl)$_3$, or —($C_{0-10}$ alkyl)—OH;

wherein when $Z^L$ is a sp$^2$ hybridized nitrogen, then $R^{3L}$ is optionally null.

Also disclosed herein is a method of capturing a carbon dioxide comprising exposing an article comprising any of the disclosed herein polymeric materials to a gas stream comprising the carbon dioxide; and reacting the polymeric material with the carbon dioxide to form a compound comprising one or more fragments of formula (VIII),

[Formula (VIII)]

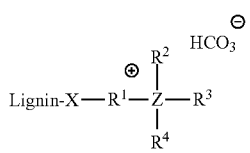

wherein:

Z is N or P;

X is:

X is independently:

null,

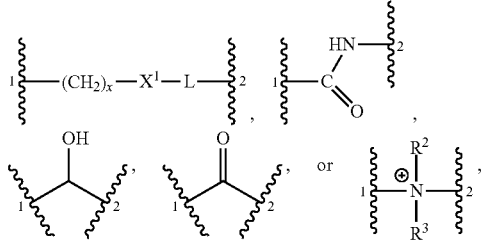

wherein wavy line 1 represents the point of attachment to lignin, and wavy line 2 represents the point of attachment to $R^1$; in certain preferred implementations X is:

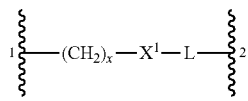

$X^1$ is null, S, O, NH, or a 1,2,3,-triazole;
x is 0-8;
L is a $C_{0-10}$ aliphatic group, for example null, $C_{1-10}$ alkylene, or $C_{1-10}$ heteroalkylene
$R^1$ is selected from null or $C_1$-$C_{10}$ aliphatic group, wherein $R^1$ is optionally substituted with one or more of $C_{1-10}$ alkyl, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl) ($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)COOH, —($C_{0-10}$ alkyl)N($C_{1-4}$ alkyl)$_3$, or —($C_{0-10}$ alkyl)—OH;
at least one of X and $R^1$ is not null;
any two or more of $R^1$, $R^2$, $R^3$, and $R^4$ may together form a ring,
$R^2$, $R^3$, and $R^4$ are in each case independently selected from $C_1$-$C_{10}$ aliphatic group,
each of $R^1$, $R^2$, $R^3$, and $R^4$ is independently and optionally substituted with one or more of a lignin fragment, $C_{1-10}$ alkyl, $C_{1-10}$ alkoxy, $C_{1-10}$ heteroalkyl, —($C_{0-10}$ alkyl) ($C_{6-14}$ aryl), —($C_{0-10}$ alkyl-)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl) ($C_{3-10}$ heterocycloalkenyl), —($C_{0-10}$ alkyl)COOH, —($C_{0-10}$ alkyl)N($C_{1-4}$ alkyl)$_3$, or —($C_{0-10}$ alkyl)—OH;
wherein when Z is a sp$^2$ hybridized nitrogen, then $R^4$ is optionally null.

In some implementations of Formula (VIII), $R^1$, $R^2$, and $R^3$ together form a heteroaryl or heterocyclic ring, for example having the formula:

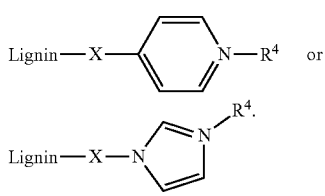

The skilled person appreciates that for the above exemplary heteroaryls, when $R^4$ is null the depicted ring will be electrically neutral, whereas when $R^4$ is not null, the depicted ring will bear a cationic charge.

In some implementations of Formula (VIII), $R^1$, $R^2$, and $R^3$ together form a heteroaryl or heterocyclic ring, wherein said ring is further substituted by $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl) ($C_{1-13}$ heteroaryl), —($C_{0-10}$ alkyl-)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl-)($C_{3-10}$ cycloalkenyl), —($C_{0-10}$ alkyl)($C_{3-10}$ heterocycloalkenyl), —($C_{0-10}$ alkyl)COOH, —($C_{0-10}$ alkyl-)N($C_{1-4}$ alkyl)$_3$, or —($C_{0-10}$ alkyl)—OH. In some implementations said heteroaryl group can be an N-alkyl pyridinium bicarbonate, e.g.,

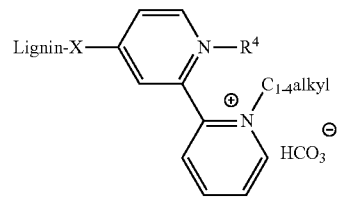

In some implementations of Formula (VIII), $R^1$, $R^2$, $R^3$, and/or $R^4$ together form a heterocyclic ring system, for example having the formula:

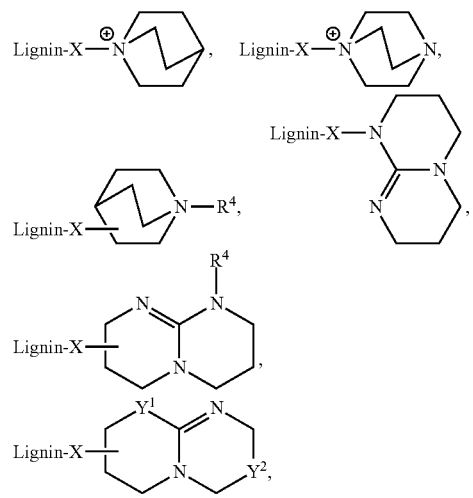

wherein $Y^1$ is null, CH$_2$, or CH$_2$CH$_2$, and $Y^1$ is null, CH$_2$, or CH$_2$CH$_2$.

In further implementations of Formula (VIII), Z is P and each of $R^2$, $R^3$, and $R^4$ are $C_{1-10}$ alkyl, optionally two or more of $R^2$, $R^3$, and $R^4$ together forming a ring. In some implementations, Z is P and each of $R^2$, $R^3$, and $R^4$ are methyl, ethyl, n-propyl, isopropyl, n-butyl, isobutyl, n-pentyl, or n-hexyl. In some implementations, Z is P and $R^2$ and $R^3$ are methyl and $R^4$ is ethyl, n-propyl, isopropyl, n-butyl, isobutyl, n-pentyl, or n-hexyl. In some implementations Z is P and $R^2$, $R^3$, and $R^4$ are the same, for example $R^2$, $R^3$, and $R^4$ are each methyl, ethyl, or n-propyl.

In some implementations of Formula (VIII) X is:

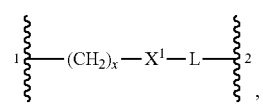

wherein x is 2 or 3, and $X^1$ is S In certain implementations of Formula (VIII), X is 1,2,3-triazole, e.g., the product of a click-chemistry cycloaddition:

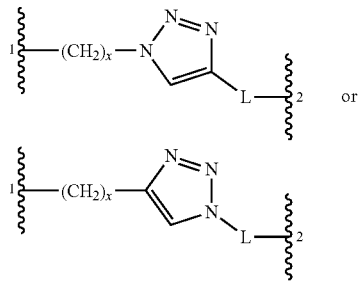

or wherein x is 1, 2, or 3.

In some implementations of Formula (VIII), $R^4$ can be $C_{1-10}$ aliphatic-lignin. In some implementations $R^4$ can have the formula $C_{1-10}$ aliphatic-L*, wherein L* has the formula:

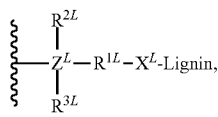

$X^L$ is independently:
null

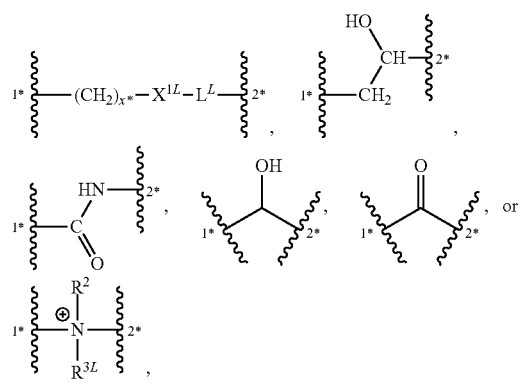

wherein wavy line 1* represents the point of attachment to lignin, and wavy line 2* represents the point of attachment to the $R^{1L}$ group $X^{1L}$ is null, S, O, NH, or a 1,2,3,-triazole;

x* is 0-8;

$L^L$ is a $C_{0-10}$ aliphatic group, e.g. null, $C_{1-10}$ alkylene, or $C_{1-10}$ heteroalkylene;

$R^{1L}$ is selected from null or $C_1$-$C_{10}$ aliphatic group, wherein $R^{1L}$ is optionally substituted with one or more of $C_{1-10}$ alkyl, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)COOH, —($C_{0-10}$ alkyl)N($C_{1-4}$ alkyl)$_3$, or —($C_{0-10}$ alkyl)—OH;

at least one of $X^L$ and $R^{1L}$ is not null;

any two or more of $R^{1L}$, $R^{2L}$, and $R^{3L}$ may together form a ring, $R^{2L}$ and $R^{3L}$ are in each case independently selected from $C_1$-$C_{10}$ aliphatic group, each of $R^{1L}$, $R^{2L}$, and $R^3$ L is independently and optionally substituted with one or more of a lignin fragment, $C_{1-10}$ alkyl, $C_{1-10}$ alkoxy, $C_{1-10}$ heteroalkyl, —($C_{0-10}$ alkyl) ($C_{6-14}$ aryl), —($C_{0-10}$ alkyl-)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl) ($C_{3-10}$ heterocycloalkenyl), —($C_{0-10}$ alkyl)COOH, —($C_{0-10}$ alkyl)N($C_{1-4}$ alkyl)$_3$, or —($C_{0-10}$ alkyl)—OH;

wherein when $Z^L$ is a sp$^2$ hybridized nitrogen, then $R^{3L}$ is optionally null.

In still further aspects, the method of capturing the carbon dioxide is reversible, such that the captured carbon dioxide is released.

In still further aspects also disclosed are methods utilizing carbon dioxide-lignin based polymer to form other chemical compounds.

In one aspect, disclosed herein is a method comprising: a) providing a polymer composition comprising one or more fragments of formula (IX)

[Formula (IX)]

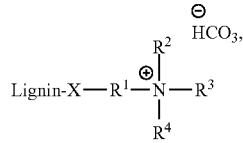

wherein X is selected from
null

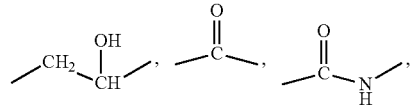

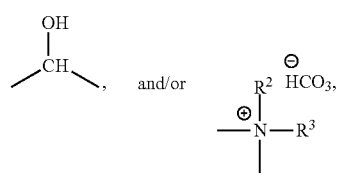

wherein $R^1$ is selected from null or $C_1$-$C_{40}$ aliphatic group, wherein $R^1$ is optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl-)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy; wherein when X is null, $R^1$ is not null, or wherein $R^1$ is null, X is not null; wherein two of $R^2$, $R^3$, and $R^4$ may together form a 5 or 6-membered ring, or wherein $R^2$ and $R^3$, each and on each occasion, independent of the other, are selected from $C_1$-$C_{40}$ aliphatic group, wherein $R^4$ is selected from $C_1$-$C_{40}$ aliphatic group or lignin, and wherein each of $R^2$, $R^3$, and $R^4$ is independently and optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl-)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy; b) releasing carbon dioxide from the polymer composition; and c) utilizing the released carbon dioxide to form a compound comprising a cyclic carbonate.

In still further aspects of Formula (IX), in the disclosed methods, $R^1$ is selected from null, $C_1$-$C_{20}$ alkylene, $C_1$-$C_{20}$ alkenylene, $C_1$-$C_6$ alkynylene, —($C_{0-10}$ alkylene)($C_6$-$C_{14}$ aryl), or —($C_{0-10}$ alkylene)(aryl-N=N-aryl group),

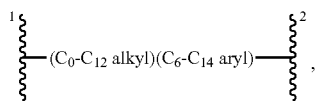

wherein squiggly line 1 is a connection to lignin, and squiggly line 2 is a connection to $N^+$, wherein $R^1$ is optionally substituted one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl) ($C_{1-13}$ heteroaryl), —($C_{0-10}$ alkyl)($C_{6-14}$ aryloxy), —($C_{0-10}$ alkyl-)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy.

In still further aspects, the polymer compositions used in the disclosed methods can comprise one or more fragments of the formula:

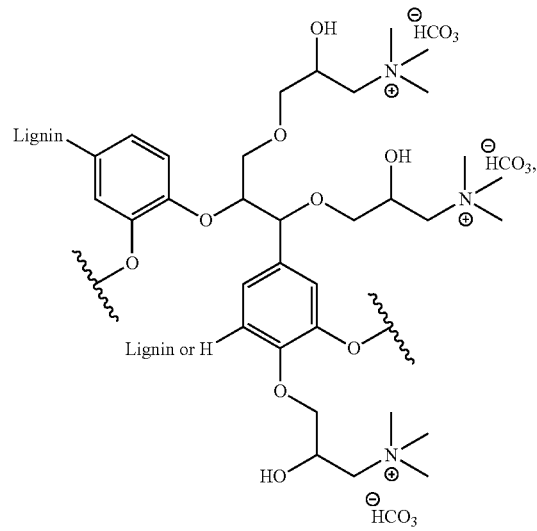

wherein ⌇ is —H, —$CH_3$, or further lignin.

In still further aspects, the polymer compositions used in the disclosed methods can comprise one or more fragments of the formula:

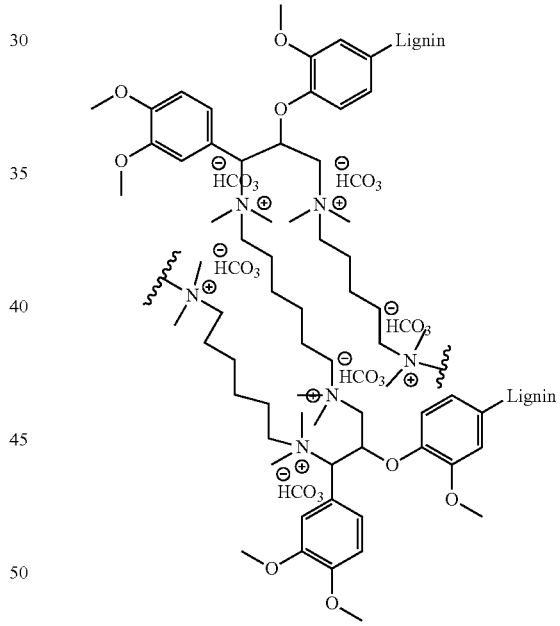

wherein ⌇ is a null or a further lignin.

Exemplary route for forming polycarbonate is disclosed in detail below and shown in FIGS. 13A-13B.

In one aspect, disclosed herein is a method comprising: a) providing a polymer composition comprising one or more fragments of formula (VII) b) releasing carbon dioxide from the polymer composition; and c) utilizing the released carbon dioxide to form a compound comprising a cyclic carbonate In one aspect, disclosed herein is a method comprising: a) providing a polymer composition comprising one or more fragments of formula (VIII) b) releasing carbon dioxide from the polymer composition; and c) utilizing the released carbon dioxide to form a compound comprising a cyclic carbonate.

Lignin-Based Polyurethane

Also disclosed is a method comprising: reacting a lignin-based macromonomer of formula (X) with a polyamine to form a polyhydroxyurethane (PHU) having a fragment of formula (XI)

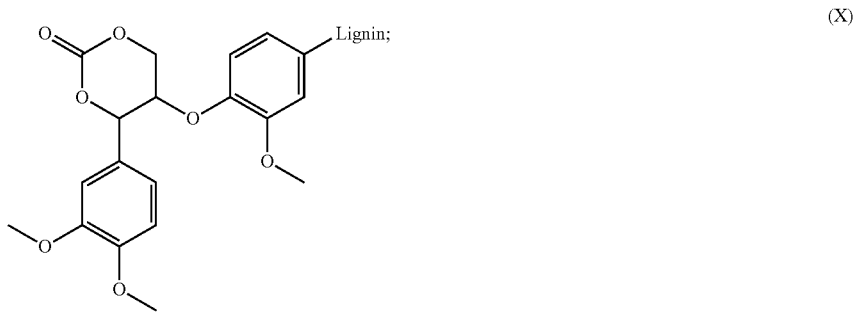

(X)

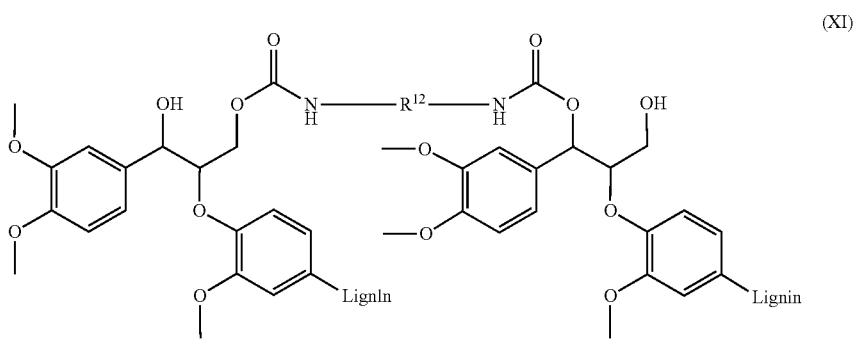

(XI)

wherein $R^{12}$ is $C_1$-$C_{40}$ aliphatic group, wherein $R^{12}$ is optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy.

The skilled person appreciates that while the connectivity for the carbamate groups may be as depicted above for Formula (XI), other positional isomers are also possible, e.g.:

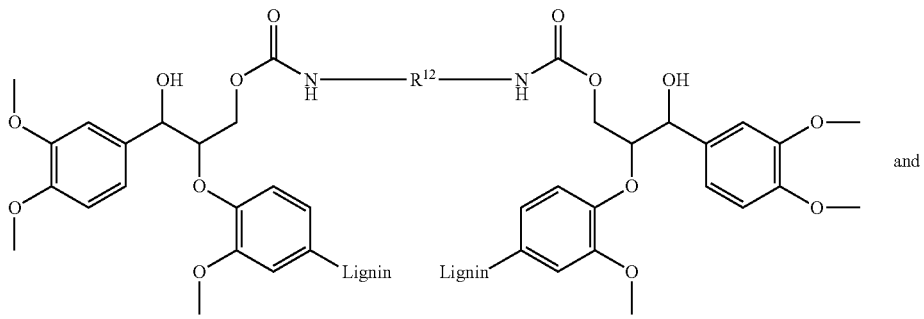

and

-continued

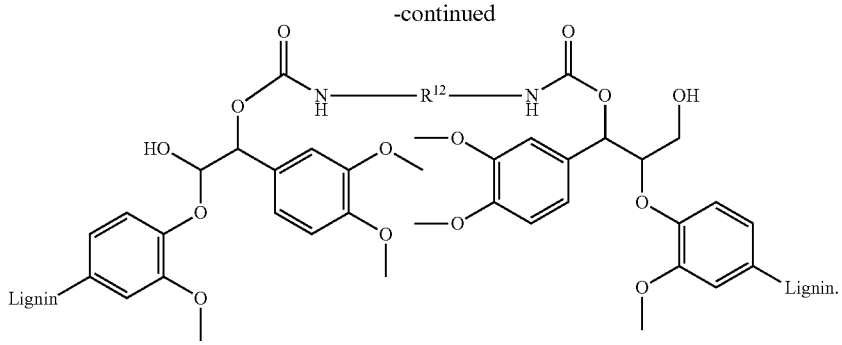

Unless specified explicitly to the contrary, all such isomers are within the ambit of Formula (XI).

In still further aspects, the polyamine can be an aromatic diamine, an aliphatic diamine, an ether linkage-based aliphatic diamine, a triamine, or a combination thereof.

For example, and without limitations, the polyamine can be selected from

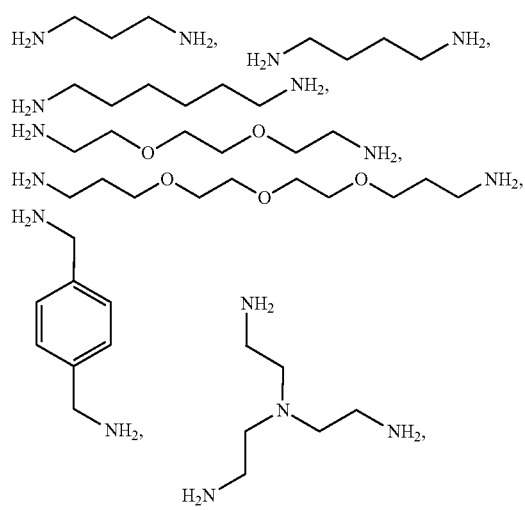

or a combination thereof.

In still further aspects, the reaction of lignin-containing material with the carbon dioxide is conducted at atmospheric pressure. In yet other aspects, the reaction of lignin-containing material with the carbon dioxide is conducted at a temperature of 0° C. to room temperature, for example, 0° C. to 5° C., 0° C. to 10° C., or 0° C. to 15° C., or 0° C. to 20° C., or 0° C. to 30° C., or 0° C. to 35° C., or at any temperatures in between.

In still further aspects, the polyhydroxyurethane formed by the disclosed methods is chemically degradable. For example, it can be chemically degraded in basic conditions.

Yet in still further aspects, the method disclosed herein comprises a step wherein the lignin-based macromonomer (X) is formed by reacting a lignin-based material (e.g., of Formula (I), (IV) or (V)) having one or more OH groups with a carbon dioxide.

An exemplary route for forming the disclosed herein polyhydroxyurethane (PHU) is shown below.

Step-1: Cyclic carbonate synthesis

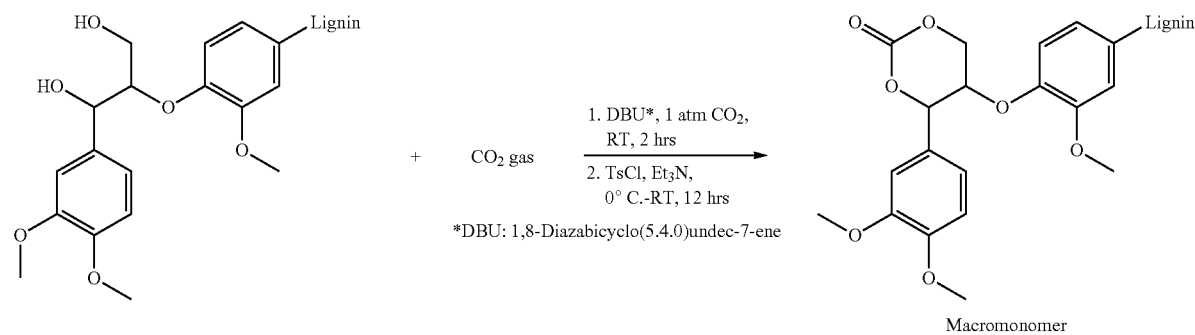

Step-2: Polyhydroxyurethane synthesis
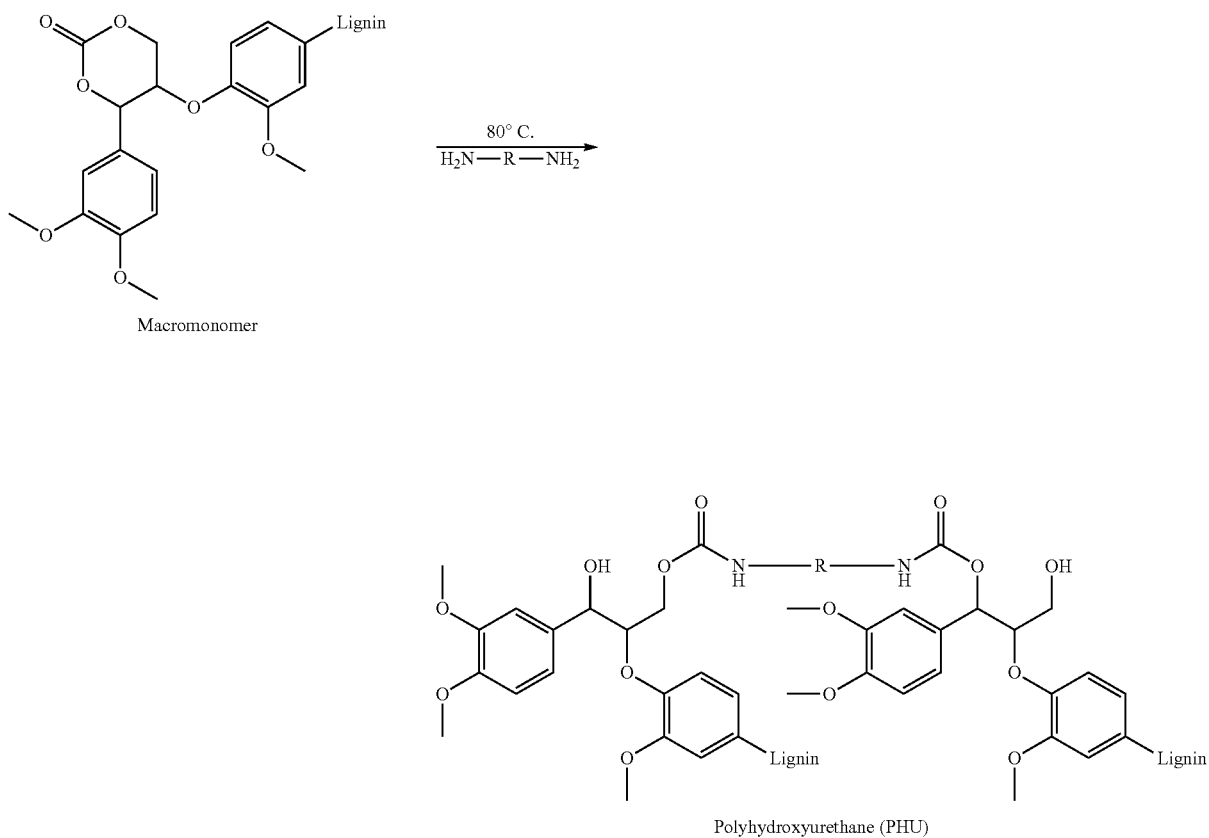
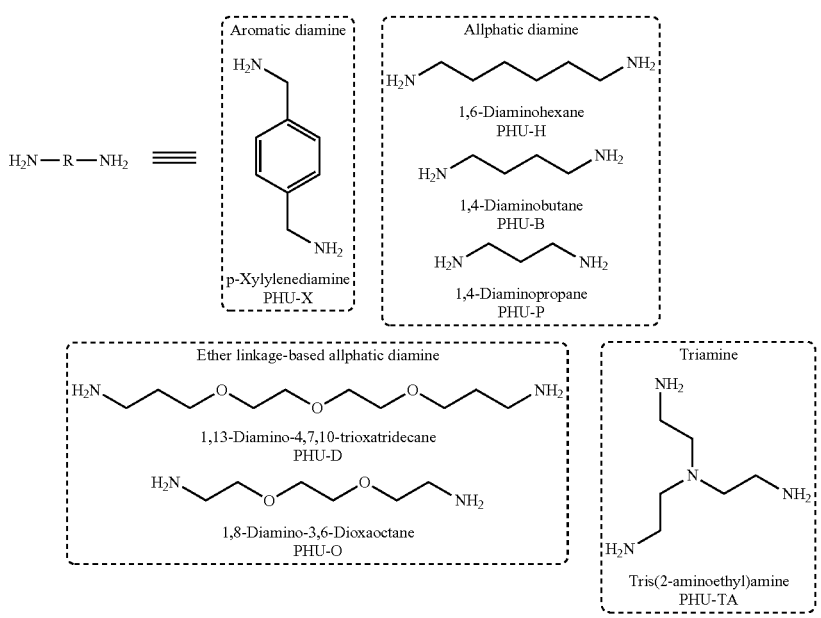

Also disclosed is a polyhydroxyurethane polymer formed by any of the disclosed methods herein. In such aspects, disclosed is a polyhydroxyurethane having a formula:

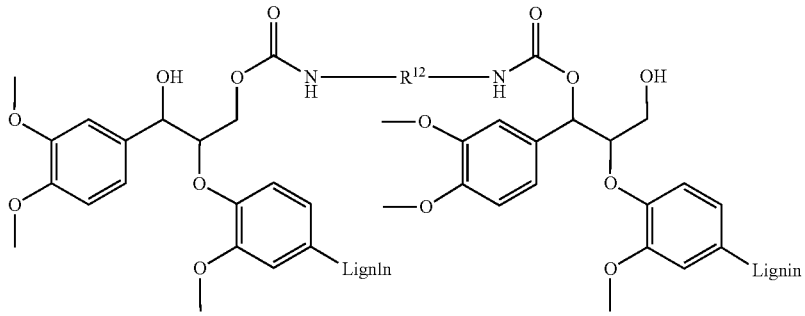

wherein $R^{12}$ is $C_1$-$C_{40}$ aliphatic group, wherein $R^{12}$ is optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy. In still further aspects, the polyhydroxyurethane polymer disclosed herein is recyclable. In this context, the recyclable refers to the formation of new materials at the end of the life of the disclosed polymer.

Also disclosed is an article formed from the polyhydroxyurethane polymer. In still further aspects, the articles formed herein can be used in the fields of medicine, bioengineering electronics, textiles, containers, furniture, automotive, military equipment, coatings, appliances, films, and the like. In certain aspects, the articles prepared from the disclosed biodegradable lignin-based polymers can also comprise packaging, food packaging, disposable cutlery, tableware, film, bags, nets, as membranes in any desired application, for example, for ion exchange and selective gas/liquid separation applications, or any combination thereof.

In still further aspects, disclosed are methods of making the articles, wherein the methods can comprise a step of extrusion, compression molding, injection molding, transfer molding, blow molding, or any combination thereof.

EXAMPLES

Example 1 p-Toluenesulfonyl chloride, lignin (softwood kraft lignin, L0045), and 1,3-butanediol were brought from TCI America. Glycidyltrimethylammonium chloride (GTAC), 2,2,6,6-tetramethylpiperidine (TMP), and sodium hydroxide were obtained from MilliporeSigma. The remaining chemicals were purchased from MilliporeSigma and TCI America and utilized without undergoing additional purification. The procurement of carbon dioxide (UN1013) was carried out from Airgas. The conventional Schlenk line (vacuum manifold) was connected to the carbon dioxide cylinder, and balloons loaded with $CO_2$ were used to purge the gas into the reactions. The deionized water was obtained from the PURELAB® Quest water system (ELGA LabWater). The regenerated cellulose dialysis tubing (Repligen Spectra/Por 6, 3.5 kD, 54 mm) from Spectrum Laboratories (CA, USA) was used to purify the synthesized products.

2. Instrumentations and Characterization

The $^1H$, $^{13}C$, and two-dimensional heteronuclear single quantum coherence (HSQC) experiments were performed to characterize the chemical structures of the monomers and polymers. The modified ionic lignin polymer and $CO_2$-captured ionic lignin polymer were dissolved in $D_2O$ at room temperature. Additionally, the DMSO-$d_6$ was used as an NMR solvent for 1,3-butanediol and synthesized cyclic carbonate from the model reaction. NMR experiments were carried out in Bruker Avance 600 MHz and 500 MHz spectrometers. The chemical shifts of the $^1H$ and $^{13}C$ NMR spectra were determined with respect to the solvent peaks $D_2O$ (4.7 ppm in $^1H$ NMR) and DMSO (2.5 ppm in $^1H$ NMR and 39.5 ppm in $^{13}C$ NMR). MestreNova (Mestrelab Research) software was used to process the NMR data. The acquisition parameters for recording the $^1H$ NMR, $^{13}C$ NMR, and HSQC NMR spectra are elaborated as follows:

For $^1H$ NMR, temperature: 298.0; pulse sequence: zg30; number of scans: 16; receiver gain: 32.0; relaxation delay: 1.00; pulse width: 8.00; acquisition time: 3.2768; spectrometer frequency: 499.86; spectral width: 10000.0; acquired size: 32768; spectral size: 65536; digital resolution: 0.15.

For $^{13}C$ NMR, temperature: 298.0; pulse sequence: zgpg30; number of scans: 12500-14000; receiver gain: 128.0; relaxation delay: 2.0; pulse width: 12.0; acquisition time: 1.1010; spectrometer frequency: 125.70; spectral width: 36231.9; acquired size: 32768; spectral size: 65536; digital resolution: 0.45.

For HSQC (F2×F1) NMR, temperature: 298.1; pulse sequence: hsqcgpph; number of scans: 4; receiver gain: 203.0; relaxation delay: 1.50; pulse width: 15.0; acquisition time: 0.0532; spectrometer frequency: (600.13, 150.91); spectral width: (9615.4, 24875.6); nucleus: ($^1H$, $^{13}C$); acquired size: (512, 256); spectral size: (512, 512); digital resolution: (18.78, 48.59).

The inverse-gated proton decoupled $^{13}C$ NMR was utilized to quantify the captured $CO_2$ from the bicarbonate ion ($HCO_3^-$), which generated a peak at ~160 ppm. Trioxane was used as an internal standard. The detailed procedures are discussed in the method section. The acquisition parameters are elaborated as follows: solvent: $D_2O$; temperature: 298.0; pulse sequence: zgig30; number of scans: 12500; receiver gain: 203.0; relaxation delay: 2.0; pulse width: 10.0; acquisition time: 0.9044; spectrometer frequency: 150.92; spectral width: 36231.9; acquired size: 32768; spectral size: 65536; digital resolution: 0.55.

JASCO 6800 FT-IR Spectrometer was utilized to acquire the Fourier-transform infrared spectroscopy (FT-IR) spectra. Forty scans were carried out in the range of 250-6000 $cm^{-1}$ at a resolution of 4 $cm^{-1}$ for every experiment using an ATR Pro One accessory with an incident angle of 45°. The freeze-dried modified lignin polymer was used for this experiment.

Thermogravimetric analysis (TGA) was used to assess the synthetic polymers' thermal stability. TA Instruments' simultaneous thermal analyzer (SDT, Model: Q600) was used for the TGA studies. Samples were heated to 600° C. at a rate of 10° C. $min^{-1}$ while an argon gas flow of 100 mL $min^{-1}$ was maintained. $T_{d5\%}$ is the polymers' 5% weight loss temperature. Derivative thermogravimetric (DTG) study also provided comprehensive details on the sequential degradation of polymers.

3. Calculation Regarding the Quantitative Analysis of Solubilized $CO_2$ by Inverse Gated Proton Decoupled $^{13}C$ NMR 3.1. $CO_2$ Capturing from Direct Air Internal standard: 1,3,5-trioxane (Molecular weight 90.08 g $mol^{-1}$). 1 M stock solution was prepared in deuterium oxide ($D_2O$). Sample preparation: 20 mg of modified ionic lignin polymer and 50 μL trioxane (1 M) were taken in an NMR tube. $D_2O$ is used as an NMR solvent. Integration values from NMR: three carbon atoms from trioxane at 93.48 ppm (3); $HCO_3$ peak at 160.20 ppm (0.18); $CO_2$ peak at 124.68 ppm (0.06). 50 μL trioxane (1 M)=0.05 mmol. Amount of $HCO_3^-$: (0.05×0.18) mmol=0.009 mmol. Hence, 0.020 gram of modified ionic lignin contained 0.009 mmol $HCO_3$—So, 1 gram of modified ionic lignin contained (0.009/0.020) mmol=0.45 mmol HCOs. Amount of $CO_2$: (0.05×0.06) mmol=0.003 mmol. So, 1 gram of modified ionic lignin contained (0.003/0.020) mmol $CO_2$=0.15 mmol $CO_2$. Total captured $CO_2$ amount from direct air was = (0.45+0.15)=0.60 mmol $gram^{-1}$.

3.2. $CO_2$ Capturing from Concentrated $CO_2$ Source

Sample preparation: 25 mg of modified ionic lignin polymer and 89 μL trioxane (1 M) were taken in an NMR tube. $D_2O$ is used as an NMR solvent. Integration values from NMR: three carbon atoms from trioxane at 93.46 ppm (3); $HCO_3$ peak at 160.19 ppm (0.15); $CO_2$ peak at 124.67 ppm (0.15). 89 μL trioxane (1 M)=0.089 mmol. Amount of $HCO_3$: (0.089×0.15) mmol=0.0133 mmol. Hence, 0.025 gram of modified ionic lignin contained 0.01335 mmol $HCO_3$.So, 1 gram of modified ionic lignin contained (0.01335/0.025) mmol=0.53 mmol $HCO_3$. Amount of $CO_2$: (0.089×0.15) mmol=0.0133 mmol. So, 1 gram of modified ionic lignin contained (0.01335/0.025) mmol $CO_2$=0.53 mmol $CO_2$. Total captured $CO_2$ amount from concentrated $CO_2$ source was =(0.534+0.534)=1.06 mmol $gram^{-1}$.

Example 2

Synthesis of Modified Ionic Lignin Polymer (P-1)

Five grams of lignin was dissolved in a freshly prepared 50 mL aqueous solution of 0.5 M sodium hydroxide (NaOH). After getting the homogeneous aqueous lignin solution, glycidyl trimethyl ammonium chloride, GTAC (3.4 mL, 22.5 mmol) was gradually added under constant stirring. Then, the reaction mixture was purged with continuous nitrogen flow and placed under an oil bath. Subsequently, the temperature of the oil bath was raised to 65° C. and stirred for 5 hours. Later, the reaction mixture was cooled down to the room temperature. Thereafter, the reaction was carried out overnight at room temperature. Following completion, the mixture was transferred to the dialysis membrane tube with a molecular weight cut-off of 3.5 kDa. The dialysis was performed in deionized water for 72 hours, where the water was changed after different intervals. Finally, a dark brown fluffy solid product was obtained after freeze-drying the lignin reaction mixture. The yield of the reaction was 76% (weight) with respect to the lignin.

Process for Synthesizing $CO_2$-Captured Ionic Lignin Polymer (P-2)

$CO_2$-captured ionic lignin polymer (P-2) was prepared through the $CO_2$ sorption process of the modified ionic lignin polymer (P-1). It demonstrated excellent water solubility. Deuterium oxide ($D_2O$) is therefore used in the $CO_2$ capturing process as a solvent. Initially, 50 mg of modified ionic lignin polymer was placed in a pressure relief cap-containing vial, and 1 mL of $D_2O$ was added to solubilize the modified ionic lignin polymer. Afterward, a $CO_2$ gas-filled balloon was introduced to bubble the gas into the ionic lignin solution at 25° C. for 15 minutes. Subsequently, the obtained solution was transferred to a clean NMR tube for the NMR analysis. Specifically, the new peak after $CO_2$ capturing would be clearly visible in the $^{13}C$ NMR spectrum.

The direct extraction of $CO_2$ from the air (direct air capture, DAC) experiment was performed to evaluate the efficiency of the developed polymer for reducing $CO_2$ emissions. The solid-modified ionic lignin polymer sample was placed in a vial and kept open in a normal atmosphere ($CO_2$: 0.04%) for 45 days at room temperature. Then, the sample solution in $D_2O$ was bubbled with continuous air for 1 hour to ensure the capture procedure. Lastly, the sample was used for NMR analysis.

Analysis of Solubilized $CO_2$ by Inverse Gated Proton Decoupled $^{13}C$ NMR

The captured $CO_2$ into the modified ionic lignin polymer was experimentally quantified by the inverse-gated proton decoupled $^{13}C$ NMR method. The quantitation was accomplished using an internal standard. It is vital to emphasize that the internal standard with clear, sharp, and un-overlapped signals in the $^{13}C$ NMR spectra was selected cautiously. 1,3,5-Trioxane was selected as the internal standard by evaluating all the previously discussed points. Initially, a stock solution of 1 M trioxane was prepared in $D_2O$. In the case of the direct $CO_2$ capturing process, 25 mg of modified ionic lignin polymer was dissolved in 0.5 mL of $D_2O$, and $CO_2$ gas was bubbled for 15 minutes. Later, the solution was transferred to an NMR tube (outer diameter: 5 mm and length: 7 inches). Then, 1 M trioxane solution (89 μL) was added to the NMR tube. Finally, the inverse-gated proton decoupled $^{13}C$ NMR (pulse sequence: zgig30) was performed by overnight scanning (number of scans: 12500) under a spectrometer frequency of 150.92 MHz and a digital resolution of 0.55.

For the $CO_2$ capturing via direct air capture, a 20 mg modified ionic lignin polymer, after keeping under direct air exposure for 45 days, was dissolved in 0.5 mL of $D_2O$. Later, the atmospheric air was bubbled for 1 hour, and the solution was transferred to an NMR tube, where 50 μL of trioxane (1 M in $D_2O$) was added to it. The inverse-gated proton decoupled $^{13}C$ NMR was performed by following previous experimental protocols.

The quantifications of the solubilized $CO_2$ were calculated from the integral values of the peaks of the bicarbonate ion ($HCO_3^-$, ≈160.2 ppm) and trapped $CO_2$ (=124.7 ppm) with reference to the trioxane peak at 93.46 ppm in $^{13}C$ NMR spectra.

General Procedure Cyclic Carbonate Synthesis Using Captured $CO_2$ as a Source

The cyclic carbonate synthesis model reaction was performed to investigate if the $CO_2$-captured ionic lignin polymer could be utilized as a source of $CO_2$ for the reaction. A novel and unique reaction set-up was designed to execute this reaction. Two different round bottom flasks (25 mL:

RB-1 and 10 mL: RB-2) were utilized, and both flasks were connected through a manually developed needle-attached tubing system. 1,3-Butanediol (0.4 g, 0.4 mL, 4.5 mmol), tosylchloride (0.85 g, 4.5 mmol, 1 equivalent) were mixed homogeneously with 15 mL acetonitrile in the 25 mL round bottom flask (RB-1). Then, the closed rection setup was purged with argon gas flow for 15 minutes. Simultaneously, 1.5 grams of $CO_2$-captured ionic lignin polymer (P-2) was dissolved with 4.5 mL deionized water (3 mL gram$^{-1}$) was taken in the 10 mL flask (RB-2) and placed under an oil bath. At that time, a needle-attached tubing system was connected between the RB-1 and RB-2. Then, the temperature of the oil bath of RB-2 increased to 60° C. This heating initiated the $CO_2$ release from the P-2 in RB-2, and $CO_2$ gas flowed towards the RB-1. As a result, continuous $CO_2$ gas bubbles were observed in RB-1, and this purging was carried out to make the reaction mixture $CO_2$ saturated. Afterward, the reaction mixture of RB-1 cooled down to 0° C., and 2,2,6,6-tetramethylpiperidine (TMP, 1.5 mL, 9.0 mmol, 2 equivalent) was added dropwise in RB-1 under continuous $CO_2$ flow. Thereafter, the ice bath was removed from RB-1 and allowed to rise to room temperature while stirring. The $CO_2$ flow (i.e., heating in RB-2) continued until bright white precipitation was observed in RB-1. Later the heating of RB-2 was then turned off after the detachment of the tubing system from the two flasks. The reaction mixture in RB-1 was stirred for an additional 6 hours. Later, three times centrifugation for 5 minutes at 4400 rpm followed by filtration was executed to separate the liquid phase. The solvent was eliminated under vacuum and the crude product was purified using column chromatography followed by recrystallizing in toluene at room temperature. Finally, the cyclic carbonate product is obtained in 49% yield (0.25 g).

4.5. Recycling of Modified Ionic Lignin Polymer Via Controllable $CO_2$ Release ↔$CO_2$ Capture The recycling experiment was carried out with the recovered aqueous solution of the $CO_2$-captured ionic lignin polymer (P-2) after the model cyclic carbonate synthesis reaction. As the solution heated continuously at 60° C., the captured $CO_2$ was released during the reaction. The recycled modified ionic lignin polymer was obtained by freeze-drying the aqueous solution. The $CO_2$ capturing procedure was repeated to ensure that the recovered product functioned effectively. The chemical structures were confirmed by the NMR studies.

Example 3

2.1. Synthesis and Characterization of Modified Ionic Lignin Polymer

Figure 5:
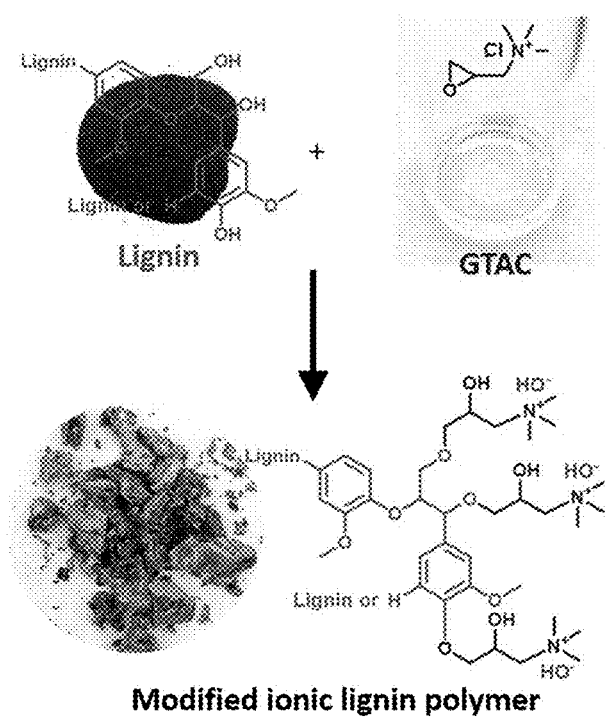
FIG. 5 depicts physical changes during the synthesis of modified ionic lignin polymer. Lignin: dark brown powder; glycidyl trimethyl ammonium chloride (GTAC): colorless viscous liquid; modified ionic lignin polymer: brown fluffy solid.

The chemical transformation of biomass lignin into a valuable product with excellent water solubility involves a unique and environmental-friendly strategy for large-scale applications. In this current research work, a synthetically modified ionic lignin polymer is designed for $CO_2$ capturing and utilization applications. For that purpose, a modified ionic lignin polymer (P-1) was prepared via quaternization using glycidyl trimethylammonium chloride (GTAC), GTAC as shown in FIG. 3a. Commercially available lignin (product number: L0045, TCI America), with a total hydroxyl group amount was 4.48 mmol g$^{-1}$ (FIG. 4), was used in this example. The key steps involved in the synthesis of P-1 (FIG. 3a) were solubilization of lignin in 0.5 M NaOH aqueous solution, cationization of lignin with GTAC at 65° C. for 5 hours followed by an overnight stirring at room temperature, purification by dialysis in water medium for 72 hours, and freeze-drying of the purified product (FIG. 5).

The reaction conditions (reaction time, temperature, ratios, and concentration of NaOH) were selected to ensure the minimal formation of side products. Both the aromatic and aliphatic hydroxy groups of lignin generated nucleophilic hydroxide intermediates in the presence of the alkaline pH condition. However, the phenolic groups of lignin had a greater tendency for the quaternization reaction than the aliphatic hydroxyl groups because of superior equilibrium between the acidity and nucleophilicity of phenolates. The in-situ hydroxide intermediates participated in the nucleophilic attack on the GTAC and formed the quaternary ammonium functionalized lignin. Moreover, it is worth noting that the quaternization process produced several side products despite adjusting the reaction conditions (FIG. 3a). The side products by the hydrolysis of GTAC had low molecular weight and were water-soluble. As a result, dialysis (molecular weight cut off: 3.5 kDa) was able to easily eliminate the unreacted GTAC and other side products.

Figures 3A, 3B, 3C, 3D, 3E:
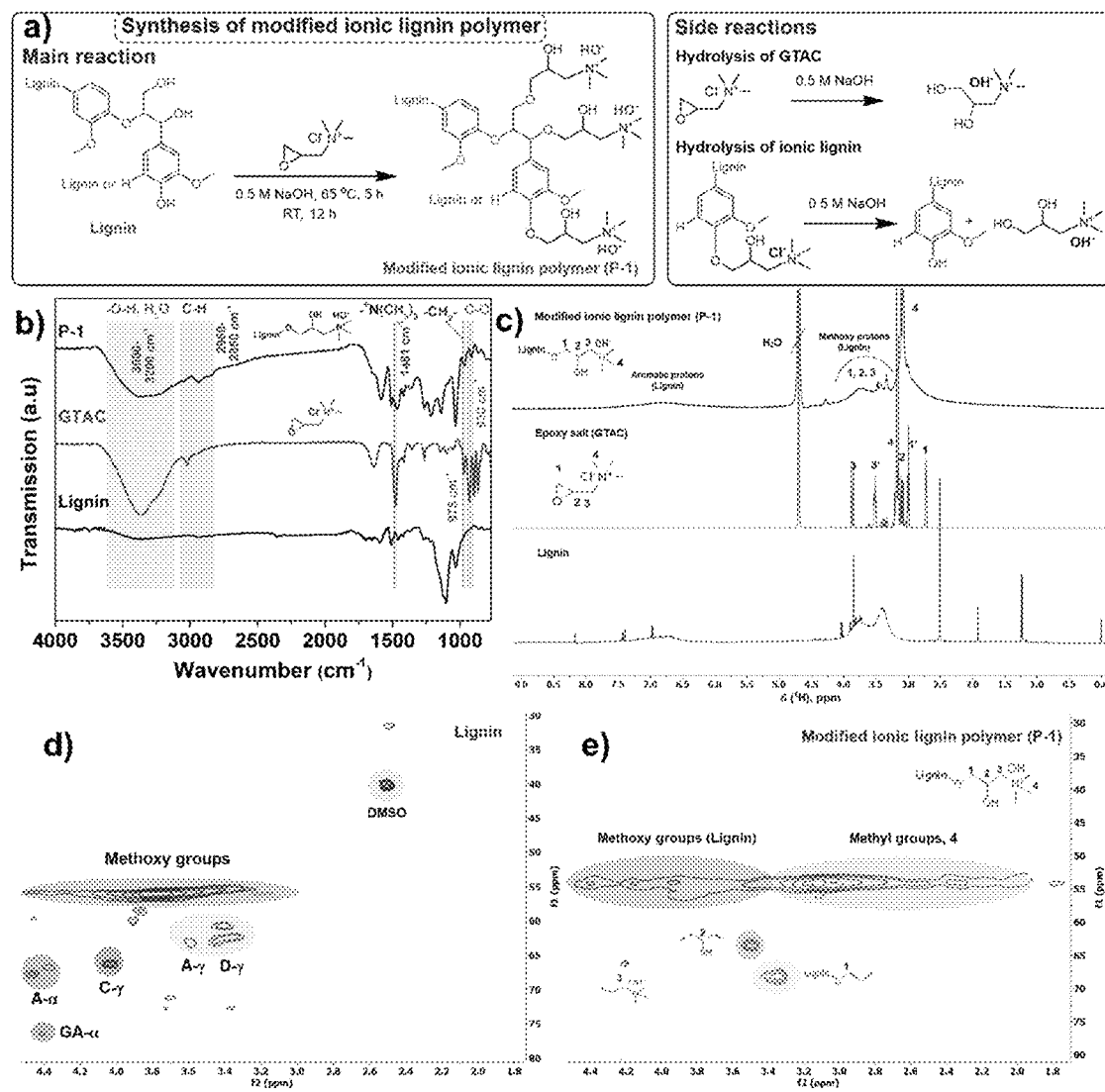
FIGS. 3A-3E depict a reaction scheme for the synthesis of modified ionic lignin polymer (P-1) from glycidyl trimethylammonium chloride (GTAC) and lignin under basic conditions. The hydrolysis side reactions also occurred during the quaternization reaction, which generated some by-products as shown in the scheme (FIG. 3A); an FT-IR spectrum of lignin, GTAC, and modified ionic lignin polymer (FIG. 3B); a stacked $^1H$ NMR spectra of lignin, GTAC and P-1 (FIG. 3C); a 2D $^1H$ $^{13}C$ heteronuclear single quantum coherence (HSQC) NMR of raw lignin in before reaction (FIG. 3D). The notations (A-α, A-γ, C-γ, D-γ, and GA-α) used for assigning the signals were displayed in FIG. 4; a HSQC NMR of modified ionic lignin polymer after quaternization (FIG. 3E).

The preliminary structural analysis was done using the Fourier-transform infrared spectroscopy (FT-IR) by comparing the unmodified lignin and modified lignin (FIG. 3b). In contrast to the raw lignin, a broad and intense absorption band was observed in the range of 3600-3200 cm$^{-1}$ due to the O—H stretching of the hydroxyl groups and trapped moisture. The absorption bands at 1481 and 975 cm$^{-1}$ were assigned to the methyl (—CH$_3$) and methylene (—CH$_2$) groups connected to the nitrogen atom of the quaternary ammonium groups (FIG. 3b). Moreover, the stretching vibration of the C—O bond of the ether linkages generated an absorption band at 930 cm$^{-1}$. Afterwards, $^1$H NMR spectroscopy was utilized to confirm the chemical structure of the synthesized product. FIG. 3c shows the NMR spectra of lignin (in DMSO-d$_6$), GTAC (in D$_2$O), and synthesized product (in D$_2$O). The intense peaks at 3.05-3.15 ppm in FIG. 3c appeared from the three methyl groups (—CH$_3$) of the quaternary ammonium moieties. The peaks corresponded to the protons from lignin's methoxy groups (—OCH$_3$) observed in the 3.25-4.15 ppm region (FIG. 3c), along with the other characteristic proton signals from the GTAC unit. This suggested the successful covalent attachment of quaternary ammonium units to the polymeric structure of lignin. In addition, the 2D $^1$H—$^{13}$C heteronuclear single quantum coherence (HSQC) NMR was performed and compared with the lignin spectrum (FIGS. 3d and e). The HSQC spectrum of lignin in FIG. 3d displayed the existence of a large amount of aliphatic hydroxyl groups. The signals related to the α, β, and γ types of hydroxyl groups were observed in the region of $δ_H/δ_C$: 3.2-4.5 ppm/58-80 ppm. The signal at $δ_H/δ_C$: 3.78 ppm/56 ppm appeared from the methoxy group of the lignin units. The details about different structural units of lignin are provided in FIG. 4 of supporting information. FIG. 3e represents the HSQC spectrum of the modified ionic lignin polymer. The typical hydroxyl groups' signals of lignin disappeared after the quaternization reaction with GTAC. This clear consumption of the aliphatic hydroxyl groups provided direct proof of their participation in the reaction. The intense signals of the methyl groups from GTAC and methoxy groups from lignin supported the successful integration of these two systems. The signals of the methylene groups (—CH$_2$—) connected to the quaternary ammonium group (noted as 3 in FIG. 3e) and next to the oxygen atom (noted as 1 in FIG. 3e) were noticed at $δ_H/δ_C$: 4.18 ppm/66.40 ppm and $δ_H/δ_C$: 3.34 ppm/68.36 ppm, respectively. Notably, a new hydroxyl group was formed during the ring opening of the epoxy unit, and that signal appeared at $\delta_H/\delta_C$: 3.51 ppm/63.60 ppm in FIG. 3e. Therefore, after analyzing all the experimental outcomes, it can be stated that the quaternary ammonium units were effectively connected via a covalent bond to the polymeric structure of lignin.

2.2. $CO_2$-Capturing of Modified Ionic Lignin Polymer

The method of capturing $CO_2$ is extremely difficult and usually needs ionic systems with basic and hygroscopic anions (for example, hydroxide, imidazole, and acetate), which convert the captured $CO_2$ into bicarbonates ($HCO_3^-$). Moreover, recent findings indicated that polyionic materials had the potential for capturing $CO_2$ from concentrated sources as well as directly from the atmosphere, presenting a potentially sustainable solution to mitigate carbon emissions.

The primary hypothesis for this current work was that the hydroxide ions of the modified ionic lignin polymer (P-1) would undergo a chemical transformation to its bicarbonate form by capturing $CO_2$. To validate this hypothesis, the $CO_2$ capturing process of P-1 samples was investigated using both the concentrated $CO_2$ source and direct air exposure (FIG. 6a). Subsequently, the $^{13}C$ NMR technique was utilized to monitor the bicarbonate formation. A sharp peak around 160-161 ppm signified the emergence of a new species. Consistent with prior studies, this peak was attributed to the $HCO_3$ group. The deuterium oxide was used as the NMR solvent for this study.

FIG. 6b shows the stacked $^{13}C$ NMR spectra of the $CO_2$-captured ionic lignin polymer (P-2), modified ionic lignin polymer (P-1), and epoxy salt (GTAC). The peaks of the methoxy groups (—$OCH_3$) from the lignin unit and methyl groups (—$CH_3$) from the quaternary ammonium groups overlapped within 52-55 ppm (P-2 and P-1, FIG. 6b; $^1H$ NMR showed in FIG. 74). Moreover, the effective ring opening of the epoxide units during quaternization was confirmed from the signals of methylene (—$CH_2$—) and —CH(OH)— groups in the range of 61-66 ppm. Thus, it can be said that the overall polymer backbone of the modified ionic lignin polymer was intact after the $CO_2$-capturing process. The noteworthy difference after the $CO_2$ capturing was the appearance of an intense peak at 160.2 ppm in the NMR spectrum of $CO_2$-captured ionic lignin polymer (FIG. 6b), which indicated the formation of the bicarbonate ($HCO_3^-$) ion. It can be stated that the $CO_2$ underwent chemisorption onto the sorbent via a reaction with hydroxide, resulting in the formation of a saturated bicarbonate sorbent.

Figure 8:
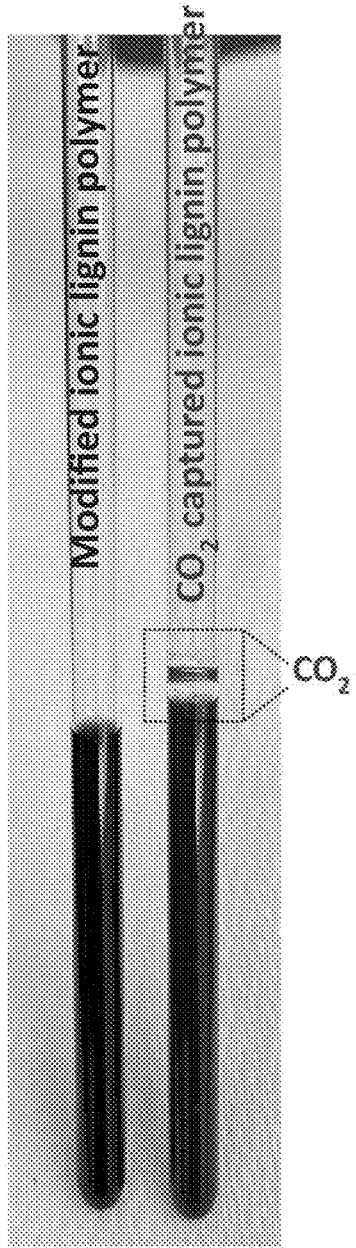
FIG. 8 depicts a photograph of the sample-loaded NMR tubes of modified ionic lignin polymer (left) and $CO_2$-captured modified ionic lignin polymer (right) in $D_2O$ after an overnight $^{13}C$ NMR experiment. The NMR solvent $D_2O$ induced the $CO_2$ release process in the $CO_2$-captured modified ionic lignin polymer. The $CO_2$ gas bubbles are observed as the experiment is conducted for a long time (overnight). The mechanism is discussed in FIG. 6C.

This reaction, facilitated by the strong affinity between $CO_2$ and hydroxides, occurred not only in concentrated $CO_2$ conditions but also under the exposure of direct air. Significantly, a peak for $CO_2$ was observed at 124.7 ppm in the NMR spectrum of $CO_2$-captured ionic lignin polymer (FIG. 6b). This specified the internal release of $CO_2$ from the bicarbonate salt (P-2). It was noted that the NMR experiment was performed through overnight scanning (number of scans: 13000) in $D_2O$ solvent, which had a significant role in generating the in-situ $CO_2$. The $CO_2$ gas bubbles were also observed in the NMR tube, as shown in FIG. 8, after the overnight scanning. To explain this phenomenon, a schematic mechanism was presented in FIG. 6c, which illustrated the moisture-driven changes for quaternary ammonium cation containing lignin polymer having hydroxide, bicarbonate, and carbonate ions ($OH^-$, $HCO_3^-$, and $CO_3^{2-}$).

The proposed mechanism in FIG. 6c was developed by following several prior literatures. Initially, the hydroxide ion-containing modified ionic lignin polymer (P-1) was kept dry (Step 1, FIG. 6c). Then, after exposing the P-1 to a $CO_2$ environment (direct air or concentrated $CO_2$), the substantial affinity of $CO_2$ initiated its reaction with the hydroxide ion, resulting in a sorbent saturated with bicarbonate ion (Step 2, FIG. 6c). The introduction of moisture and heating resulted in the dissociation of bicarbonates and released $CO_2$ from the solution. As per the earlier literature, the surface became saturated with water-stabilized carbonates. Finally, the hydrated modified ionic lignin polymer returned to the initial step-1 under heating due to destabilization of the carbonate and bicarbonate ions (Step 3, FIG. 6c).

2.3. Quantification of Captured $CO_2$

Figure 9:
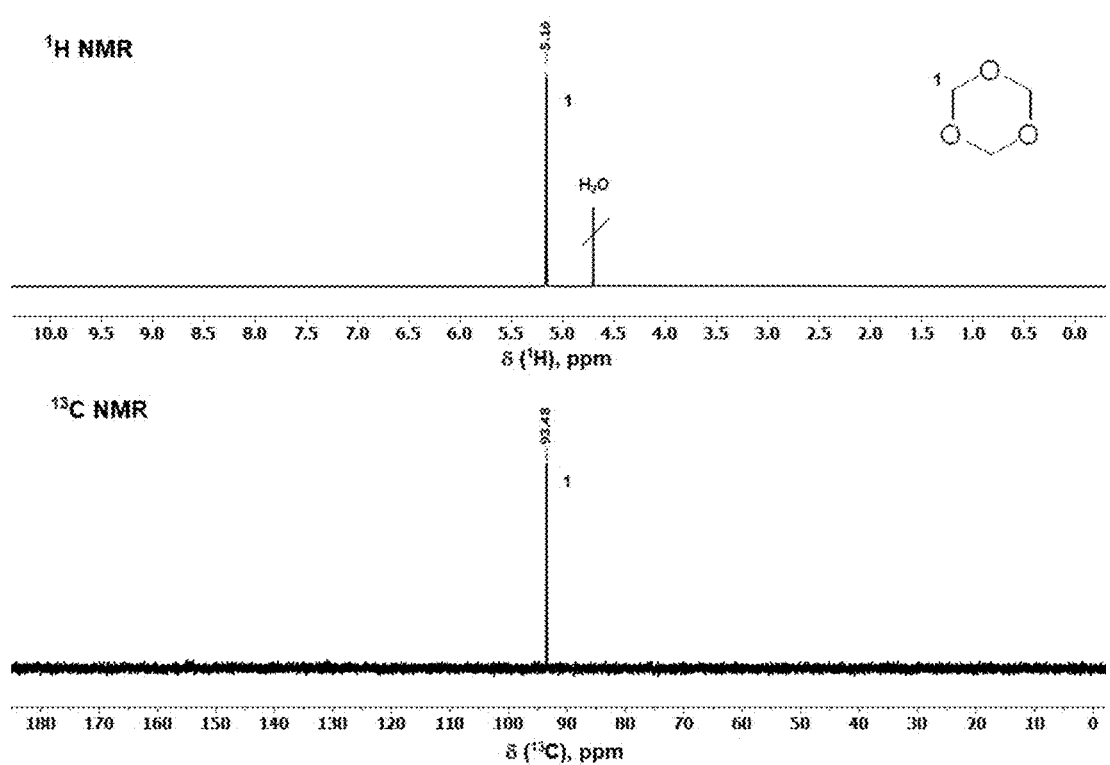
FIG. 9 depicts $^1H$ (top) and $^{13}C$ (bottom) NMR of 1,3,5-trioxane in $D_2O$ at room temperature. 1,3,5-trioxane is used as an internal standard in the NMR analysis as it shows one type of proton and carbon signal in the spectra.
Figures 10A, 10B:
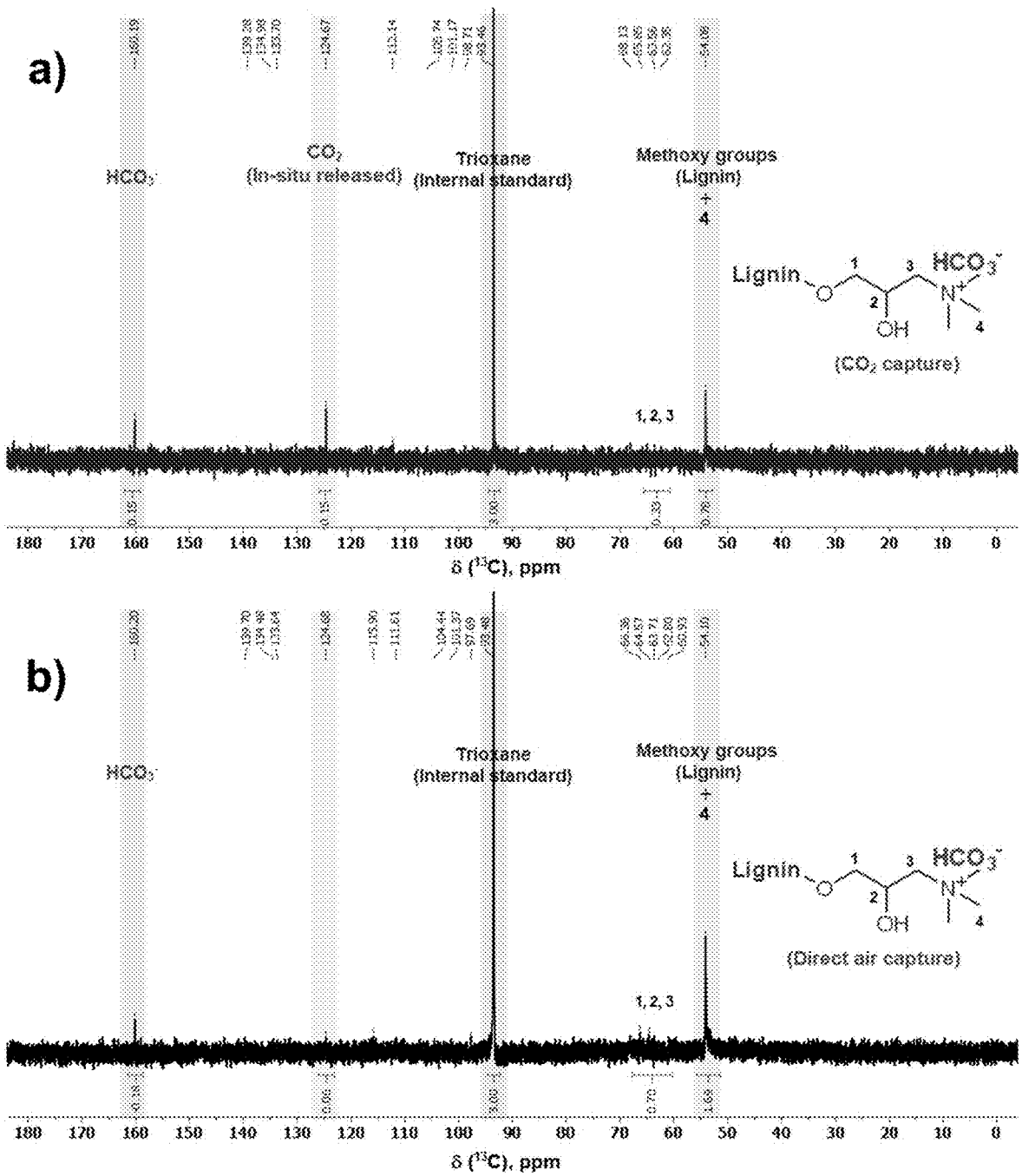
FIGS. 10A-10B depict an inverse-gated proton decoupled $^{13}C$ NMR (pulse sequence: zgig30, solvent $D_2O$) of $CO_2$-captured modified ionic lignin polymer using concentrated $CO_2$ source (FIG. 10A); a quantitative $^{13}C$ NMR using inverse-gated proton decoupled method (pulse sequence: zgig30, solvent $D_2O$) of $CO_2$-captured modified ionic lignin from direct air capture (FIG. 10B).

After confirming the $CO_2$-capturing ability of the modified ionic polymer, it became imperative to quantify the captured $CO_2$. The most significant peaks to track the capturing process were the $^{13}C$ NMR (FIG. 6b, $CO_2$-captured ionic lignin polymer) peaks located at 161 ppm for the bicarbonate ($HCO_3$) and 125 ppm for the $CO_2$. The inverse-gated proton decoupled $^{13}C$ NMR (pulse sequence: zgig30) was employed for quantifying captured $CO_2$. It improved the sensitivity and resolution of the $^{13}C$ NMR spectra and enabled precise measurement of captured $CO_2$ by selectively decoupling protons from the carbon signals. The bicarbonate and $CO_2$ peaks were integrated with reference to an internal standard (trioxane). The trioxane had only one type of carbon atom and it displayed an intense peak, which did not overlap with the other peaks of the modified ionic lignin polymer (FIG. 9 and FIG. 10a, b).

Figure 11:
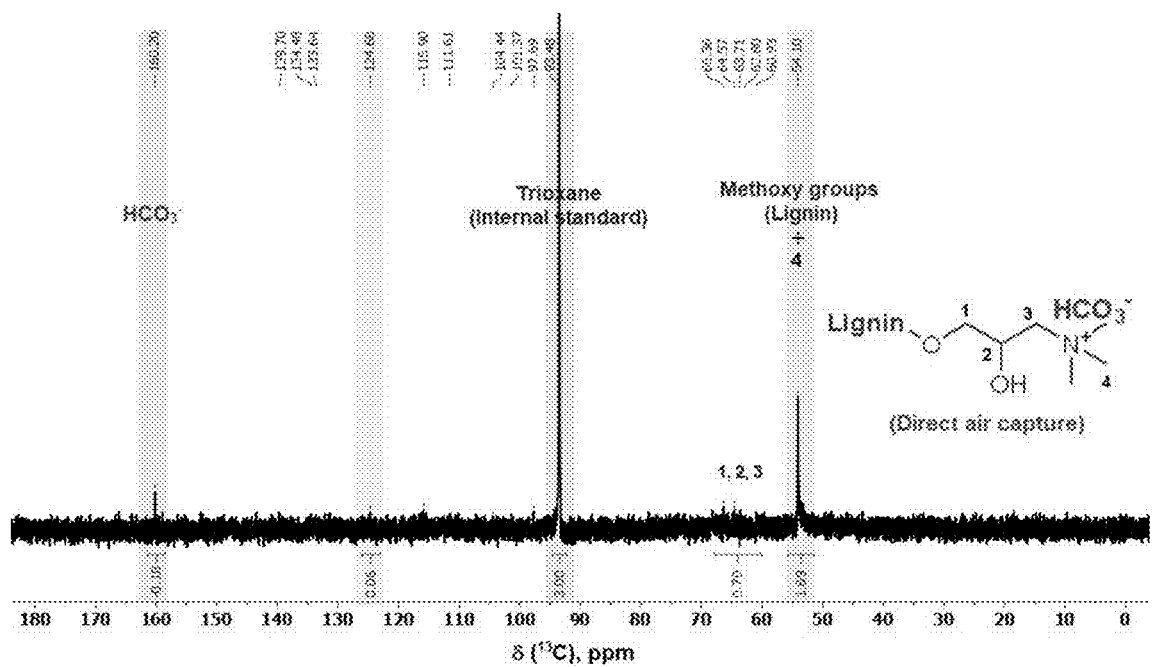
FIG. 11 depicts quantitative $^{13}C$ NMR using inverse-gated proton decoupled method (pulse sequence: zgig30, solvent $D_2O$) of $CO_2$-captured modified ionic lignin from direct air capture.
Figure 12:
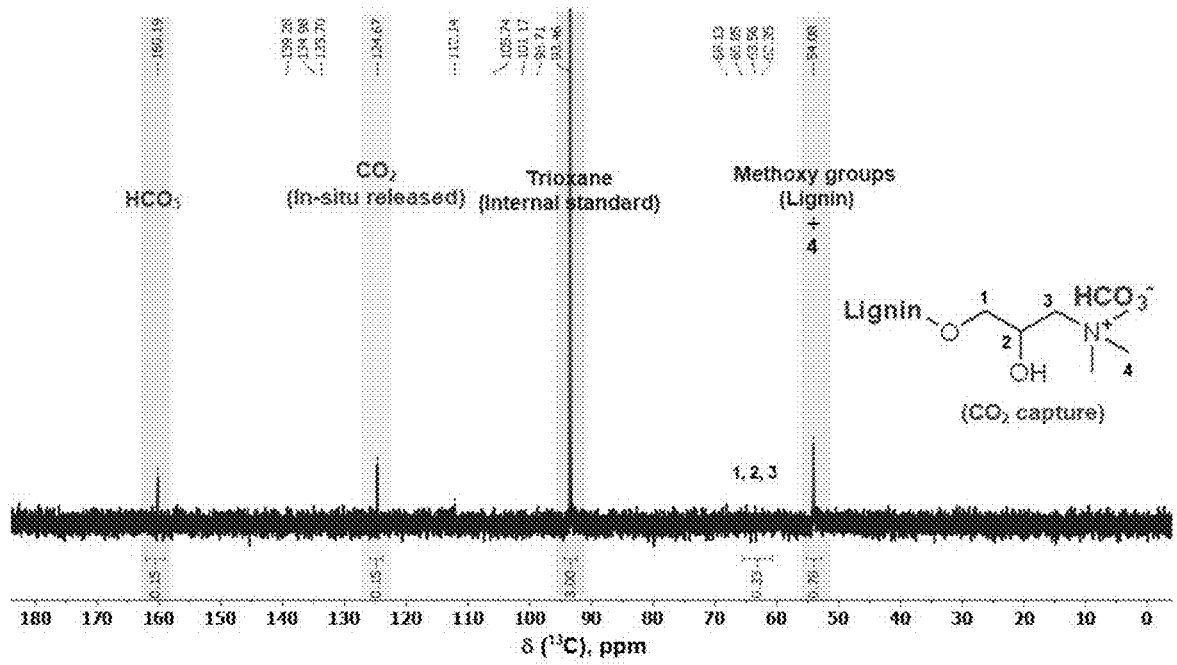
FIG. 12 depicts inverse-gated proton decoupled $^{13}C$ of $CO_2$-captured modified ionic lignin polymer using a concentrated $CO_2$ source.

The $CO_2$ capture experiments using quantitative inverse-gated proton decoupled $^{13}C$ NMR (solvent: $D_2O$) were conducted with both the concentrated $CO_2$ source (FIG. 10a) and direct air exposure (FIG. 10b). The mole amounts of $HCO_3$ and $CO_2$ per gram of modified ionic lignin polymer were calculated from the integral values of those two peaks ($HCO_3^-$: 160.2 ppm and $CO_2$: 124.7 ppm) compared to the trioxane peak at 93.5 ppm (FIGS. 10a and b). The comprehensive calculations from the NMR integral values were elaborated in the supporting information (FIGS. 11 and 12). The bicarbonate formation and $CO_2$ amount per gram of modified ionic lignin from the concentrated $CO_2$ capture showed an identical value of 0.53 mmol $g^{-1}$. On the contrary, the values were different in direct air capture, where the quantities were 0.45 mmol $g^{-1}$ for bicarbonate formation and 0.15 mmol $g^{-1}$ for the $CO_2$ amount.

In the values between concentrated $CO_2$ capture and direct air capture, the bicarbonate quantity varied far less than the $CO_2$ amount analyzed. The overall $CO_2$ quantity comprised not only the physisorbed $CO_2$ but also a portion of released $CO_2$ because the NMR solvent $D_2O$ induced some decomposition of bicarbonates to $CO_2$. The chemical $CO_2$ sorption of the modified ionic lignin polymer converted the hydroxide ($HO^-$) into bicarbonate ($HCO_3$—). The chemisorbed $CO_2$ amounts per gram of modified ionic lignin were 23 mg and 20 mg from concentrated $CO_2$ source and direct air capture, respectively. Subsequently, combining both chemisorbed and physisorbed $CO_2$ values, one gram of modified ionic lignin polymer captured 1.06 mmol (47 mg) from a concentrated $CO_2$ source and 0.60 mmol (26 mg) of $CO_2$ from ambient air exposure. The lesser value in $CO_2$ capture using the direct air capture approach was observed because ambient air contains a very low amount of $CO_2$ (0.04%). This quantitative method gave vital insights into $CO_2$ capture processes, enabling improved capture efficiency and the development of more effective carbon capture technology.

2.4. Synthesis of Cyclic Carbonate Using $CO_2$-Captured Ionic Lignin Polymer as $CO_2$ Source The notion of carrying out a model reaction for cyclic carbonate synthesis was implemented to utilize the $CO_2$-captured ionic lignin polymer (P-2) as an active $CO_2$ source. The $CO_2$ emission from the hydrated solution of $CO_2$-captured ionic lignin polymer prompted the current investigation (FIGS. 8, 11, and 12). Without wishing to be bound by any theory, it was hypothesized that the captured $CO_2$ in P-2 ($CO_2$ source) would react with a 1,3-diol derivative, forming cyclic carbonate. To validate this hypothesis, 1,3-butanediol was chosen for the reaction (FIG. 13a). A unique reaction setup comprised two round bottom flasks that were connected via a needle-attached tubing system, as seen in FIG. 13b and FIG. 14. The solution of P-2 in deionized water is heated to 60° C. to accelerate the $CO_2$ release process. The temperature was maintained at 60° C. to minimize the influence of water evaporation. The cyclic carbonate was synthesized using TMP (2,2,6,6-tetramethylpiperidine) as a base in the presence of tosyl chloride. The released $CO_2$ gas from the P-2 in RB-2 (FIG. 13b) was constantly transferred towards the RB-1 (FIG. 13b), where the cyclization took place. The internal reaction atmosphere was saturated with released $CO_2$, which was observed as $CO_2$ gas bubbles in RB-1 (FIG. 13b).

Figures 13A, 13B, 13C, 13D:
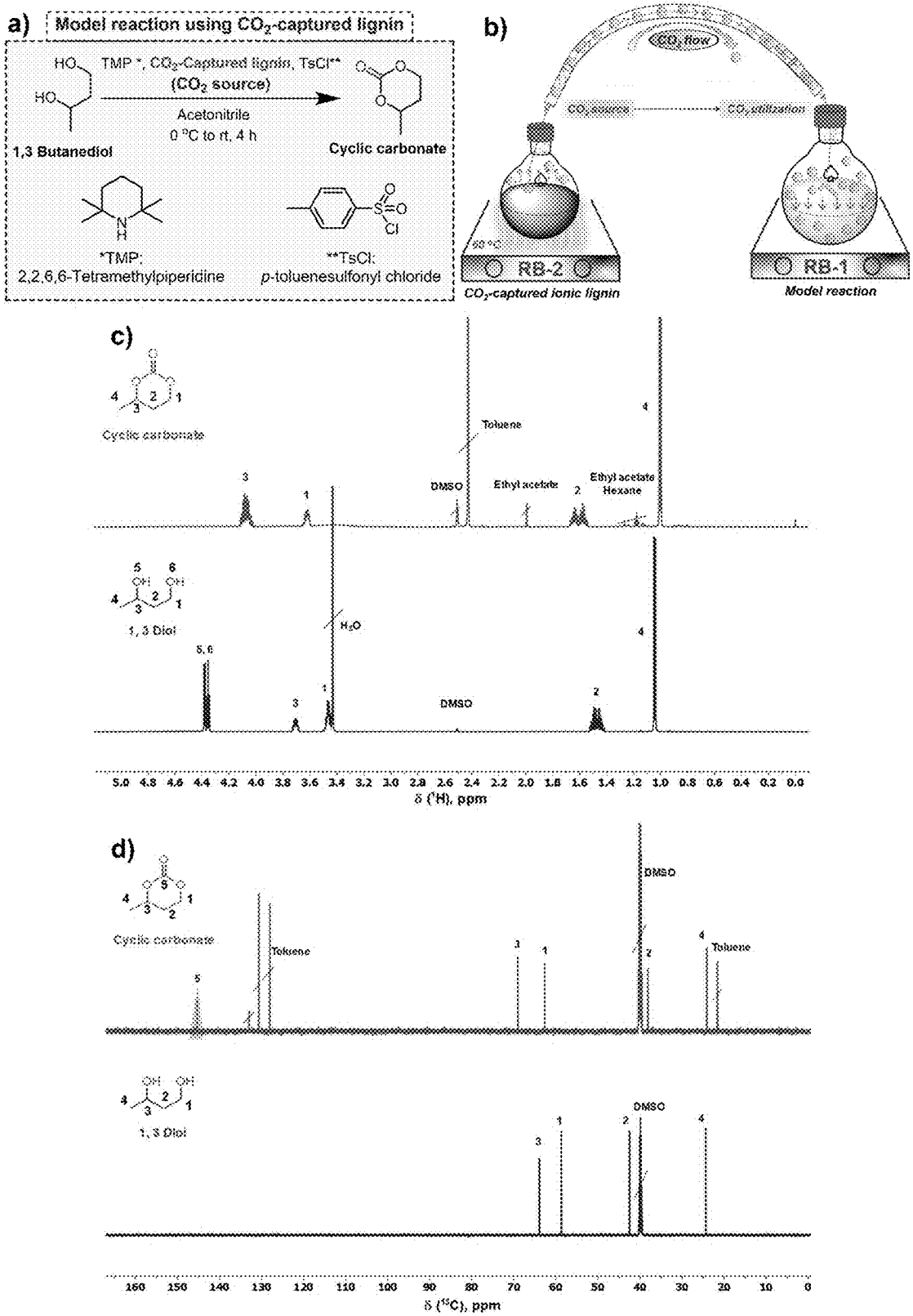
FIGS. 13A-13D depict a synthetic scheme of model cyclic carbonate synthesis reaction from 1,3 butanediol using $CO_2$-captured ionic lignin polymer as $CO_2$ source (FIG. 13A); the graphic illustration of the developed reaction set-up, where two round bottom flasks (RB-1 and RB-2) were connected via a needle-attached tubing system. The cyclization reaction occurred in RB-1, whereas the heating of aqueous solution of $CO_2$-captured ionic lignin polymer was performed in RB-2 (FIG. 13B); $^1H$ NMR of the 1,3 butanediol (starting material) and the synthesized cyclic carbonate compound (FIG. 13C); $^{13}C$ NMR of the 1, 3 butanediol and cyclic carbonate compound (FIG. 13D).
Figure 14:
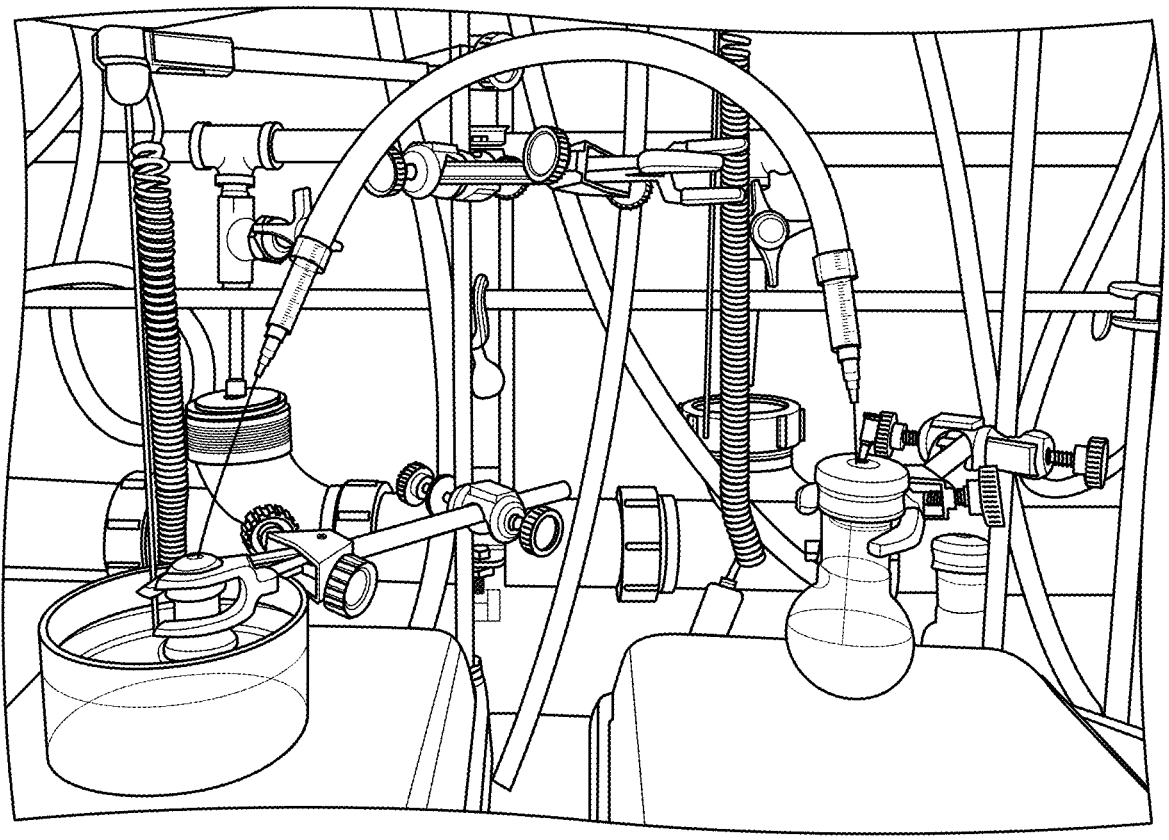
FIG. 14 depicts a photograph of the reaction set-up for the model cyclization reaction of 1,3-butanediol, where the $CO_2$-captured ionic lignin polymer could be utilized as a source of $CO_2$. Two different round bottom flasks (25 mL: RB-1 and 10 mL: RB-2) were utilized, and both flasks were connected through a manually developed needle-attached tubing system.

After completion of the reaction, the obtained product was thoroughly structurally characterized by the $^1H$ and $^{13}C$ NMR spectroscopy (FIGS. 13c and d). The peaks of the hydroxyl group protons of 1, 3 diols in 4.33-4.39 ppm disappeared from the $^1H$ NMR (FIG. 13c) of the product, indicating the participation of the hydroxyl groups in the cyclization reaction. Moreover, the typical peaks of —$CH_2$—OH (assignment 1 in FIG. 13c) and —CH(OH)— (assignment 3 in FIG. 13c) of the product were shifted from 3.46 ppm to 3.62 ppm and 3.70 ppm to 4.08 ppm, respectively. The most significant piece of evidence to support the cyclization reaction was demonstrated by the $^{13}C$ NMR of the product in FIG. 13d, which displayed the signal for the carbonyl group (>C=O) of the cyclic carbonate at 145 ppm. Notably, no reaction occurred under the same reaction conditions in the absence of the $CO_2$ source. It is, therefore, possible to conclude that the cyclic carbonate was effectively synthesized without any direct $CO_2$ input to the reaction medium.

2.5. Controllable Recycling and $CO_2$-Capturing of Modified Ionic Lignin Polymer ($CO_2$ Release↔$CO_2$ Capture)

Figures 15A, 15B, 15C:
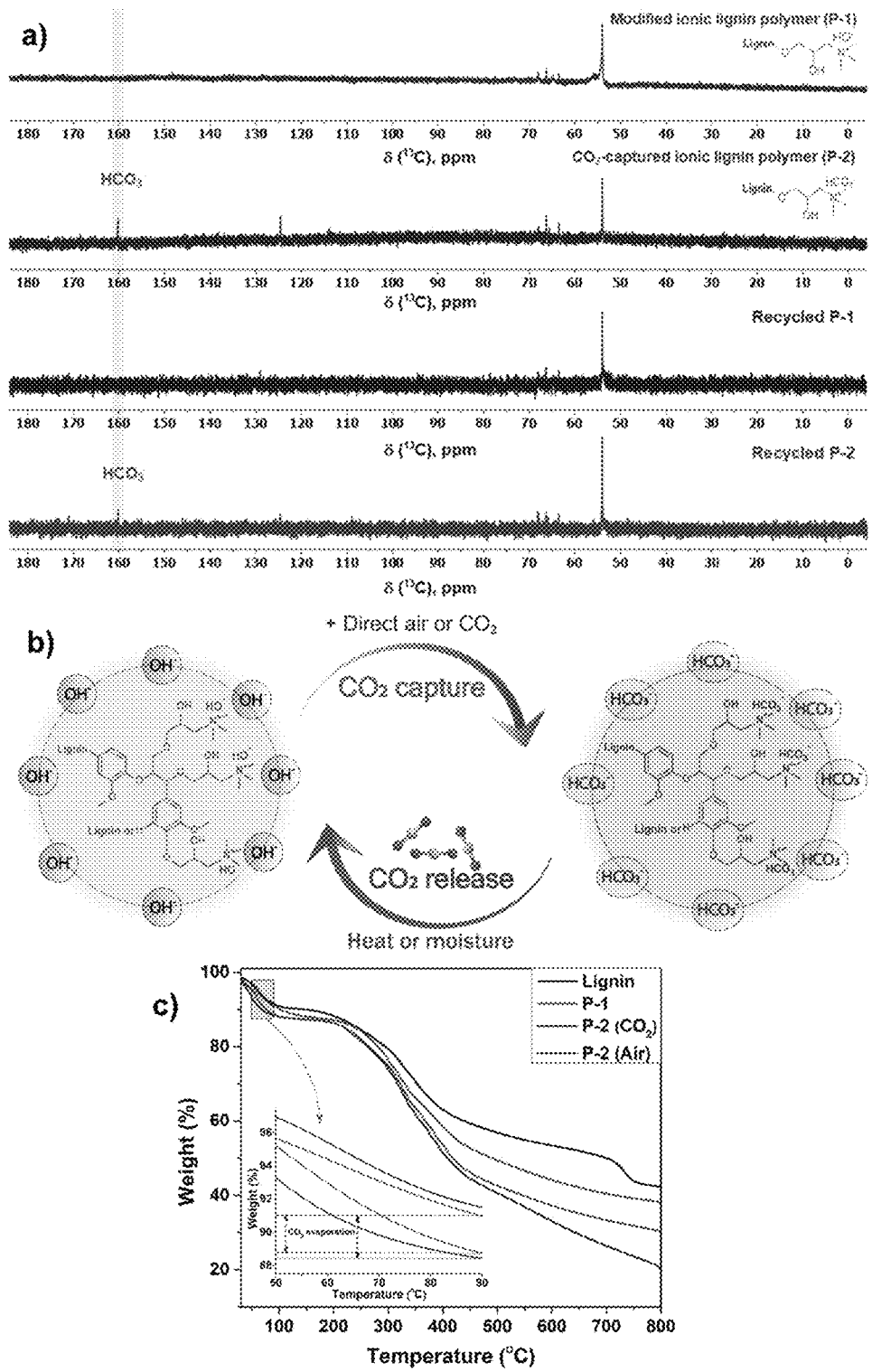
FIGS. 15A-15C depict stacked $^{13}C$ NMR of modified ionic lignin polymer (P-1), $CO_2$-captured modified ionic lignin polymer (P-2), recycled modified ionic lignin polymer (recycled P-1) and recycled $CO_2$-captured modified ionic lignin polymer (Recycled P-2) in deuterium oxide ($D_2O$) solvent (FIG. 15A). Graphic presentation on the recycling process of the modified ionic lignin polymer via continuous $CO_2$ release ↔ $CO_2$ capture (FIG. 15B). Thermogravimetric analysis (TGA) of lignin, modified ionic lignin and $CO_2$-captured modified ionic lignin using concentrated $CO_2$ source [P-2($CO_2$)] and direct air capture [P-2(Air)](FIG. 15C).
Figure 16:
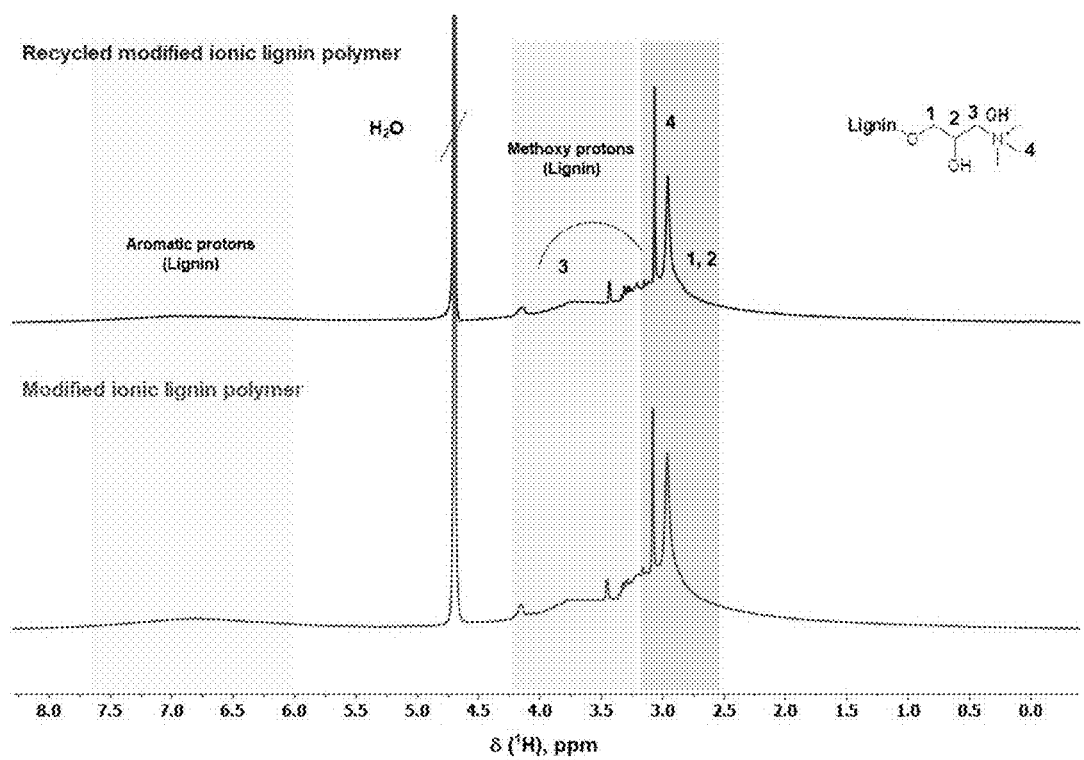
FIG. 16 depicts a $^1H$ NMR spectrum of modified ionic lignin and recycled modified ionic lignin in $D_2O$ at room temperature.
Figure 17:
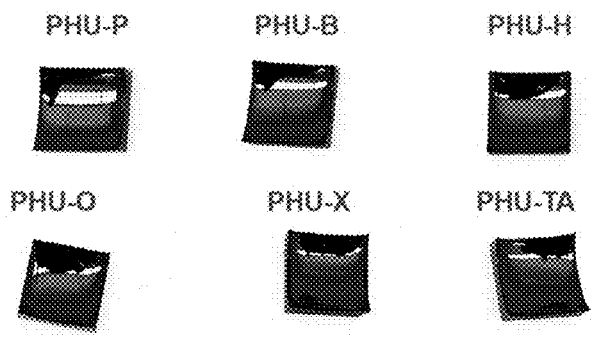
FIG. 17 depicts as—obtained polymers after overnight drying at 100° C. in the silicone mold. PHU-P, PHU-B, PHU-X (Aromatic xylene unit)→Hard; PHU-H→Less hard. PHU-O ($C_8$ aliphatic chain and two ether linkage)→Soft; PHU-D (Cao aliphatic chain and three ether linkage)→Very soft (Sticky).
Figure 18:
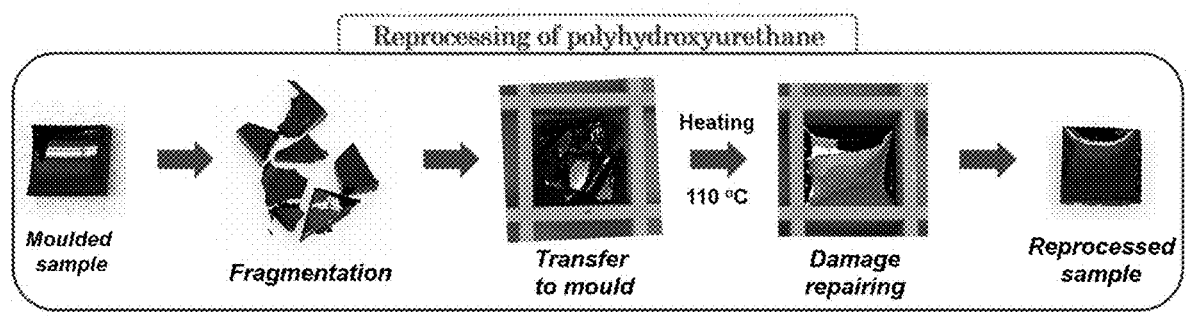
FIG. 18 depicts a schematic for reprocessing polyhydroxyurethanes.
Figure 19:
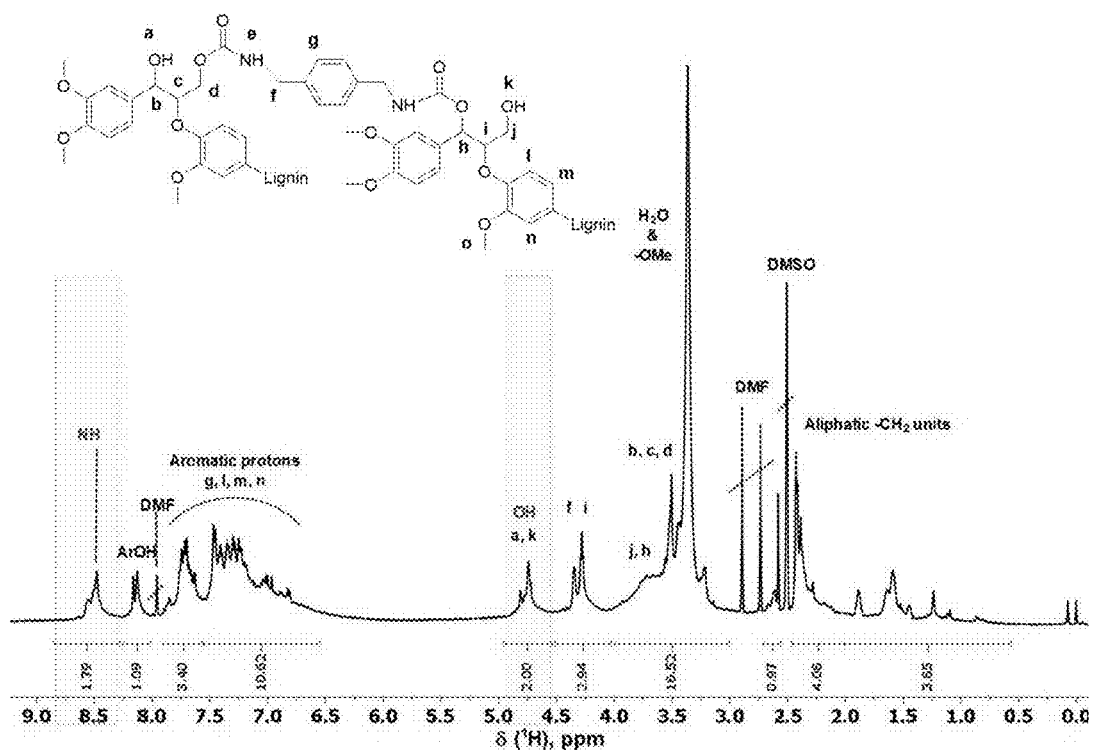
FIG. 19 depicts an NMR spectrum of a polyhydroxyurethane.
Figure 20:
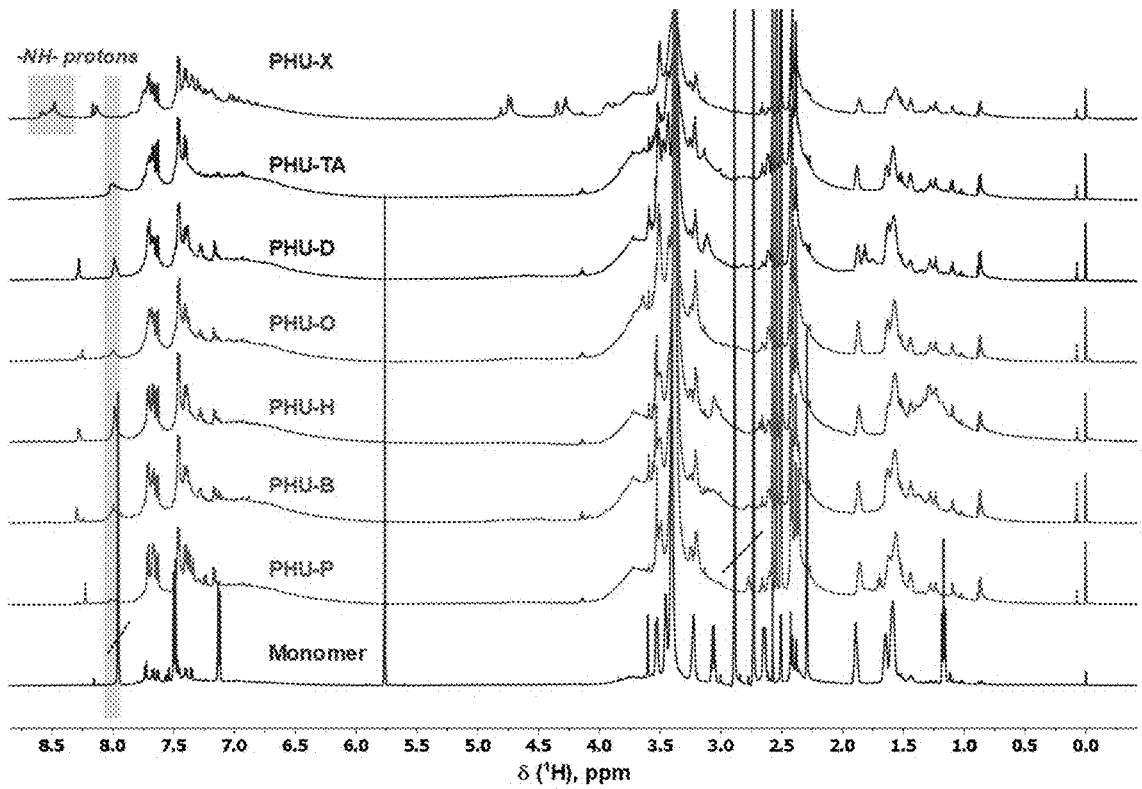
FIG. 20 depicts an NMR spectrum of apolyhydroxyurethane.
Figure 21:
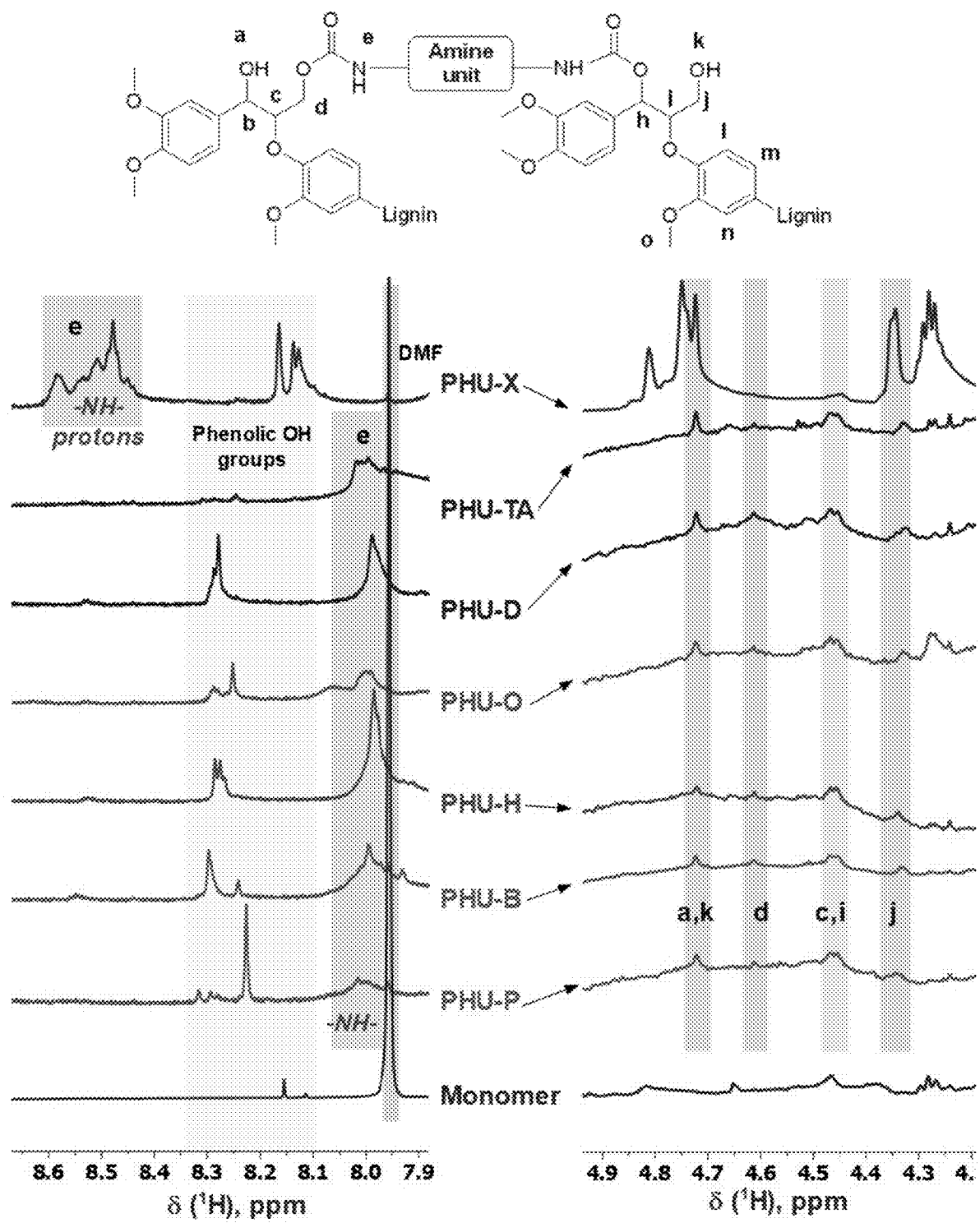
FIG. 21 depicts stacked NMR spectra of polyhydroxyurethanes.
Figure 22:
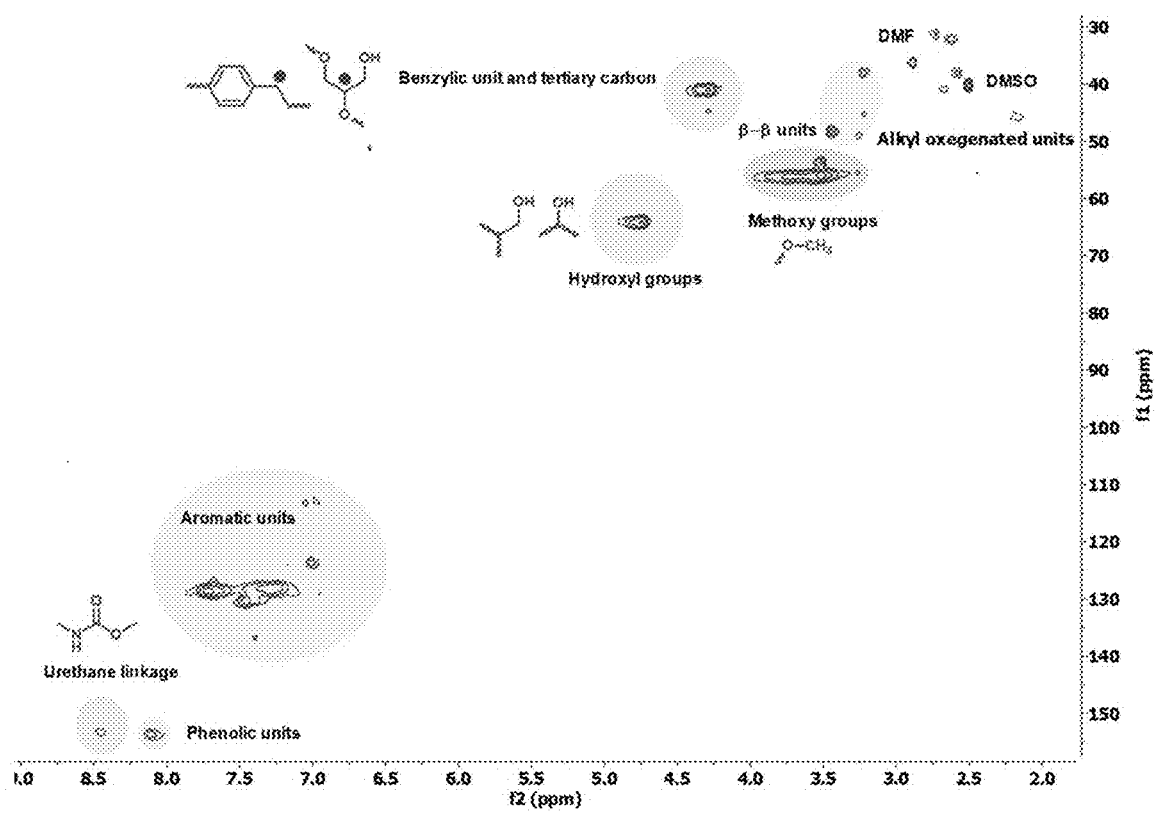
FIG. 22 depicts the 2D HSQC NMR of polyhydroxyurethane from lignin-based cyclic carbonate and p-xylylenediamine (PHU-X) of a polyhydroxyurethane.
Figure 23:
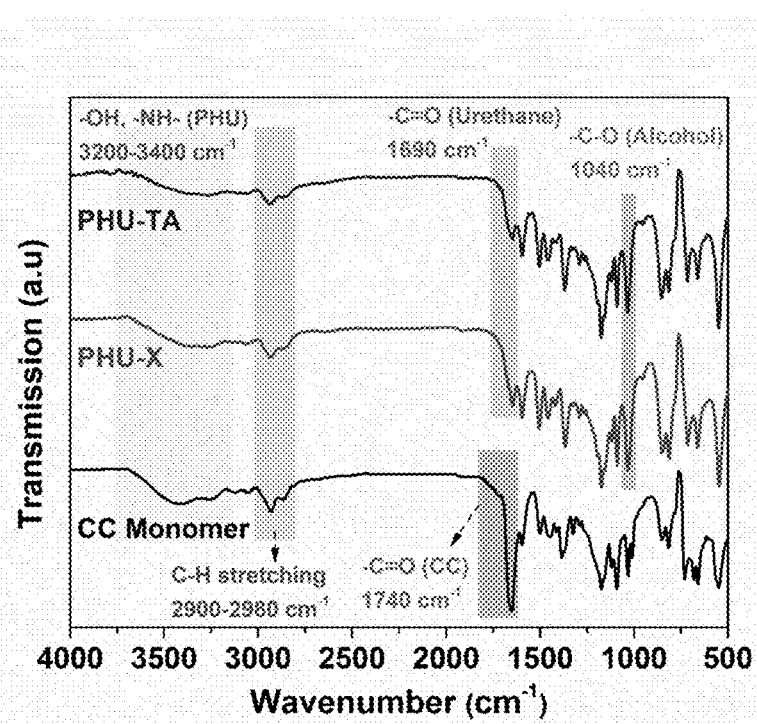
FIG. 23 depicts an FT-IR spectrum of a polyhydroxyurethane (PHU-TA, PHU-X) and cyclic carbonate monomer.
Figure 24:
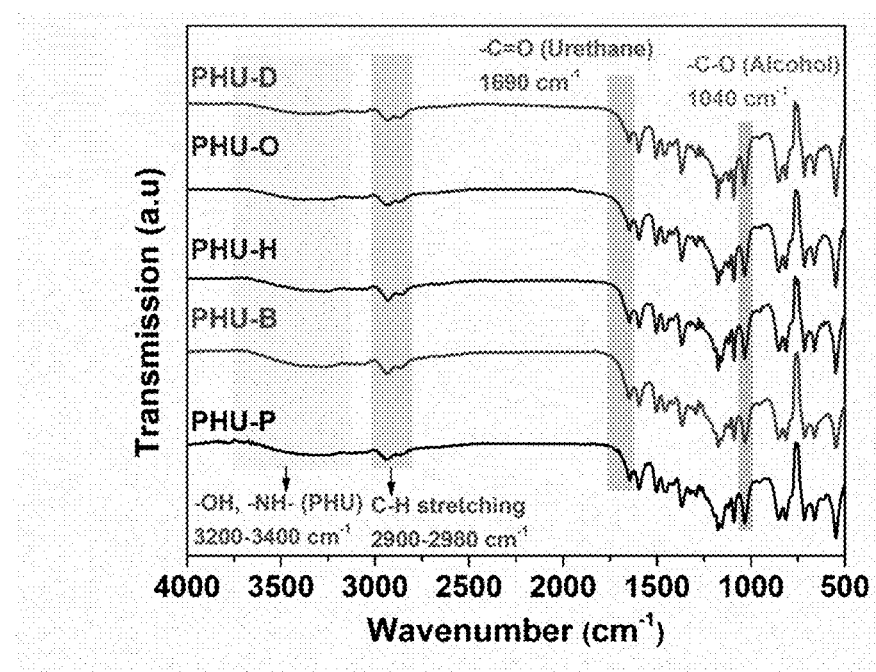
FIG. 24 depicts FT-IR spectra of PHU-P, PHU-B, PHU-H, PHU-O and PHU-D.
Figure 25:
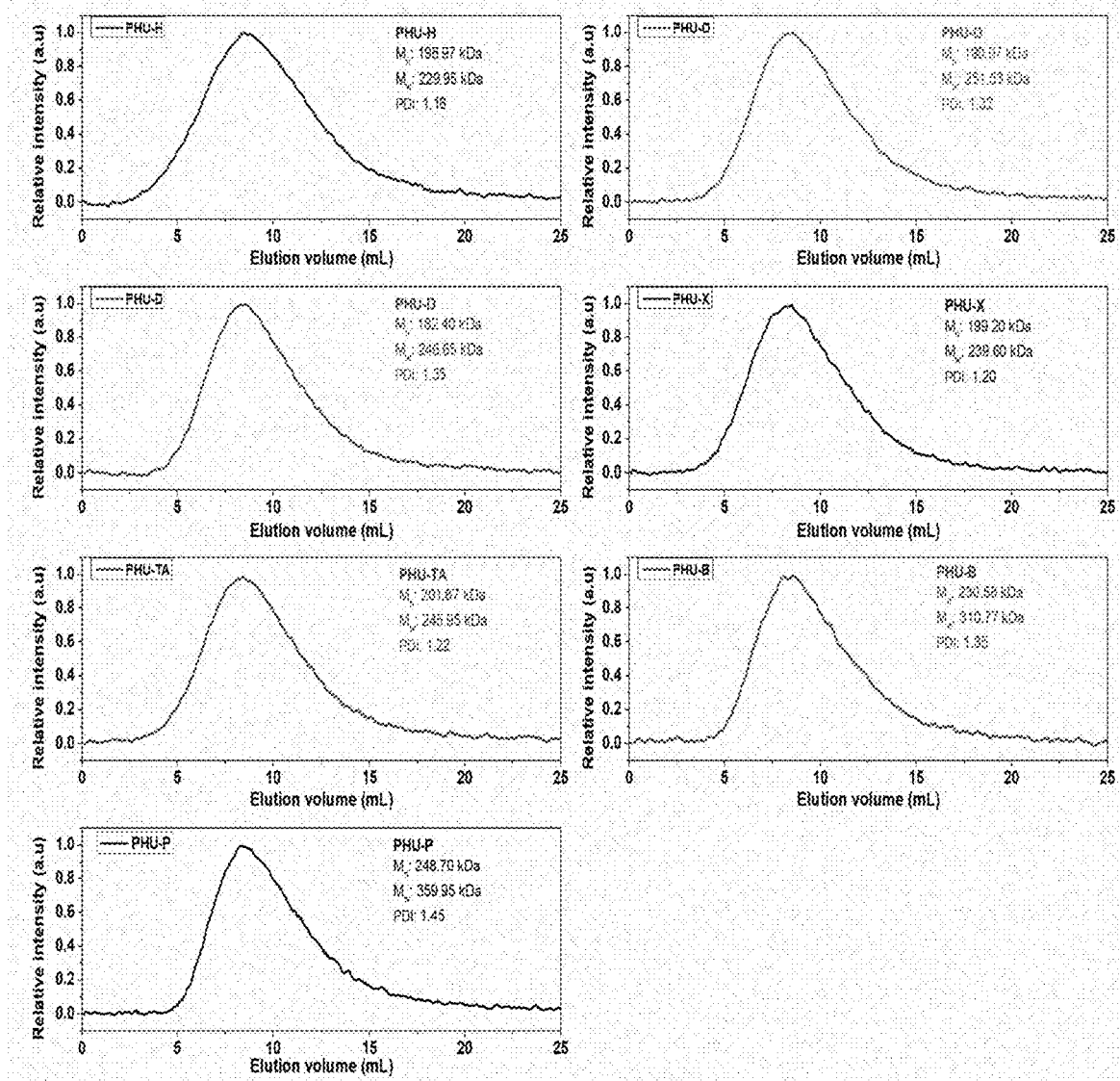
FIG. 25 depicts the molecular weight of polyhydroxyurethanes as measured by GPC.
Figure 26:
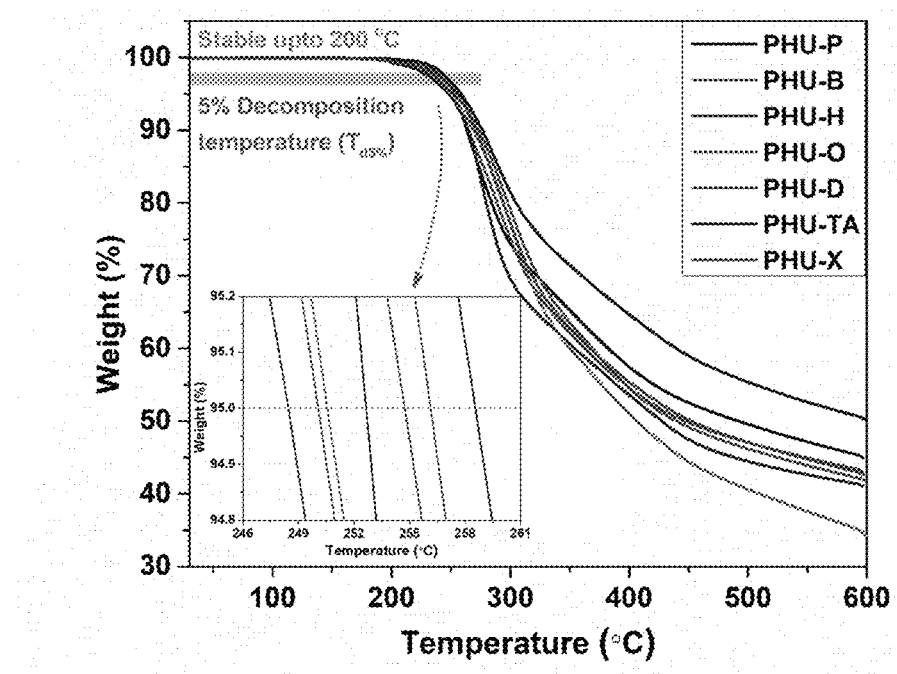
FIG. 26 depicts a thermogravimetric analysis of polyhydroxyurethanes.
Figure 27:
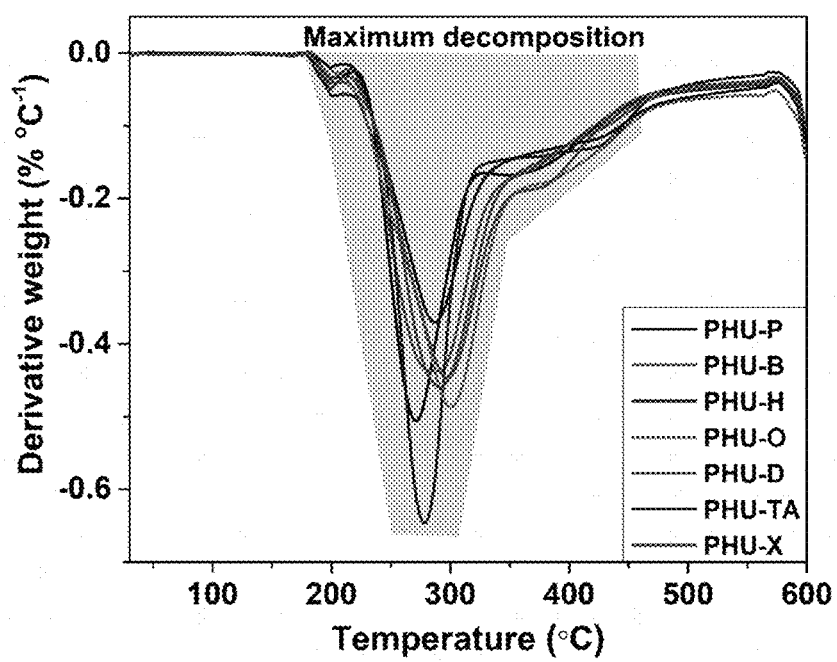
FIG. 27 depicts a derivative thermogravimetry (DTG) of polyhydroxyurethanes.
Figure 28A:
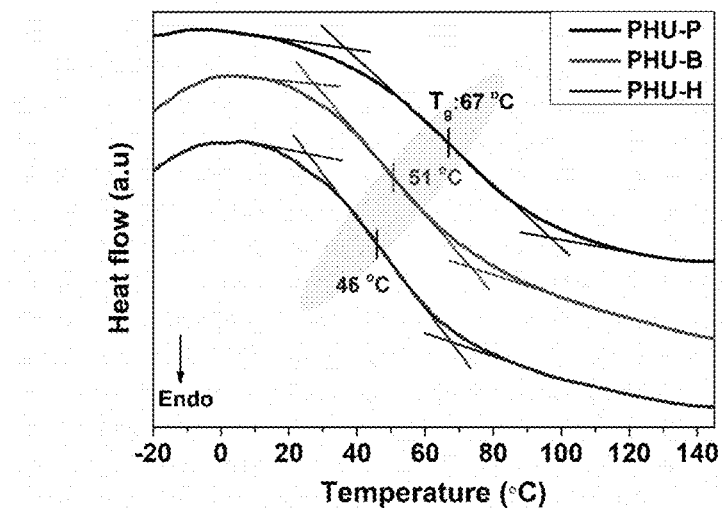
FIGS. 28A-28C depict a differential scanning calorimetry (DSC) of polyhydroxyurethanes.
Figure 28B:
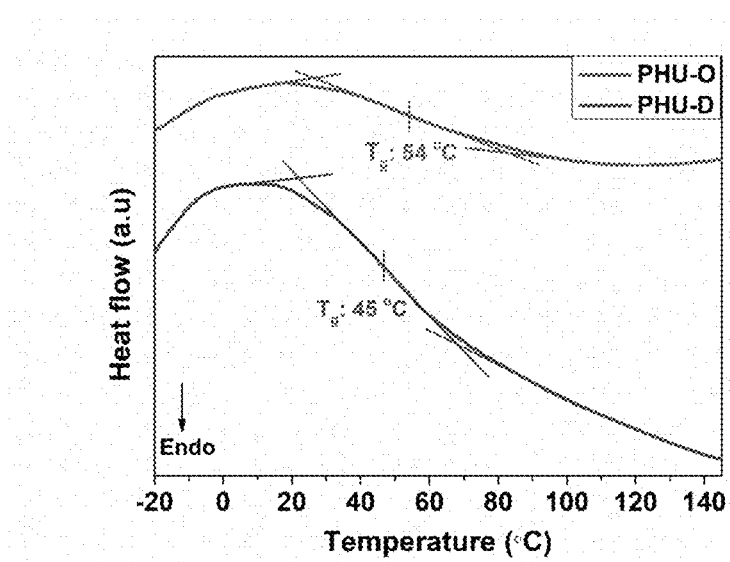
Figure 28C:
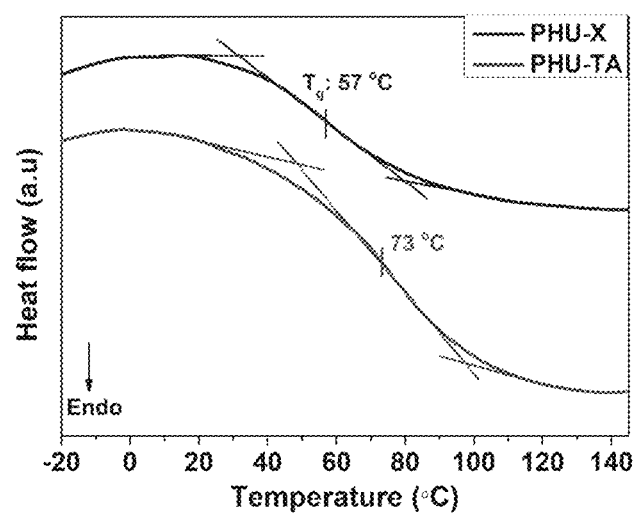

The controlled recycling of modified ionic lignin polymer via $CO_2$ release and subsequent capture presents a promising approach for sustainable carbon mitigation strategies. In the recycling study, the product was recovered from the aqueous solution of $CO_2$-captured modified ionic lignin polymer (P-2) from RB-2 (as shown in FIG. 13b) after the model cyclic carbonate synthesis reaction (FIG. 15a). Subsequently, the recovered product underwent freeze-drying, and its structure was confirmed using $^1H$ and $^{13}C$ NMR spectroscopy. Notably, heating at 60° C. was applied during the model reaction. The $^1H$ NMR spectrum (FIG. 16) of the recycled product exhibited peaks analogous to those observed in the modified ionic lignin polymer, indicating successful structural retention throughout the recycling process.

Subsequently, the $^{13}C$ NMR spectrum also exhibited a good agreement with that of the ionic lignin polymer, as illustrated in FIG. 15a. Following this, the effectiveness of the recycled material was assessed through $CO_2$ capture experiments. Significantly, characteristic peaks corresponding to bicarbonate at 160 ppm and $CO_2$ at 125 ppm were observed in FIG. 15a (starting and recycled $CO_2$-captured ionic lignin polymer). This observation suggested that both the chemisorption and physisorption of $CO_2$ remained active in the recycled product, similar to the starting material. Furthermore, FIG. 15b provides a graphical representation of the recycling process of modified ionic lignin polymer via continuous $CO_2$ release↔$CO_2$ capture.

Thermogravimetric analysis (TGA) experiment was conducted to check the thermal stability of the developed polymers. As the heating was applied during the model reaction, it was imperative to assess the thermal robustness of the modified ionic lignin polymers. FIG. 15c presents the TGA plot illustrating the thermal behavior of lignin and modified ionic lignin polymers both before and after $CO_2$ capture. Interestingly, the $CO_2$-captured modified ionic lignin polymer (utilizing either air or concentrated $CO_2$) displayed additional weight losses within the temperature range of 50° C. to 90° C., as depicted in the inset of FIG. 15c. This phenomenon could appear to be the evaporation of $CO_2$ from the $CO_2$-captured modified ionic lignin polymer. Subsequently, a weight loss near 110° C. was observed, attributed to the moisture evaporation owing to the hygroscopic nature of the modified ionic lignin polymers (P-1 and P-2). Degradation of the polymer backbones commenced above 180° C. Hence, the prominent thermal stability of the modified ionic lignin polymer emphasized the potential effectiveness and recyclability in $CO_2$ capture and utilization applications.

3. Conclusions

In this research, an innovative method to develop lignin-derived polymers for $CO_2$ capturing and conversion of the captured $CO_2$ to cyclic carbonate, utilizing abundant and non-food-based biomass, was established. Modified ionic lignin polymer is synthesized methodically from lignin and glycidyltrimethyl ammonium chloride under a basic medium (0.5M sodium hydroxide). Subsequently, the obtained polymers are employed to capture $CO_2$ from both direct air and concentrated $CO_2$ sources. The chemical structures of the modified ionic lignin polymers are systematically elucidated by using spectroscopic techniques (FT-IR, $^1H$, $^{13}C$, and 2D-HSQC NMR). The successful $CO_2$ capturing has been confirmed from the $^{13}C$ NMR peak of bicarbonate at 160 ppm, which is generated from the reaction between $CO_2$ and hydroxide ions. Moreover, the amount of captured-$CO_2$ is experimentally quantified using inverse-gated proton decoupled $^{13}C$ NMR with reference to an internal standard. Impressively, the modified ionic lignin polymers have captured 1.06 mmol (47 mg) of $CO_2$ per gram from concentrated $CO_2$ sources and 0.60 mmol (26 mg) from direct air capture. Notably, the utilization of captured-$CO_2$ ($CO_2$ source) is effectively demonstrated by performing a model reaction of cyclic carbonate synthesis from 1, 3-butanediol in a newly devised reaction set-up, highlighting the versatility of the disclosed approach. Significantly, the disclosed study underscores the potential for recyclability of the modified ionic lignin polymer in aqueous conditions under heating conditions via continuous $CO_2$ release↔$CO_2$ capture, enhancing its sustainability and usability. In summary, the disclosed work signifies a crucial sustainable advancement in recyclable carbon capture, storage, and utilization technologies, pivotal for addressing the impacts of $CO_2$ emissions.

Example 4

In this example, a novel non-isocyanate polyhydroxyurethane (NIPU) from lignin was developed. It is innovative to use biomass lignin for the preparation of NIPU, marking the first instance of such a development. In addition, the newly synthesized NIPU incorporates $CO_2$, a greenhouse gas. While previous $CO_2$ gas-based NIPU formulations typically required high-pressure conditions for synthesis, our method enables synthesis at normal pressure and room temperature, demonstrating innovation in green chemistry. Furthermore, this NIPU can be chemically degraded under basic conditions, addressing environmental concerns associated with plastic waste. Notably, this work represents the first work of NIPU synthesis directly from natural lignin rather than using model compound or lignin derivatives.

Polyurethanes have extensive applications in elastomer, biomedical, coating, sealing, adhesive, and electrical device applications. Non-isocyanate polyurethane, in particular, garners attention for its non-toxicity and environmental friendliness, as it does not require isocyanate during manufacturing. The present study not only advances sustainability but also enhances the functionalities of NIPU materials by incorporating natural lignin and $CO_2$, thereby contributing to environmental stewardship and material innovation.

The central focus of the presented work revolves around the reactions between cyclocarbonated lignin and amine-containing monomers, as depicted in the scheme.

The formed polyurethanes by the disclosed methods are characterized as shown in FIGS. 17-28.

Additional Aspects

1. A polymeric material comprising:
   one or more fragments of Formula I:

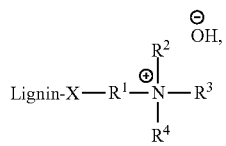

(I)

wherein X is selected from
   null,

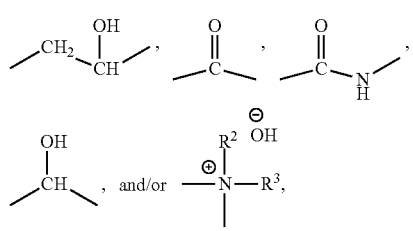

wherein $R^1$ is selected from null or $C_1$-$C_{40}$ aliphatic group,
   wherein $R^1$ is optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl) ($C_{3-10}$ heterocycloalkenyl), halide, —C(O)—OH, or hydroxy;
   wherein when X is null, $R^1$ is not null, or wherein $R^1$ is null, X is not null;
   wherein two of $R^2$, $R^3$, and $R^4$ may together form a 5 or 6-membered ring, or wherein $R^2$ and $R^3$, each and on each occasion, independent of the other, are selected from $C_1$-$C_{40}$ aliphatic group,
   wherein $R^4$ is selected from $C_1$-$C_{40}$ aliphatic group or lignin, and
   wherein each of $R^2$, $R^3$, and $R^4$ is independently and optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl) ($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl) ($C_{3-10}$ cycloalkenyl), —($C_{0-10}$ alkyl)($C_{3-10}$ heterocycloalkenyl), halide, —C(O)—OH, or hydroxy.

2. The polymeric material of aspect 1, wherein $R^1$ is a $C_1$-$C_{40}$ aliphatic group selected from, $C_1$-$C_{20}$ alkylene, $C_1$-$C_{20}$ alkenylene, $C_1$-$C_6$ alkynylene, —($C_{0-10}$ alkylene) ($C_6$-$C_{14}$ aryl), or —($C_{0-10}$ alkylene)(aryl-N=N-aryl group),

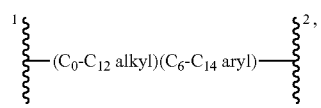

wherein squiggly line 1 is a connection to X, and squiggly line 2 is a connection to $N^+$, wherein $R^1$ is optionally substituted one or more of $C_{1-10}$ alkyl, $C_{1-10}$ alkoxy, $C_{1-10}$ heteroalkyl, —($C_{0-10}$ alkyl-)($C_{6-14}$ aryl), —($C_{0-10}$ alkyl) ($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl-)($C_{3-10}$ heterocycloalkenyl), halide, —C(O)—OH, or hydroxy.

3. The polymeric material of any one of aspects 1-2, comprising one or more fragments of formula (II)

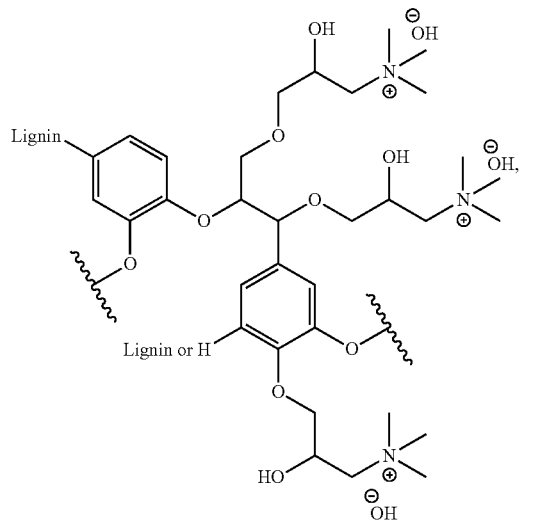

(II)

wherein ⁓ is —H, —$CH_3$, or further lignin.

4. The polymeric material of any one of aspects 1-2, comprising one or more fragments of formula (III)

(III)

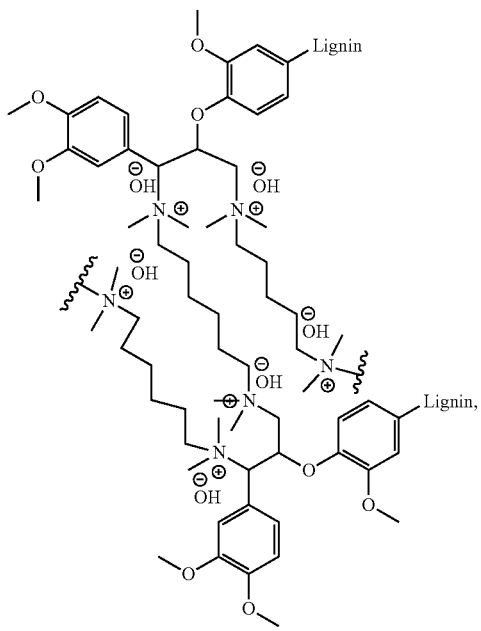

wherein ⌇⌇⌇ is a null or a further lignin.

5. The polymeric material of any one of aspects 1-4, wherein the polymeric material is a carbon dioxide-capturing material.

6. The polymeric material of aspect 5, wherein a carbon dioxide capture is reversible.

7. The polymeric material of aspect 5 or 6, wherein the polymeric material is recyclable.

8. An article comprising the polymeric material of any one of aspects 1-7.

9. The article of aspect 8, wherein the article is a film, a textile, a filter, a membrane, an absorbent, or any combination thereof.

10. The article of aspect 8 or 9 wherein the article is recyclable.

11. A method comprising:
    reacting lignin-containing material with a nitrogen-containing material to form a polymeric material comprising one or more fragments of formula (I)

(I)

Lignin—X—R$^1$—N$^{\oplus}$(R$^2$)(R$^3$)(R$^4$) · OH$^{\ominus}$ wherein X is selected from
null

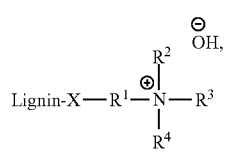

-continued

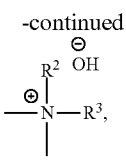, and/or —N$^{\oplus}$(R$^2$)(R$^3$)—OH$^{\ominus}$, wherein R$^1$ is selected from null or C$_1$-C$_{40}$ aliphatic group, wherein R$^1$ is optionally substituted with one or more of C$_{1-10}$ alkyl, C$_{1-10}$ alkoxy, C$_{1-10}$ heteroalkyl, —(C$_{0-10}$ alkyl)(C$_{6-14}$ aryl), —(C$_{0-10}$ alkyl)(C$_{1-13}$ heteroaryl), —(C$_{0-10}$ alkyl)(C$_{6-14}$ aryloxy), —(C$_{0-10}$ alkyl)(C$_{3-10}$ cycloalkyl), —(C$_{0-10}$ alkyl)(C$_{3-10}$ heterocycloalkyl), —(C$_{0-10}$ alkyl)(C$_{3-10}$ cycloalkenyl), —(C$_{0-10}$ alkyl)(C$_{3-10}$ heterocycloalkenyl), halide, —C(O)—OH, or hydroxy;

wherein when X is null, R$^1$ is not null, or wherein R$^1$ is null, X is not null;

wherein two of R$^2$, R$^3$, and R$^4$ may together form a 5 or 6-membered ring, or wherein R$^2$ and R$^3$, each and on each occasion, independent of the other, are selected from C$_1$-C$_{40}$ aliphatic group, wherein R$^4$ is selected from C$_1$-C$_{40}$ aliphatic group or lignin, and wherein each of R$^2$, R$^3$, and R$^4$ is independently and optionally substituted with one or more of C$_{1-10}$ alkyl, C$_{1-10}$ alkoxy, C$_{1-10}$ heteroalkyl, —(C$_{0-10}$ alkyl)(C$_{6-14}$ aryl), —(C$_{0-10}$ alkyl)(C$_{1-13}$ heteroaryl), —(C$_{0-10}$ alkyl)(C$_{6-14}$ aryloxy), —(C$_{0-10}$ alkyl)(C$_{3-10}$ cycloalkyl), —(C$_{0-10}$ alkyl)(C$_{3-10}$ heterocycloalkyl), —(C$_{0-10}$ alkyl)(C$_{3-10}$ cycloalkenyl), —(C$_{0-10}$ alkyl)(C$_{3-10}$ heterocycloalkenyl), halide, —C(O)—OH, or hydroxy.

12. The method of aspect 11, wherein R$^1$ is a C$_1$-C$_{40}$ aliphatic group selected from C$_1$-C$_{20}$ alkylene, C$_1$-C$_{20}$ alkenylene, C$_1$-C$_6$ alkynylene, —(C$_{0-10}$ alkylene)(C$_{6-14}$ aryl), or —(C$_{0-10}$ alkyl-ene)(aryl-N=N-aryl group),

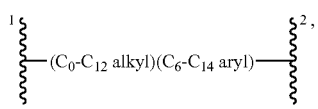

wherein squiggly line 1 is a connection to X, and squiggly line 2 is a connection to N$^+$, wherein R$^1$ is optionally substituted one or more of C$_{1-10}$ alkyl, C$_{1-10}$ alkoxy, C$_{1-10}$ heteroalkyl, —(C$_{0-10}$ alkyl)(C$_{6-14}$ aryl), —(C$_{0-10}$ alkyl)(C$_{1-13}$ heteroaryl), —(C$_{0-10}$ alkyl)(C$_{6-14}$ aryloxy), —(C$_{0-10}$ alkyl)(C$_{3-10}$ cycloalkyl), —(C$_{0-10}$ alkyl)(C$_{3-10}$ heterocycloalkyl), —(C$_{0-10}$ alkyl)(C$_{3-10}$ cycloalkenyl), —(C$_{0-10}$ alkyl)(C$_{3-10}$ heterocycloalkenyl), halide, —C(O)—OH, or hydroxy.

13. The method of any one of aspects 11-12, wherein the polymeric material comprises one or more fragments of formula (II)

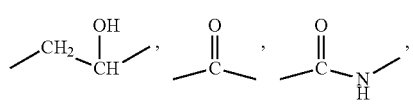

(II)

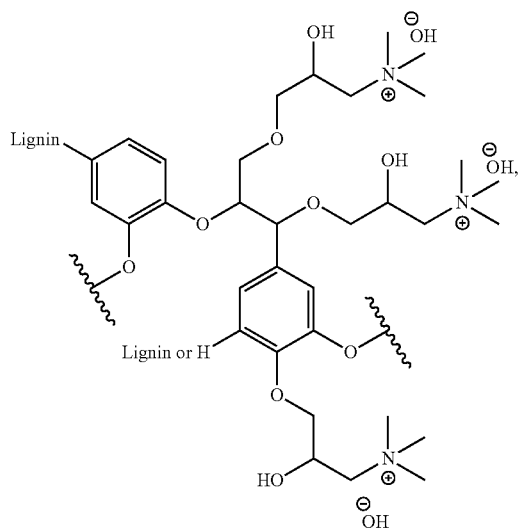

wherein ⁓ is —H, —CH₃, or further lignin.

14. The method of any one of aspects 11-12, wherein the polymeric material comprises one or more fragments of formula (III)

(III)

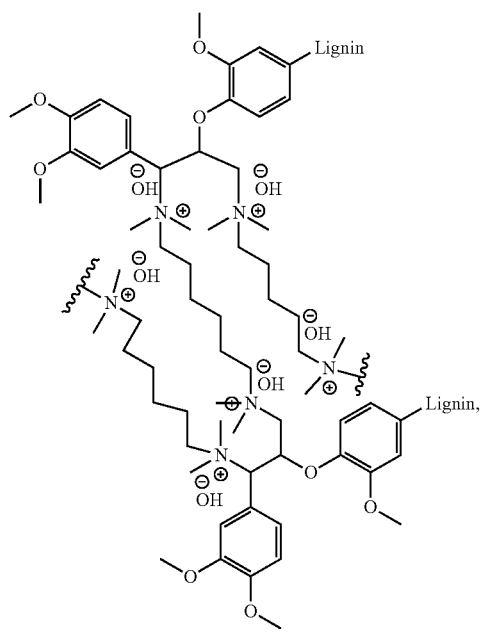

wherein ⁓ is a null or a further lignin.

15. The method of any one of aspects 11-14, wherein the nitrogen-containing material has a formula

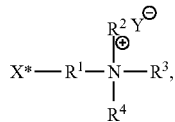

wherein Y is a counter ion that is different from OH, and wherein X* is selected from

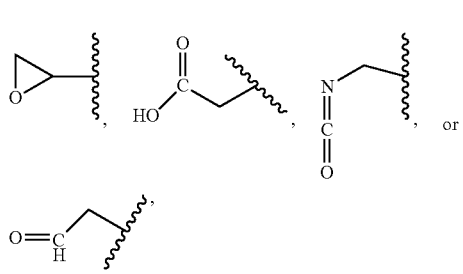

and wherein $R^{4*}$ is an $C_1$-$C_{40}$ aliphatic group.

16. The method of any one of aspects 11-15, wherein the nitrogen-containing material is selected from

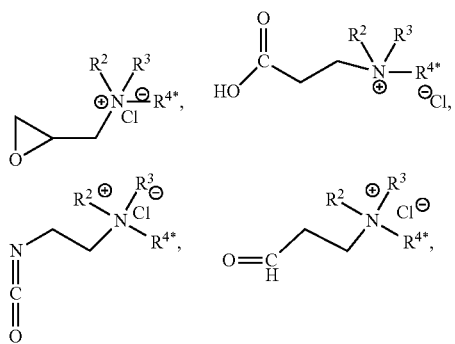

$R^2R^3N$—$R^1$—$NR^2R^3$.

17. The method of any one of aspects 11-16, wherein the polymeric material is a carbon dioxide-capturing material.

18. The method of aspect 17, wherein a carbon dioxide capture is reversible.

19. The method of any one of aspects 11-18, wherein the polymeric material is recyclable.

20. The method of any one of aspects 11-19, further comprising making an article from the polymeric material.

21. The method of aspect 20, wherein the article is a film, a textile, a filter, a membrane, an absorbent, or any combination thereof.

22. The method of aspect 20 or 21, wherein the article is recyclable.

23. A method of capturing a carbon dioxide comprising exposing an article comprising a polymeric material of any one of aspects 1-7 to a gas stream comprising the carbon dioxide; and reacting the polymeric material with the carbon dioxide to form a compound comprising one or more fragments of formula (VI), (VI)

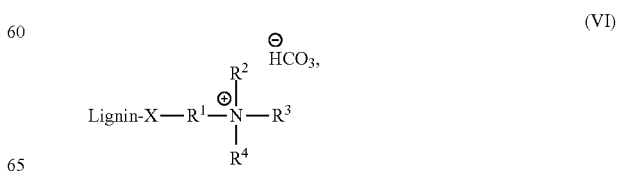

wherein X is selected from
null

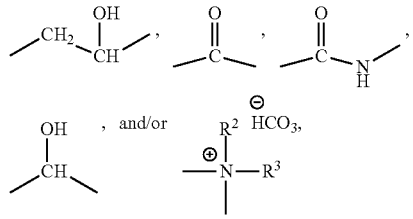, and/or wherein $R^1$ is selected from null or $C_1$-$C_{40}$ aliphatic group, wherein $R^1$ is optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy;

wherein when X is null, $R^1$ is not null, or wherein $R^1$ is null, X is not null;

wherein two of $R^2$, $R^3$, and $R^4$ may together form a 5 or 6-membered ring, or wherein $R^2$ and $R^3$, each and on each occasion, independent of the other, are selected from $C_1$-$C_{40}$ aliphatic group, wherein $R^4$ is selected from $C_1$-$C_{40}$ aliphatic group or lignin, and wherein each of $R^2$, $R^3$, and $R^4$ is independently and optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy, thereby removing the carbon dioxide from the gas stream.

24. The method of 23, wherein $R^1$ is a $C_1$-$C_{40}$ aliphatic group selected from $C_1$-$C_{20}$ alkylene, $C_1$-$C_{20}$ alkenylene, $C_1$-$C_6$ alkynylene, —($C_{0-10}$ alkylene)($C_6$-$C_4$ aryl), or —($C_{0-10}$ alkyl-ene)(aryl-N=N-aryl group),

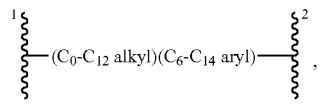

wherein squiggly line 1 is a connection to X, and squiggly line 2 is a connection to $N^+$, wherein $R^1$ is optionally substituted one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy.

25. The method of aspect 24, wherein the method is reversible, is such that the captured carbon dioxide is released.

26. A method comprising:
a) providing a polymer composition comprising one or more fragments of formula (IV)

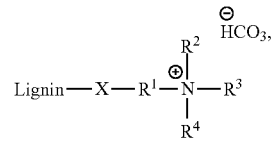 (VI)

wherein X is selected from
null

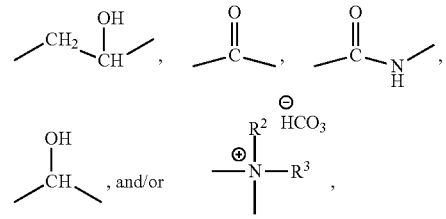, and/or wherein $R^1$ is selected from null or $C_1$-$C_{40}$ aliphatic group, wherein $R^1$ is optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy;

wherein when X is null, $R^1$ is not null, or wherein $R^1$ is null, X is not null;

wherein two of $R^2$, $R^3$, and $R^4$ may together form a 5 or 6-membered ring, or wherein $R^2$ and $R^3$, each and on each occasion, independent of the other, are selected from $C_1$-$C_{40}$ aliphatic group, wherein $R^4$ is selected from $C_1$-$C_{40}$ aliphatic group or lignin, and wherein each of $R^2$, $R^3$, and $R^4$ is independently and optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy;

b) releasing carbon dioxide from the polymer composition; and c) utilizing the released carbon dioxide to form a compound comprising a cyclic carbonate.

27. The method of aspect 25, wherein $R^1$ is a $C_1$-$C_{40}$ aliphatic group selected from $C_1$-$C_{20}$ alkylene, $C_1$-$C_{20}$ alkenylene, $C_1$-$C_6$ alkynylene, —($C_{0-10}$ alkylene)($C_6$-$C_{14}$ aryl), or —($C_{0-10}$ alkyl-ene)(aryl-N=N-aryl group),

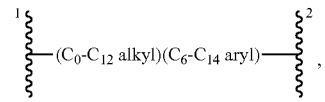

wherein squiggly line 1 is a connection to X, and squiggly line 2 is a connection to N⁺, wherein $R^1$ is optionally substituted one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy.

28. The method of any one of aspects 25-26, wherein the polymer composition comprises one or more fragments of formula:

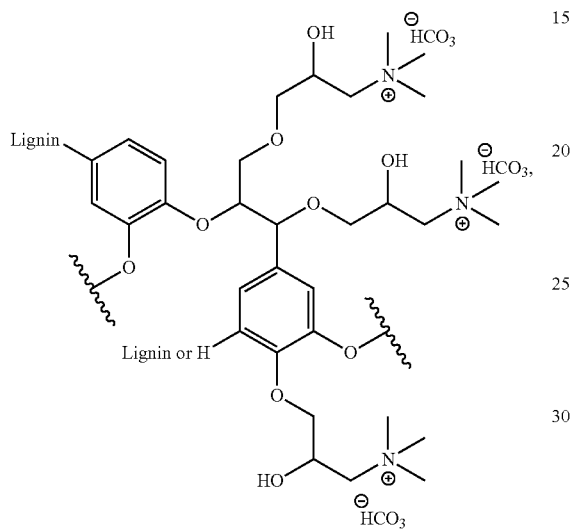

wherein ⌇ is —H, —CH₃, or further lignin.

29. The method of any one of aspects 25-27, wherein the polymer composition comprises one or more fragments of formula:

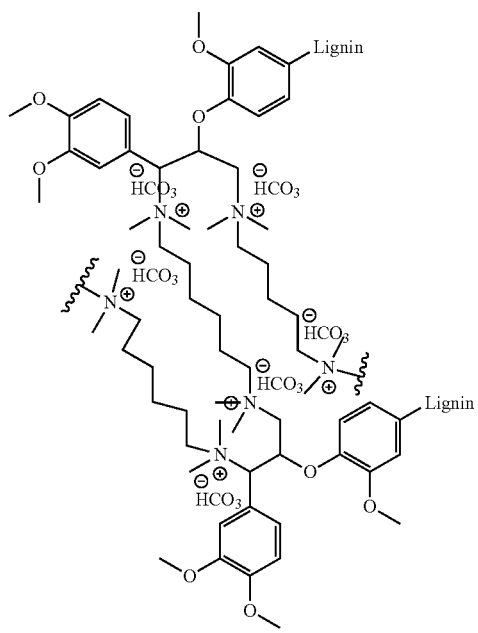

wherein ⌇ is a null or a further lignin.

30. A method comprising:
reacting a lignin-based macromonomer of formula (X) with a polyamine to form a polyhydroxyurethane (PHU) of formula (XI)

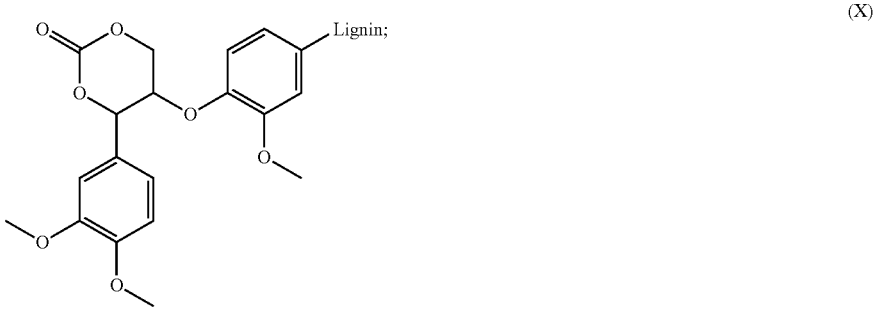

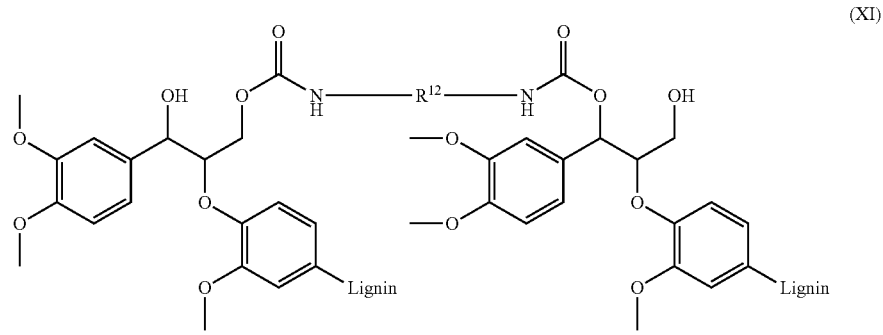

wherein $R^{12}$ is $C_1$-$C_{40}$ aliphatic group, wherein $R^{12}$ is optionally substituted with one or more of $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy.

31. The method of aspect 30, wherein $R^{12}$, is selected from $C_1$-$C_{20}$ alkylene, $C_1$-$C_{20}$ alkenylene, $C_1$-$C_6$ alkynylene, —($C_{0-10}$ alkylene)($C_6$-$C_{14}$ aryl), or —($C_{0-10}$ alkylene)(aryl-N=N-aryl group), wherein $R^{12}$ is optionally substituted one or more of $C_{1-10}$ alkyl, $C_{1-10}$ alkoxy, $C_1$.o heteroalkyl, —($C_{0-10}$alkyl)($C_{6-14}$aryl), —($C_{0-10}$ alkyl)($C_{1-13}$heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-13}$ heterocycloalkyl), —($C_{0-10}$ alkyl)($C_{3-10}$ cycloalkenyl), —($C_{0-10}$ alkyl)($C_{3-10}$ heterocycloalkenyl), halide, —C(O)—OH, or hydroxy.

32. The method of aspect 30 or 31, wherein the polyamine comprises an aromatic diamine, an aliphatic diamine, an ether linkage-based aliphatic diamine, a triamine, or a combination thereof.

33. The method of any one of aspects 30-32, wherein the lignin-based macromonomer (VII) is formed by reacting a lignin-based material having one or more OH groups with a carbon dioxide.

34. The method of any one of aspects 30-33, wherein polyamine is selected from

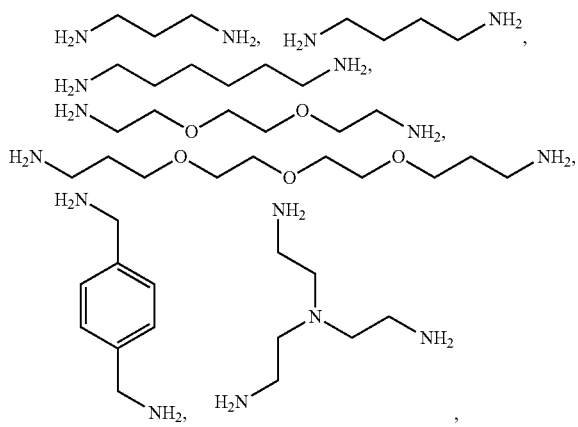

or a combination thereof.

35. The method of any one of aspects 30-34, wherein the reaction of lignin-containing material with the carbon dioxide is conducted at atmospheric pressure.

36. The method of any one of aspects 30-35, wherein the reaction of lignin-containing material with the carbon dioxide is conducted at a temperature of 0° C. to room temperature.

37. The method of any one of aspects 30-36, wherein the polyhydroxyurethane is chemically degradable.

38. A polyhydroxyurethane polymer formed by the methods of any one of aspects 30-37.

39. An article comprising the polyhydroxyurethane polymer of aspect 38.

40. A method recycling of the polymer of aspect 38, comprising degrading the polymer under basic conditions.

What is claimed is:

1. A polymeric material comprising one or more fragments of Formula:

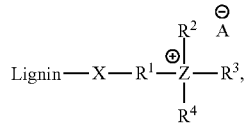

wherein A is hydroxide, bicarbonate, or a combination thereof,

Z is independently P or N;

X is independently:

null,

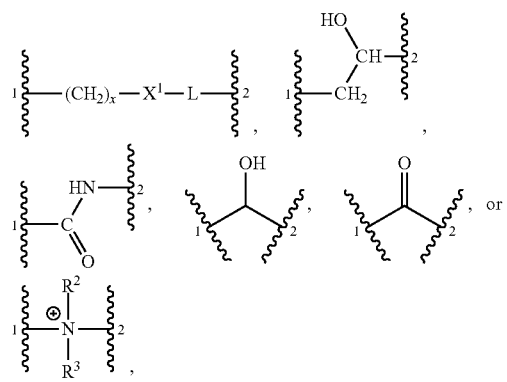

wherein wavy line 1 represents the point of attachment to lignin, and wavy line 2 represents the point of attachment to $R^1$;

$X^1$ is null, S, O, NH, or a 1,2,3,-triazole;

x is 0-8;

L is null, $C_{1-10}$alkylene, or $C_{1-10}$heteroalkylene;

$R^1$ is selected from null or $C_1$-$C_{10}$ aliphatic group, wherein $R^1$ is optionally substituted with one or more of $C_{1-10}$ alkyl, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)COOH, —($C_{0-10}$ alkyl)N($C_{1-4}$alkyl) 3, or —($C_{0-10}$ alkyl)-OH;

at least one of X and $R^1$ is not null;

any two or more of $R^1$, $R^2$, $R^3$, and $R^4$ may together form a ring, $R^2$, $R^3$, and $R^4$ are in each case independently selected from $C_1$-$C_{10}$ aliphatic group, each of $R^1$, $R^2$, $R^3$, and $R^4$ is independently and optionally substituted with one or more of a lignin fragment, $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), —($C_{0-10}$ alkyl)COOH, —($C_{0-10}$ alkyl)N($C_{1-4}$alkyl) 3, or —($C_{0-10}$ alkyl)-OH;

wherein when Z is a sp² hybridized nitrogen, then $R^4$ is optionally null, and wherein the polymeric material is water soluble.

2. The polymeric material of claim 1, wherein A is bicarbonate.

3. The polymeric material of claim 1, wherein X is

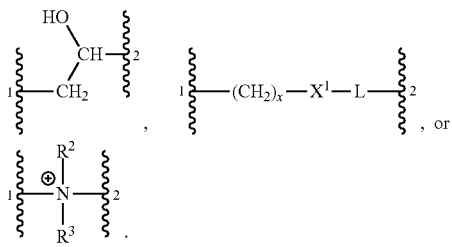

4. The polymeric material of claim 1, wherein X is:

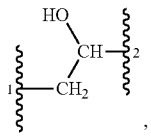

and $R^1$ is $C_{1-3}$alkylene.

5. The polymeric material of claim 1, wherein X is:

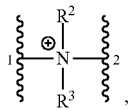

and $R^1$ is $C_{2-10}$alkylene.

6. The polymeric material of claim 1, wherein X is:

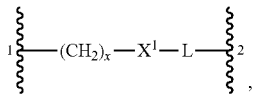

and x is 1-4.

7. The polymeric material of claim 6, wherein $X^1$ is S, and x is 2.

8. The polymeric material of claim 6, wherein $X^1$ is 1,2,3 triazole, and x is 1, 2, or 3.

9. The polymeric material of claim 6, wherein L is $C_{0-4}$alkylene.

10. The polymeric material of claim 1, wherein $R^1$, $R^2$, and $R^3$ together form a heteroaryl or heterocyclic ring.

11. The polymeric material of claim 10, wherein $R^1$, $R^2$, and $R^3$ together form a pyridine ring, an imidazole ring, or an N-alkyl derivative thereof.

12. The polymeric material of claim 1, having the formula:

-continued

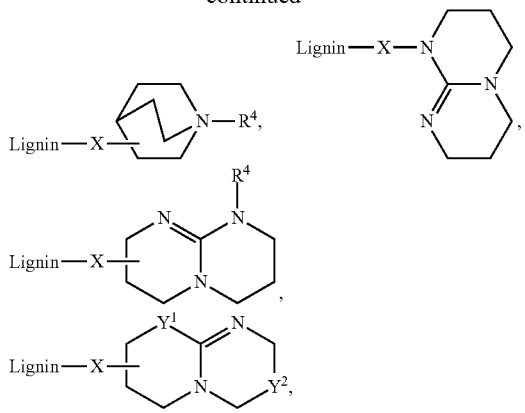

wherein $Y^1$ is null, $CH_2$, or $CH_2CH_2$, and $Y^1$ is null, $CH_2$, or $CH_2CH_2$.

13. The polymeric material of claim 1, wherein Z is P.

14. The polymeric material of 1, wherein $R^4$ has the formula $C_{1-10}$ aliphatic-L*, wherein L* has the formula:

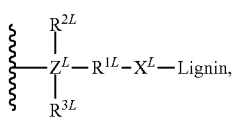

$X^L$ is independently:
null,

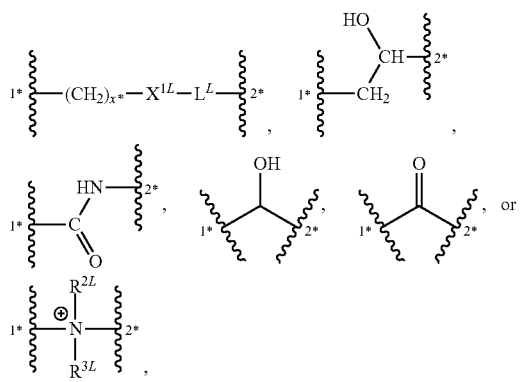

wherein wavy line 1* represents the point of attachment to lignin, and wavy line 2* represents the point of attachment to the $R^{1L}$ group $X^{1L}$ is null, S, O, NH, or a 1,2,3,-triazole;

x* is 0-8;

$L^L$ is null, $C_{1-10}$alkylene, or $C_{1-10}$heteroalkylene;

$R^{1L}$ is selected from null or $C_1$-$C_{10}$ aliphatic group, wherein $R^{1L}$ is optionally substituted with one or more of $C_{1-10}$ alkyl, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl)($C_{3-10}$ heterocycloalkyl), —($C_{0-10}$ alkyl)COOH, —($C_{0-10}$ alkyl)N($C_{1-4}$alkyl) 3, or —($C_{0-10}$ alkyl)-OH;

at least one of $X^L$ and $R^{1L}$ is not null;

any two or more of $R^{1L}$, $R^{2L}$, and $R^{3L}$ may together form a ring, $R^{2L}$ and $R^{3L}$ are in each case independently selected from $C_1$-$C_{10}$ aliphatic group, each of $R^{1L}$, $R^{2L}$, and $R^{3L}$ is independently and optionally substituted with one or more of a lignin fragment, $C_{1-10}$ alkyl, $C_{1-10}$ alkoxy, $C_{1-10}$ heteroalkyl, —($C_{0-10}$ alkyl)($C_{6-14}$ aryl), —($C_{0-10}$ alkyl)($C_{1-13}$ heteroaryl), —($C_{0-10}$ alkyl)($C_{6-14}$ aryloxy), —($C_{0-10}$ alkyl)($C_{3-10}$ cycloalkyl), —($C_{0-10}$ alkyl-) ($C_{3-10}$ heterocycloalkyl), —($C_{0-10}$ alkyl)($C_{3-10}$ cycloalkenyl), —($C_{0-10}$ alkyl)($C_{3-10}$ heterocycloalkenyl), —($C_{0-10}$ alkyl)COOH, —($C_{0-10}$ alkyl)N($C_{1-4}$alkyl) 3, or —($C_{0-10}$ alkyl)-OH;

wherein when $Z^L$ is a $sp^2$ hybridized nitrogen, then $R^{3L}$ is optionally null.

15. The polymeric material of claim 14, wherein $R^{2L}$ and $R^{3L}$ are methyl.

16. A method of capturing carbon dioxide, comprising contacting the polymeric material of claim 1 with a carbon dioxide source.

17. A method of forming a cyclic carbonate, comprising contacting the polymeric material of claim 1 with an alcohol activating agent, a diol, and a base.

18. A method of preparing a polyurethane, comprising contacting a cyclic carbonate prepared by the method of claim 17 with a polyamine.

* * * * *